US011829437B2

(12) United States Patent
Goldstein et al.

(10) Patent No.: US 11,829,437 B2
(45) Date of Patent: *Nov. 28, 2023

(54) SYSTEM FOR COMPARISON AND MERGING OF VERSIONS IN EDITED WEBSITES AND INTERACTIVE APPLICATIONS

(71) Applicant: Wix.com Ltd., Tel Aviv (IL)

(72) Inventors: Yuval Goldstein, Herzliya (IL); Amit Kaufman, Tel Aviv (IL); Oren Hollander, Rosh Ha'Ayin (IL); Roni Ben-Aharon, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 421 days.

This patent is subject to a terminal disclaimer.

(21) Appl. No.: 15/708,160

(22) Filed: Sep. 19, 2017

(65) Prior Publication Data
US 2018/0011824 A1    Jan. 11, 2018

Related U.S. Application Data

(63) Continuation of application No. 14/619,145, filed on Feb. 11, 2015, now Pat. No. 9,817,804, which is a
(Continued)

(51) Int. Cl.
*G06F 16/00* (2019.01)
*G06F 16/957* (2019.01)
(Continued)

(52) U.S. Cl.
CPC ........ *G06F 16/9577* (2019.01); *G06F 40/103* (2020.01); *G06F 40/106* (2020.01);
(Continued)

(58) Field of Classification Search
CPC .. G06F 17/211; G06F 17/212; G06F 17/2247; G06F 17/2288; G06F 17/30905;
(Continued)

(56) References Cited

U.S. PATENT DOCUMENTS 5,890,177 A * 3/1999 Moody .................. G06Q 10/10
715/210
5,956,726 A * 9/1999 Aoyama .................. G06F 16/83
715/236
(Continued)

FOREIGN PATENT DOCUMENTS

| WO | 200201394 | 1/2002 |
| WO | 2005107409 | 11/2005 |
| WO | 2011119142 | 9/2011 |

OTHER PUBLICATIONS

Hegaret et al, "What is Document Object Model?", 2000, p. 1-6.*
(Continued)

*Primary Examiner* — Cesar B Paula
*Assistant Examiner* — David Faber
(74) *Attorney, Agent, or Firm* — HEIDI BRUN ASSOCIATES LTD.

(57) ABSTRACT

A device and method for a website building system that has a component based version comparer to compare at least two versions of a website page which has components defined in a set of hierarchies. The components can be a visual component, a container and a non-visual site element. The device generates a difference tree representing the differences in the components between two versions of the website page using the version comparer to preprocess the components in a version of a website page to determine internal geometric and semantic relationships before comparing the components and the relationships between the two versions using semantic and geometrical analysis. The device also includes a version merger to create an integrated version of the two versions of the website page according to the difference tree.

30 Claims, 43 Drawing Sheets

Related U.S. Application Data continuation-in-part of application No. 14/483,981, filed on Sep. 11, 2014, now Pat. No. 10,176,154.

(60) Provisional application No. 61/876,795, filed on Sep. 12, 2013, provisional application No. 61/938,166, filed on Feb. 11, 2014, provisional application No. 61/985,489, filed on Apr. 29, 2014.

(51) Int. Cl.
*G06F 40/197* (2020.01)
*G06F 40/103* (2020.01)
*G06F 40/106* (2020.01)
*G06F 40/194* (2020.01)
*G06F 40/143* (2020.01)

(52) U.S. Cl.
CPC .......... *G06F 40/143* (2020.01); *G06F 40/194* (2020.01); *G06F 40/197* (2020.01)

(58) Field of Classification Search
CPC .... G06F 17/2211; G06F 40/197; G06F 40/14; G06F 40/103; G06F 40/106; G06F 40/194; G06F 16/9577; G06F 40/143
See application file for complete search history.

(56) References Cited

U.S. PATENT DOCUMENTS

| | | | |
|---|---|---|---|
| 6,300,947 B1* | 10/2001 | Kanevsky | G06F 16/9577 715/866 |
| 6,560,620 B1 | 5/2003 | Ching | |
| 7,072,984 B1 | 7/2006 | Polonsky | |
| 7,162,501 B2* | 1/2007 | Kupkova | G06F 16/93 |
| 7,203,901 B2* | 4/2007 | Chen | G06F 16/9577 715/205 |
| 8,332,763 B2* | 12/2012 | Zhang | G06F 16/972 715/255 |
| 8,381,095 B1* | 2/2013 | Fischer | G06F 40/177 715/239 |
| 8,429,526 B2 | 4/2013 | Sthanikam | |
| 8,458,204 B2* | 6/2013 | Wu | G06F 17/2211 707/758 |
| 8,543,619 B2 | 9/2013 | Dharmalingam | |
| 8,583,614 B1 | 11/2013 | Dilts | |
| 8,788,508 B2 | 7/2014 | Kuzmin | |
| 8,984,396 B2 | 3/2015 | Tingstrom | |
| 9,218,102 B1 | 12/2015 | Greenspan | |
| 9,275,368 B1 | 3/2016 | Harpalani | |
| 9,355,150 B1 | 5/2016 | Bell | |
| 9,817,804 B2 | 11/2017 | Goldstein | |
| 2002/0016801 A1 | 2/2002 | Reiley | |
| 2004/0060002 A1 | 3/2004 | Lucovsky | |
| 2005/0039116 A1 | 2/2005 | Slack-Smith | |
| 2005/0039117 A1 | 2/2005 | Lwo | |
| 2005/0132346 A1 | 6/2005 | Tsantilis | |
| 2005/0289454 A1 | 12/2005 | Donelson | |
| 2006/0026496 A1* | 2/2006 | Joshi | G06F 16/951 715/205 |
| 2006/0136511 A1 | 6/2006 | Ngo | |
| 2006/0218160 A1 | 9/2006 | Bhatia | |
| 2006/0253465 A1 | 11/2006 | Willis | |
| 2008/0077848 A1 | 3/2008 | Roberts | |
| 2008/0235564 A1* | 9/2008 | Erol | G06F 16/9577 715/202 |
| 2008/0295005 A1* | 11/2008 | Salesin | G06F 16/9577 715/763 |
| 2008/0301193 A1* | 12/2008 | Massand | G06F 16/258 |
| 2008/0313243 A1 | 12/2008 | Poston | |
| 2009/0307274 A1 | 12/2009 | Baer | |
| 2010/0077380 A1* | 3/2010 | Baker | G06F 8/71 717/120 |
| 2010/0088676 A1* | 4/2010 | Yuan | G06F 16/80 707/E17.005 |
| 2010/0114823 A1 | 5/2010 | Sykes | |
| 2010/0262647 A1 | 10/2010 | Malek | |
| 2010/0313149 A1* | 12/2010 | Zhang | G06F 16/972 715/760 |
| 2011/0066626 A1* | 3/2011 | Dharmalingam | G06F 17/2247 707/758 |
| 2011/0161376 A1 | 6/2011 | Dickson | |
| 2011/0246869 A1 | 10/2011 | Vion-Dury | |
| 2012/0101980 A1 | 4/2012 | Taleghani | |
| 2012/0130945 A1 | 5/2012 | I Dalfo | |
| 2013/0007062 A1 | 1/2013 | Dutta | |
| 2013/0024757 A1 | 1/2013 | Doll | |
| 2013/0054404 A1 | 2/2013 | Garcia | |
| 2013/0124956 A1 | 5/2013 | Hatfield | |
| 2013/0151940 A1 | 6/2013 | Bailor | |
| 2013/0185252 A1 | 7/2013 | Palmucci | |
| 2013/0262419 A1* | 10/2013 | Kilian | G06F 40/205 707/E17.005 |
| 2013/0326333 A1* | 12/2013 | Hashmi | G06F 17/2247 715/234 |
| 2014/0013205 A1* | 1/2014 | Mikhaiel | G06F 40/194 715/234 |
| 2014/0089786 A1 | 3/2014 | Hashmi | |
| 2014/0215303 A1 | 7/2014 | Grigorovitch | |
| 2014/0250360 A1* | 9/2014 | Jiang | G06F 40/197 715/229 |
| 2014/0281872 A1 | 9/2014 | Glover | |
| 2014/0282078 A1 | 9/2014 | Taylor | |
| 2015/0134629 A1* | 5/2015 | Knobloch | G06F 16/958 707/695 |
| 2016/0034433 A1 | 2/2016 | Yamat | |

OTHER PUBLICATIONS

International Search Report for corresponding PCT application PCT/IB2015/41025 dated Jul. 8, 2015.
European Extended Search Report for corresponding EP application 15 74 8646.5 dated Sep. 29, 2017.

* cited by examiner

470 — LOOP ON THE ELEMENTS IN Y ACCORDING TO THEIR y-ORDER (FROM THE TOP TO BOTTOM & THEN FROM LEFT TO RIGHT FOR ELEMENTS WITH IDENTICAL y-VALUE). FOR EACH ELEMENT Q IN THE SET Y:

CHECK ALL ELEMENTS IN ALL COLUMNS IN X (WHICH SHOULD ALL HAVE A SMALLER y-COORDINATE) AND SELECT THE SUBSET R OF ELEMENTS C1..Cn WHICH CONTROL Q

REMOVE DUPLICATES FROM R — MULTIPLE ELEMENTS FROM A SINGLE COLUMN ALL WHICH CONTROL Q

HANDLE THE FOLLOWING CASES:

IF SET R IS EMPTY: THIS IS THE START OF AN "ORPHAN" COLUMN — OPEN A NEW COLUMN IN X WITH THE ELEMENT Q

IF SET R HAS ONE OR MORE ELEMENTS: CONNECT Q TO THE COLUMNS CONTAINING WITH EACH OF THE ELEMENTS C1..Cn, CREATING A COLUMN CONTINUATION (IF CONNECTED AT END OF COLUMN) OR COLUMN SPLIT (IF CONNECTED MID-COLUMN) FOR EACH ELEMENT. IF THERE IS MORE THEN ONE SUCH COLUMN CREATE A COLUMN MERGE

REMOVE FROM Y ELEMENTS ADDED TO COLUMNS IN X

IF THE CURRENT IS THE DUMMY FOOTER ELEMENT CLOSE THE COLUMN

480 — ARRANGE THE ELEMENTS ACCORDING TO THE ORDER IN THE GRAPH (TOP TO BOTTOM AND LEFT TO RIGHT). IN THE CASE OF ORPHAN COLUMNS, ARRANGE ACCORDING TO X ORDER

FIG.15C

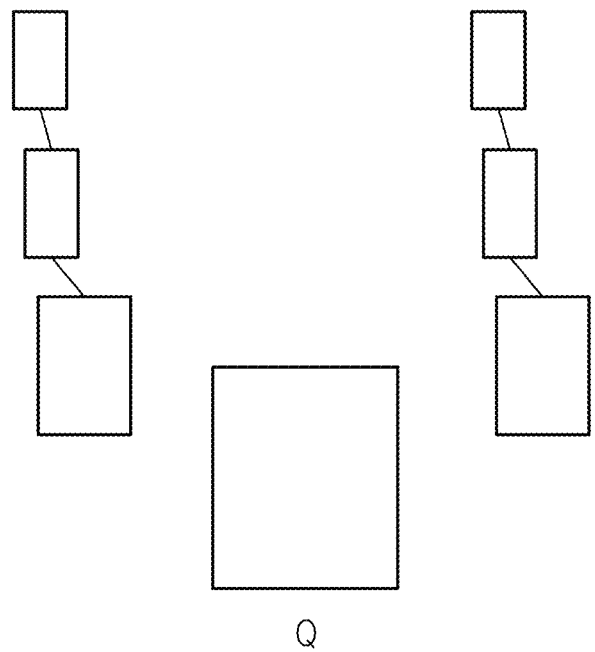
FIG.16C
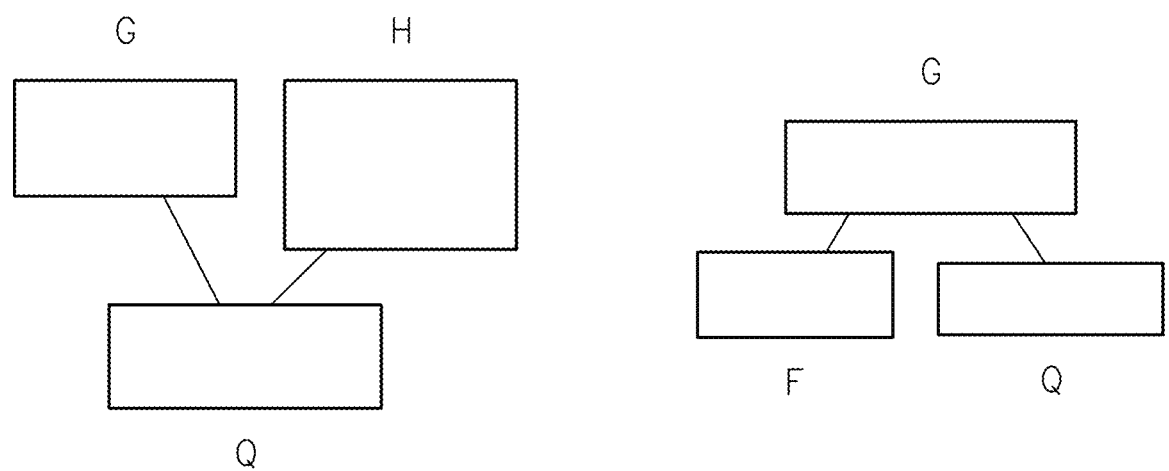
FIG.16D
FIG.16E

FIG.17

SYSTEM FOR COMPARISON AND MERGING OF VERSIONS IN EDITED WEBSITES AND INTERACTIVE APPLICATIONS

This application is a Continuation of US application Ser. No. 14/619,145 filed Feb. 11, 2015, which is a Continuation In Part application of U.S. patent application Ser. No. 14/483,981 filed Sep. 11, 2014 which claims priority from U.S. provisional patent application 61/876,795, filed Sep. 12, 2013 and also claims priority from U.S. provisional patent applications 61/938,166, filed Feb. 11, 2014 and 61/985,489 filed 29 Apr. 2014, all of which are incorporated herein by reference.

FIELD OF THE INVENTION

The present invention relates to websites and interactive applications generally and to comparison and merging of websites versions in particular.

BACKGROUND OF THE INVENTION

With the onset of the Internet, in recent years, users have been accessing web sites and interactive applications more and more using smart phones, tablets and other mobile devices. These devices have been gradually replacing—or complementing—both the full-features desktop personal computer as well as the older less capable "feature phones". This applies to web sites residing on the world-wide-web, as well as to other interactive applications which can now be acquired from numerous application stores offered by major companies such as Apple, Google, Microsoft and Amazon.

Websites and interactive applications have different display form factors and characteristics depending on where they are viewed such as on the desktop PC, the small-scale mobile device and the mid-size mobile tablet.

SUMMARY OF THE PRESENT INVENTION

There is provided, in accordance with a preferred embodiment of the present invention, a device implementable in a website design program. The device includes a component based version comparer to compare at least two versions of a website, the at least two versions having components in a set of hierarchies, where the components are at least one of a visual component, a container and a non-visual site element, and to generate a difference tree representing the differences in the components between the at least two versions of the same website and where the version comparer preprocesses the components in each single version of the at least two versions of the website to determine at least one of internal geometric, semantic, content and attribute relationships before comparing the components and the relationships between the at least two versions of the website using at least one of semantic, geometrical, content and attribute analysis. The device also includes a version merger to create an integrated version of the two versions of the website based on the difference tree.

Moreover, in accordance with a preferred embodiment of the present invention, the device also includes a version resolver to resolve conflicts in the generation of the difference tree.

Further, in accordance with a preferred embodiment of the present invention, the device is implementable on at least one of a server and a client.

Still further, in accordance with a preferred embodiment of the present invention, the at least two versions of the same website include at least one version from an external version control system.

Additionally, in accordance with a preferred embodiment of the present invention, the website components are stored in at least one of a database, an object store; markup language files and data interchange format files.

Moreover, in accordance with a preferred embodiment of the present invention, the hierarchies and the difference tree are trees and where the trees include nodes representing the components, the components having attributes.

Further, in accordance with a preferred embodiment of the present invention, the version comparer includes a structural version comparer to compare the nodes through comparison of their geometrical, content and semantic relationships; an order based version comparer to compare the nodes based on the order of the nodes and to pre-match the nodes according to an internal website design system identifier; a semantic matching comparer to perform semantic classification on the nodes and match them according to their semantic classes and geometrical parameters; a comparison selector and coordinator to provide selection and coordination between the structural version comparer, the order based version comparer and the semantic matching comparer based on at least one of the structure and attributes of the components and a difference tree generator to generate the difference tree based on results of at least one of the structural version comparer, the order based version comparer and the semantic matching comparer.

Still further, in accordance with a preferred embodiment of the present invention, the difference tree includes at least one of a group node and a comparison node.

Additionally, in accordance with a preferred embodiment of the present invention, the version resolver includes a difference tree browser to display the difference tree hierarchy for manual version resolving; a merged page displayer to present a display of at least one current state of a merged page; a component attribute browser to display the values of a component attribute, including displaying the two values for components for which there is a comparison node; a resolver selector and coordinator to select and coordinate between the difference tree browser, the merged page displayer and the component attribute browser and a merged component tree generator to provide combined results from at least one of the difference tree browser, the merged page displayer and the component attribute browser and to generate a new resolved difference tree.

Moreover, in accordance with a preferred embodiment of the present invention, the structural version comparer includes an ID-based matcher to match all the components in the trees that have the same ID; a geometrical relationship analyzer to perform geometrical matching to find pairs among non-ID-matched components in the trees; a component/attribute analyzer to check for changes in the component attributes; a component semantic analyzer to find pairs among non-ID-matched the components; and a split merge analyzer to detect splitting and merging of the components and containers and to further detect ID retaining split transformations.

Further, in accordance with a preferred embodiment of the present invention, the order based version comparer includes a preprocessor to analyze the components in each tree to extract relevant component sets and to analyze and modify the components for comparison where necessary; an orderer to determine an order for the elements within each the node; and a sequence matcher to perform sequence matching on the components.

Still further, in accordance with a preferred embodiment of the present invention the semantic matching comparer includes a semantic classifier to classify the components into a semantic classification; and a class/attribute matcher to create a match between elements from two matched components based on the semantic classification.

Additionally, in accordance with a preferred embodiment of the present invention, the geometrical relationship is at least one of overlap, intersection, proximity, relative position and relative size.

Moreover, in accordance with a preferred embodiment of the present invention, the merged page displayer includes an animator to animate the display of conflicting components by switching between the at least one states.

Further, in accordance with a preferred embodiment of the present invention, the animator is at least one of automatic and controlled by user.

Still further, in accordance with a preferred embodiment of the present invention, the animator is integrated with dynamic layout processing.

Additionally, in accordance with a preferred embodiment of the present invention, the coordination is based on a combined metric of results returned from the structural version comparer, the order based version comparer and the semantic matching comparer.

Moreover, in accordance with a preferred embodiment of the present invention, the metric is a weighted average.

Further, in accordance with a preferred embodiment of the present invention, the difference tree browser includes a hierarchical system menu generator to generate a display of conflicting components.

Still further, in accordance with a preferred embodiment of the present invention, display of at least one current state of the merged page is based on a weighted average of the states.

There is provided, in accordance with a preferred embodiment of the present invention, a method. The method includes comparing at least two versions of a website, the at least two versions having components in a set of hierarchies, where the components are at least one of a visual component, a container and a non-visual site element; generating a difference tree representing the differences in the components between the at least two versions of the same web site; preprocessing the components in each single version of the at least two versions of the website to determine at least one of internal geometric, semantic, content and attribute relationships; comparing the components and the relationships between the at least two versions of the website using at least one of semantic, geometrical, content and attribute analysis; and creating an integrated version of the two versions of the website based on the difference tree.

Moreover, in accordance with a preferred embodiment of the present invention, the method includes resolving conflicts in the generation of the difference tree.

Further, in accordance with a preferred embodiment of the present invention, the method is implementable on at least one of a server and a client.

Still further, in accordance with a preferred embodiment of the present invention, the at least two versions of the same website include at least one version from an external version control system.

Additionally, in accordance with a preferred embodiment of the present invention, the website components are stored in at least one of a database, an object store; markup language files and data interchange format files.

Moreover, in accordance with a preferred embodiment of the present invention, the hierarchies and the difference tree are trees and where the trees include nodes representing the components, the components having attributes.

Further, in accordance with a preferred embodiment of the present invention, the comparing at least two versions of a website, generating, preprocessing, comparing the components and the relationships and creating includes comparing the nodes through comparison of their geometrical, content and semantic relationships; comparing the nodes based on the order of the nodes and pre-matching the nodes according to an internal website design system identifier; performing semantic classification on the nodes and matching them according to their semantic classes and geometrical parameters, providing selection and coordinating between the comparing the nodes through comparison of their geometrical, content and semantic relationships, the comparing the nodes based on the order of the nodes and pre-matching and the performing semantic classification based on at least one of the structure and attributes of the components; and generating the difference tree based on results of at least one of the comparing of the nodes through comparison of their geometrical, content and semantic relationships, the comparing the nodes based on the order of the nodes and pre-matching and the performing semantic classification.

Still further, in accordance with a preferred embodiment of the present invention, the difference tree includes at least one of a group node and a comparison node.

Additionally, in accordance with a preferred embodiment of the present invention, the resolving includes displaying the difference tree hierarchy for manual version resolving; presenting a display of at least one current state of a merged page; displaying the values of a component attribute, including displaying the two values for components for which there is a comparison node; selecting and coordinating between the displaying the difference tree hierarchy, the presenting and the displaying the values of a component attribute; providing the combined results from the displaying the difference tree browser, the presenting and the displaying the values of a component attribute; and generating a new resolved difference tree.

Moreover, in accordance with a preferred embodiment of the present invention, the comparing the nodes based on the order of the nodes and pre-matching includes matching all the components in the trees that have the same ID; performing geometrical matching to find pairs among non-ID-matched components in the trees, checking for changes in the component attributes; finding pairs among non-ID-matched components; and detecting splitting and merging of the components and containers and further detecting ID retaining split transformations.

Further, in accordance with a preferred embodiment of the present invention, the comparing the nodes through comparison of their geometrical, content and semantic relationships includes preprocessing the components in each tree to extract relevant component sets and analyzing and modifying the components for comparison where necessary; determining an order for the elements within each node; and performing sequence matching on the components.

Still further, in accordance with a preferred embodiment of the present invention, the performing semantic classification includes classifying the components into a semantic classification; and creating a match between elements from two matched components based on the semantic classification.

Additionally, in accordance with a preferred embodiment of the present invention, the geometrical relationship is at least one of overlap, intersection, proximity, relative position and relative size.

Moreover, in accordance with a preferred embodiment of the present invention, the presenting a display of at least one current state of a merged page includes animating the display of conflicting components by switching between the at least one states.

Further, in accordance with a preferred embodiment of the present invention, the animating is at least one of automatic and controlled by user.

Still further, in accordance with a preferred embodiment of the present invention, the animating is integrated with dynamic layout processing.

Additionally, in accordance with a preferred embodiment of the present invention, the coordinating is based on a combined metric of results returned from the structural version comparer, the order based version comparer and the semantic matching comparer.

Moreover, in accordance with a preferred embodiment of the present invention, metric is a weighted average.

Further, in accordance with a preferred embodiment of the present invention, the displaying the difference tree hierarchy for manual version resolving includes generating a display of conflicting components.

Still further, in accordance with a preferred embodiment of the present invention, the displaying of at least one current state of the merged page is based on a weighted average of the states.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 15A, 15B and 15C are an algorithm showing the functionality of a primary direction with split and merge orderer, constructed and operative in accordance with the present invention;

FIGS. 16A, 16B, 16C, 16D, 16E, 16F, 16G and 16H are schematic illustrations of the process of the primary direction with split and merge orderer of FIGS. 15A, 15B and 15C, constructed and operative in accordance with the present invention;

FIG. 17 is an example of a website layout;

Figure 1:
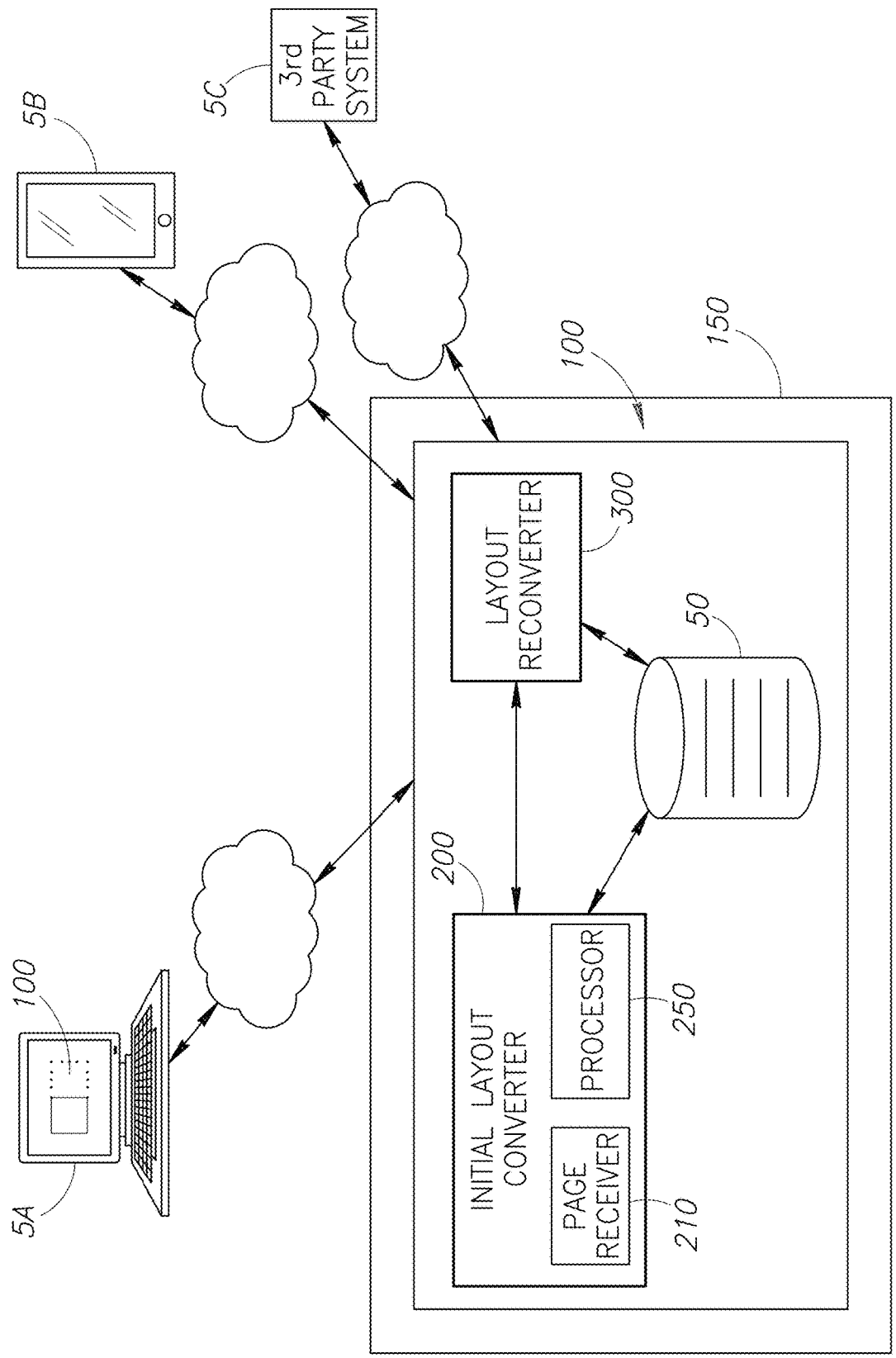
FIG. 1 is a schematic illustration of a system for converting visual applications between platforms, constructed and operative in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that existing sites and applications are typically designed for the desktop PC, with high-resolution large-scale display being very common. When accessing such sites and applications using smaller scale display numerous problems are manifested, including (for example): excessive required scrolling (in particular horizontal scrolling); difficult navigation; non-mobile adapted font sizes; designs and display components which are not adapted to mobile touch screens etc.

Since these sites may be viewed on different sized platforms such as tablets and mobile phones, a developer would be required to create multiple versions of the site or application to support these multiple use scenarios and to maintain the look and feel of the original site. These versions may differ in multiple ways, including visual layout, display components (widgets) in use, touch screen orientation and more.

Applicants have also realized that existing systems for converting website views to fit the pertinent viewing platform have typically aimed at resolving the problems for converting websites designed using markup languages such as HTML (Hyper Text Markup Language) and XML (Extensible Markup Language). These could be sites designed directly in the given markup language, or created using a code generator which creates markup language files for later hosting.

Existing systems have also focused on parsing the original web site, extracting the content information from it, and creating a modified mobile site. Such technology has typically originated from Optical Character Recognition (OCR) and page analysis systems, which are aimed at content extraction rather than content and design adaptation. Thus, existing systems typically operate so as to extract the content and make it readable on a smaller device—while dismantling much of the design and look and feel of the original site.

It will be appreciated that the analysis of existing web sites may be complicated. In particular, some parts of the site may be dynamically generated, and the relationship between site elements might also be implemented procedurally. Thus, it is difficult to precisely understand the site—unless a conversion is performed during site operation (e.g. through a headless browser running on a conversion server). However, this latter method has considerable overhead, and in particular may require that a given page may be adapted to a mobile size every single time it is retrieved by every user—instead of being converted once with the conversion results re-used for all users.

Another issue with existing systems is the support of changes and edits to the original web site upon conversion. It will be appreciated that some systems have been developed to attempt to compare the most recent page version to previous versions of the same page, and try to locate the differences. This has been done using comparison rules based on text similarity, position in the source file, font use, etc. This often requires the designer to manually create a binding between the mobile version and elements of the original desktop version.

However, since page editing is performed separately from the conversion process, the site might have changed drastically between the two versions. For example, a new developer (having a completely different style) might have started working on the site. Alternatively, a new technology or library could have been embedded in the site. Existing systems may attempt to compares the two site versions—which may be very different (internally) from each other even though they look the same. The comparison of two versions of the same web site can be done heuristically but will still not be able to match heavily modified site elements.

Applicants have realized that the above mentioned limitations may be overcome by using an object oriented visual design system. Such a system may be used to create interactive applications and websites and may be used to maintain and create parallel layout definitions between different display platforms for a given application. A visual design system may also provide an internal, consistent object data model of the site, with precisely specified attributes for all site objects. Thus, a visual design system may provide multiple visual layouts for a single site or application with a single set of components.

Applicants have also realized that the use of such a visual design system may include collected editing session history information which may be used to detect component changes and component relationships. Thus, for example, if a designer duplicates a pair of objects (say a picture and a caption) a number of times, it may be inferred that such pair may be related and that it is likely that the pair members should remain close together when being converted to mobile. Thus container objects etc. may be converted while maintaining their original object hierarchy and relationships. Other information may include objects which are edited or moved together, objects which were historically grouped, objects or object sets which were created by duplicating pre-existing objects or object sets and the timing of object editing i.e. was there a specific change applied in a sequence to a certain subset of the objects.

Visual design systems may typically have a unique identifier (ID) per object. Such ID's may be used to match different site versions and maintain site changes consistently. Furthermore, visual design system may employ dynamic layout, including anchors between displayed components which control layout changes made to them. Such anchors can be used to derive additional grouping and layout information, and can also be used to fine-tune the layout to different mobile display sizes. The conversion sub-system may in fact generate additional dynamic layout anchors automatically for later use during display.

Furthermore, as smart phones have proliferated, full scale and advanced HTML browsing, similar to what is available on the desktop have become common in the mobile environment as well. Therefore a system is required that may use similar handling for all platforms (desktop, tablet and mobile) in order to utilize the advanced browsers available on all platforms.

It will be appreciated that visual applications may be standalone systems such as the PowerPoint Presentation Program commercially available from Microsoft Inc. or may be embedded inside a larger editing system such as the Microsoft Word AutoShape Editor also commercially available from Microsoft Inc. Such applications may typically comprise of pages and components which may further arranged in a hierarchy of containers (single page and multi-page) inside a page containing atomic components. A multi-page container may also display multiple mini-pages.

Pages may also include list applications (such as are discussed in US Patent Publication No. 2014/0282218 entitled "DEVICE, SYSTEM, AND METHOD OF WEBSITE BUILDING BY UTILIZING DATA LISTS" published 18 Sep. 2014 and assigned to the common assignee of the present invention) and third party applications. Pages may also use templates such as general page templates or component templates. A specific case is the use of an application master page containing components replicated in all other regular pages. The arrangement of components inside a page or a set of pages may be known as the layout. It will be appreciated that the discussion below describes layouts consisting of rectangular axis-parallel components and containers. Other layouts may also include non-rectangular components and containers including in particular, classes of objects such as rotated or skewed objects and objects consisting of multiple regions, such as a video player component which may have a video display area and a video control area. Such regions may be joint, disjoint or intersecting. Other layouts may also include objects consisting of an arbitrary geometrical shape.

It will be appreciated that the handling of such non-rectangular multi-region objects may be done by using an enclosing rectangle for each non-rectangular object or by adapting the geometrical primitives to handle extended non-rectangular objects, The adaptation may include projection to axis, distance between shapes, minimal/maximal directional distance between shapes (i.e. vertical or horizontal distance), shape intersection detection, shape/line intersection detection, intersection region calculation and shape area calculation.

It will be further appreciated that each application may have multiple layout configurations e.g. desktop (portrait and landscape) and mobile. Some properties of website components may also have a per layout configuration value such as actual component inclusion (e.g. a specific component might be mobile-only, or be desktop/tablet-only). This could be a container component—with all contained siblings being affected together. Other properties may include size (h,w), position (x,y), z-order information, style (font, size, color), color, polymorphic component type (e.g. a given gallery might use a different gallery type for desktop and mobile list components), menu/gallery settings (e.g. grid gallery # of columns/rows), a third party application variant (for third party applications which have multiple variants having different display sizes) and list application view association—for a given item type or item associated with a view, different views can be specified for different list components.

It will also be appreciated that each layout configuration may have a default screen size value (in pixels). The actual screen size may differ to some extent, with this difference handled via the dynamic layout support of the pertinent visual design system. The desktop layout configuration may be the main layout configuration since it has the largest screen width. Other layout configurations may be considered shadow layout configurations of the main layout configuration and may have screen width and height different from that of the main layout configuration. In particular, the width of the shadow layout configuration may be smaller than the main layout configuration (e.g. mobile phone display), similar (e.g. tablet) or larger (e.g. large display screen).

It will be further appreciated that when converting application pages or website pages from a desktop to a mobile version, there are two conflicting goals: preserving the readability of the content on the pages on the reduced version, and preserving the visual layout of the page. Existing systems are mostly aimed at extracting content at the expense of design (such as U.S. Pat. No. 7,203,901 entitled "SMALL FORM FACTOR WEB BROWSING"). These systems are derived from published OCR/Page Analysis algorithms which extract text from regions of interest, and do not attempt (or make minimal effort) to preserve the existing visual web site design.

Some algorithms attempt to preserve the design and/or layout to some extent by shrinking the entire page or elements thereof. However, such shrinking is very limited, since (in particular) text content becomes quickly unreadable as font size is reduced.

Reference is now made to FIG. 1 which illustrates a system 100 for converting visual applications between platforms according to an embodiment of the present invention.

System 100 may comprise an initial layout converter 200, a layout reconverter 300 and a database 50. Initial layout converter 200 may further comprise a page receiver 210 and a processor 250. Converter 200 may convert a main layout configuration from a desktop to a shadow layout configuration for a mobile for the first time. Reconverter 300 may reconvert layout configuration after the main layout configuration application has been edited. All applications and configurations may be stored on database 50.

System 100 may be installed as part of a website building system on a server 150 with the ability to communicate with various clients 5 representing various platforms such as a desktop 5A, a smart-phone 5B and a 3$^{rd}$ party system interface (program-to-program communication) 5C via a suitable communication medium such as the internet. Server 150 may store different layout configurations for the each of the platforms (including multiple layout configurations for each single platform). In an alternative embodiment, system 100 may be also run locally on a client or may be adapted to provide services to another system via a suitable API (Application Programming Interface).

It will be appreciated that initial layout converter 200 may convert each page in an application to a sufficiently narrower version so that it may be viewed on a narrower screen using vertical scrolling and minimal (if any) horizontal screening. It will be appreciated that when system 100 is appropriately integrated (e.g. running on the pertinent client of the website building system), system 100 may perform the conversion in responsive mode, in which a new layout is calculated each time the screen dimensions change.

Figure 2:
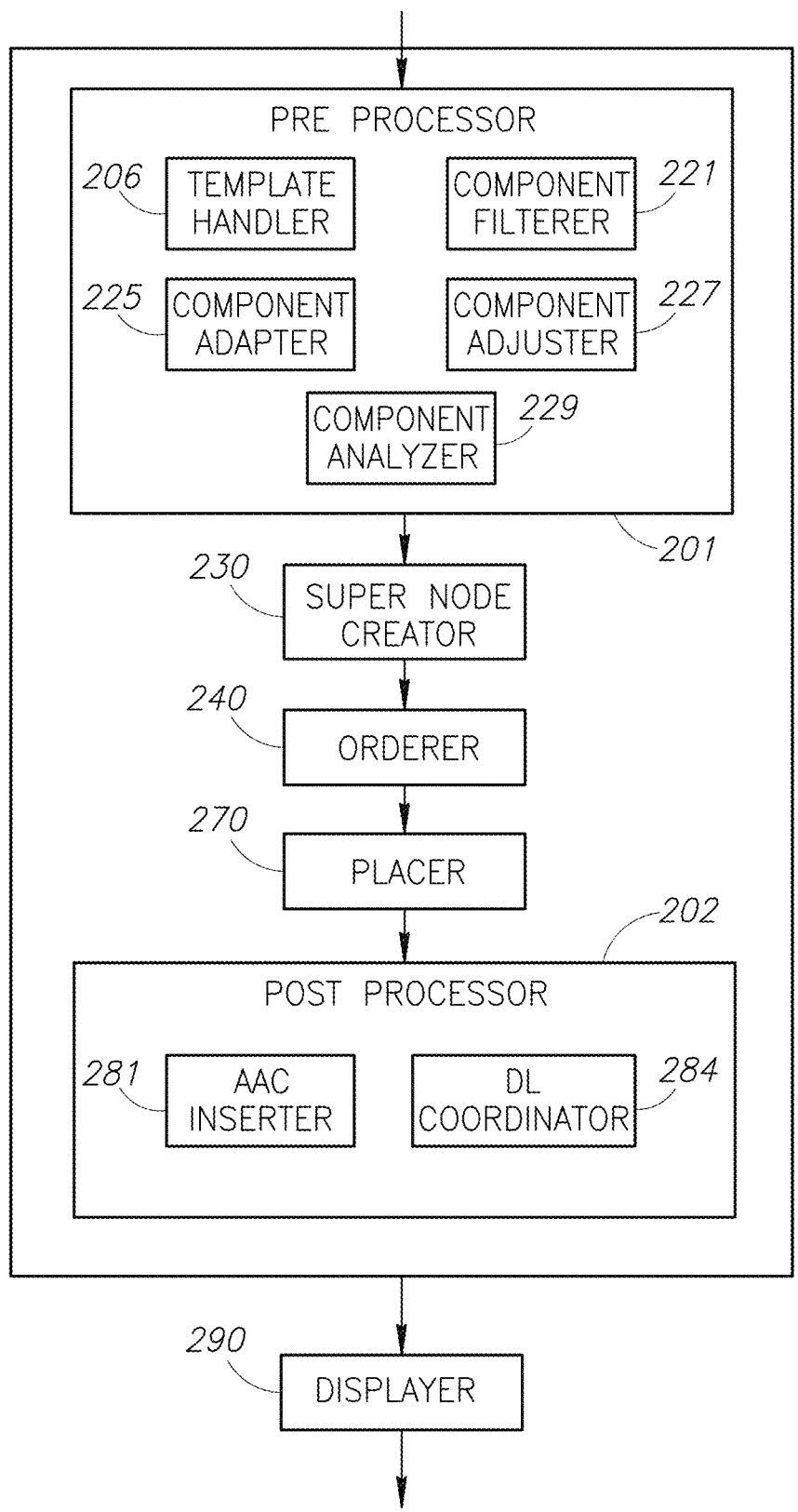
FIG. 2 is a schematic illustration of the elements of an initial layout converter, constructed and operative in accordance with the present invention.

Reference is now made to FIG. 2 which illustrates the elements of processor 250. Processor 250 comprises a pre-processor 201, a super-node creator 230, an orderer 240, a placer 270 and a post processor 202. Pre-processor 201 may comprise a template handler 206, a component filterer 221, a component adapter 225, a component adjuster 227 and a component analyzer 229. Post processor 202 may comprise an automatically added components inserter 281 and a dynamic layout coordinator 284. It will be appreciated that the resulting target layout configuration may be displayed by displayer 290 via the pertinent web site building system. It may be appreciated that if the system 100 is fully integrated with the pertinent website building system, and directly modifies its data structure, post processor 202 may also perform a data-structure restoration post-processing phase, so as to adapt the modified web site building system data structures to be displayed by displayer 290.

It will be appreciated that initial layout converter 200 may handle each page of the application or website separately. In a regular mode, it may convert each page to a sufficiently narrower and typically longer version, so that it can be viewed on a narrower mobile screen using vertical scrolling and minimal horizontal screening. It will be further appreciated that some target devices such as larger tablets and outdoors display screens may have a wider screen than the original desktop screen and therefore narrowing may not be required but rather adapting to a larger display width.

Initial layout converter 200 may process the three dimensional (the x, y coordinates of the screen and the display z-order) set of components and may convert it into an ordered set in the mathematical sense. The generated total order may represent the order in which the information is read on the pertinent page by the user. Initial layout converter 200 may then display the ordered components on the on the narrower mobile display.

Initial layout converter 200 may process the page to be converted dividing the pertinent page into super-nodes based on an analysis of the components and their content relationship as described in more detail herein below.

Preprocessor 201 may analyze the suitability of the components of the pertinent page for the target configuration layout and may make modifications to the existing components where necessary. Although different combinations of layouts may be configured, the examples below discuss conversion from a desktop layout configuration to a mobile layout configuration. Template handler 206 may create modified instances of elements in templates if they exist. Component filterer 221 may filter components to their suitability for the mobile layout configuration, component adapter 225 may adapt components especially for the mobile layout configuration, component adjuster 227 may adjust components especially for the mobile layout configuration and component analyzer 229 may analyze components (including their content, geometry and any other attributes) so as to determine their actual usage. For example, a picture component may be a background image or a content image—affecting its handling by the other parts of system 100.

Super-node creator 230 may locate groups of components which should remain together (such as components which are highly overlapping). Super-node creator 230 may further create a hierarchy of super-nodes based on the current page and the elements within the container hierarchy (possibly modifying the container hierarchy as further described below). Orderer 240 may determine an order for the elements of each of the super-nodes. Placer 270 may place the node elements within the mobile layout area based on the determined order and post processor 202 may make any final adjustments to the layout as required. Automatically added component inserter 281 may insert any automatically added components (as discussed in more detail here in below) as well as other mobile-related components which should be inserted post-ordering (such as mobile-specific menus) and dynamic layout coordinator 284 may modify any existing anchors if necessary after placement. Displayer 290 may display the new layout on the mobile platform, possibly performing final adjusting for the specific mobile platform as described in more detail herein below.

Page receiver 210 may receive the webpage with a desktop layout configuration to be converted and may forward the page to page preprocessor 201.

As discussed herein above, there may be a container hierarchy which may provide additional information on the logical arrangement of the page. The hierarchy may include regular containment relationships as well as parallel containment relationships such as multiple parallel mini pages contained in one multi-page container. Preprocessor 201 may analyze this hierarchy and any specific container relationships at the start of the process in order to gather information that may be useful to the process. Preprocessor 201 may also determine the screen size of the target application and extract navigation menus (site-global and page-specific) and merge them to create one or more united page menus such as top and bottom menus.

It will be appreciated that the pertinent visual design system may support templates, including multi-level and multiple inheritances of templates. Such templates may include single pages, multiple pages or elements of pages. Template handler 206 may create modified instances of the elements of the templates, so an instance of a template may consist of template components to which local modifications are applied. Template handler 206 may further make necessary specific modifications in order to adapt it to the mobile layout configuration. For example, if the inherited components are sufficiently close to the top or bottom of the page, they may be included in a page-specific header or footer as appropriate. The inherited components may be logically duplicated (with modification) in each page which inherits them.

It will also be appreciated that the pertinent visual design system may retain single copies of the inherited components, but may allow a per-page layout to be applied to them (as the adaptation to mobile in each page may be different). Template handler 206 may use this information about the original template of a given component set to create a component group based on the template—ensuring better conformance to the original intent of the template. For each page of the pertinent website individually, preprocessor 201 may review the elements taking into account parameters such as the dimensions of the target screen. Component filter 221 may remove or hide components that are not suitable for mobile display. Such components may include, for example, vertical separator lines (but not horizontal lines), Adobe Flash content (which can't be played on some mobile systems) or ornamental frames. Components which are completely unsuitable for mobile display are removed before further processing. For components which are not recommended for mobile display, component filter 221 may elect to hide them rather then remove them completely. In this case, the website designer may be able to re-insert them into the mobile layout configuration as they would be visible and re-insert-able through the mobile modifications display GUI as described in further detail herein below. It will be appreciated that some components might be unsuitable or not recommended for a mobile platform, but still provide substantial information to initial layout converter 200.

Figure 4:
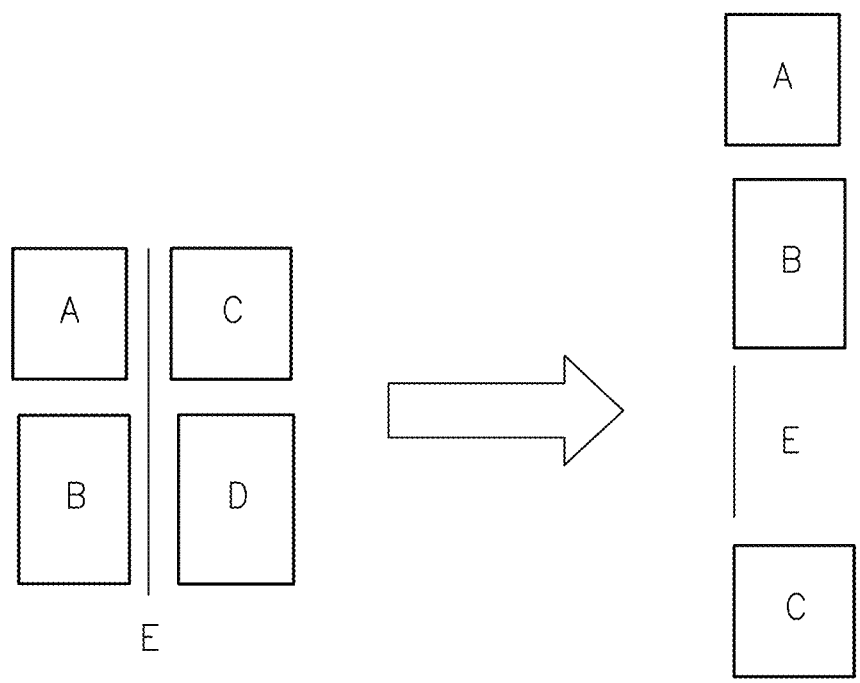
FIG. 4 is a schematic illustration of why vertical lines are irrelevant in a mobile display.

Reference is now made to FIG. 4 which illustrates a vertical line E between components on the desk top version. For example, a vertical line between components would be quite useless on the mobile layout configuration as shown as it would typically be converted into a long (and empty) spacing between component sets. As is illustrated, when the components A,B,C,D are re-arranged to be stacked up vertically for a narrower mobile display, the vertical line E would have wasted display space and therefore should be removed. However, the vertical line is still very useful in signaling to initial layout converter 200 that the 4 components A, B, C and D should be arranged as A+B and C+D and not as A+C and B+D. To take advantage of this information, component filter 221 may mark the vertical line as "remove completely" or "hide later", but still add an invisible, 0-width line which provides the necessary portioning information to initial layout converter 200.

Component adapter 225 may employ width-reduction means, similar to these which may be employed by placer 270 as detailed herein below (whenever such means can be activated at this pre-processing stage). For example, component adapter 225 may switch components to "lighter" mobile versions. For example, switch galleries which may display multiple mini-pages (e.g. accordion type) to galleries which display a single contained mini-page at a time. Component adapter 225 may also provide a specific "lightweight" version of given components for use in mobile versions of the created applications (through a separate version or a different view customized for mobile display).

Component adapter 225 may also handle content-related adaptations such as converting character-based graphics to vector-based scalable graphics. Designers sometimes use text characters as decorations or separators, e.g. "//////////", "----------------", "-=-=-=-=-=-=". Once converted to a similar vector-based shape, they can be accurately resized without requiring text handling.

Component adapter 225 may also unite menu components into a unified mobile-friendly (small format) menu. Pages often contain multiple navigation menus used for both inter-page and intra-page navigation. Furthermore, some pages may contain multiple menus defined in different ways such as menus defined in the page itself, menus resulting from page templates used in the page (e.g. application-global header and footer containing menus) and menus defined automatically based on the application structure (e.g. a top-level page navigation menu). Component adapter 225 may further create composite menus (one or more) and merge menus into them depending on criteria such as proximity of evaluated menu to the given created composite menu (e.g. unite all menus starting at the top 200 pixels of the page into a single top-level menu). Component adapter 225 may insert the single (unified and mobile-friendly) or the multiple modified menus directly, or may "post" them for inclusion at later stage (e.g. by placer 270 or by automatically added components inserter 281). This is especially relevant if the (one or more) menus are added in such a way as not to be a part of the regular component layout but rather as "floating", conditionally activated etc.

Component adjuster 227 may modify component parameters to decrease their width. An example of this is the modification of matrix gallery components to 1-2 columns only. Component adjuster 227 may also modify components defined with large ornamental borders into a simpler, less ornamental version of the same component.

Component adjuster 227 may resize components to reflect the actual size used. For example it may shrink text components according to actual text content using enclosing rectangles.

Component adjuster 227 may also "dissolve" containers which tightly wrap an internal component. For example, if a container tightly wraps a sub-container with no additional components in the larger container, it may remove the internal container, merging the two containers into one. It will be appreciated that in this manner a hierarchy level is saved as the container is transparent to the process.

Designers sometimes add multiple sections of the same image which together visually form a single image. Component adjuster 227 may employ "image stitching" and use the attributes and content of the multiple such image components to detect if they should be stitched into a single image. The decision may be based on editing history—if the images were created and/or modified together, based on similarity of dimension in the adjacent image edges, based on the length of overlap of adjacent image edges compared to the separation between the images or based on use of similar colors/features on the boundary (detected through the use of an image content analyzer).

Component adjuster 227 may employ font size mapping. The text in any given application or page may use a large variety of font sizes. These sizes should be mapped to a given (smaller) range for use on a mobile device—while keeping font size differences if possible. Some font sizes would be too small while some would be too large. The mapping is not linear, i.e. not multiplication by a fixed factor. However, it is a monotone function of font size. Component adjuster 227 may collect the range of font sizes used and map this range to the range of allowed mobile font sizes. Component adjuster 227 may provide such mapping which is system wide, or specific at the user, application, page or component level.

In application/page specific font size mapping, component adjuster 227 may count the amount of text (characters) in each given font size, and then use a normal (Gaussian) cumulative distribution function so the most common character sizes are mapped to the font sizes at the center of the range of allowed mobile font sizes. It will be appreciated that such font size may be further modified by a mobile layout configuration specific font size rescaling adjustment.

It will be further appreciated that when processing the component structure, it is important to distinguish between decoration images and content images (with the latter being part of the actual page-specific data). Decoration images can be more freely scaled and clipped as their content is not critical to the actual use of the application. Furthermore, content images should be analyzed similar to other components in the analysis algorithm below, whereas decoration images should not. Component analyzer 229 may recognize a decoration image as such based on any of the following: specific "decoration image" component type or by specific hints at the template/object/component type/designer level. Component analyzer 229 may also recognize if the image covers an area, e.g. the image covers all (or most) of the container in which it resides, whether the image is a background to multiple components or whether the image is adapted to its components' display area using an operator which signifies that the picture serves as decoration, such as "repeat picture in lines". Decoration images are not always "tight" with respect to the components contained inside them, often due to the choice of the specific image involved.

Once the elements have been modified as described herein above, super-node creator 230 may locate groups of components which may be highly overlapping or otherwise related and should be handled together. This is required since (for example) highly overlapping components may form a composition, therefore they must be placed together in order to keep the same inner proportion when resized. It will be appreciated that once all groups have been located, super-node creator 230 may then convert the resulting hierarchical setup of components into a hierarchy of super-nodes based on the current page and/or container hierarchy so that there are multiple total orders at different structure levels. For each individual page or mini page (inside a single page or multi page container), the super-nodes may be known as page super-nodes. It will also be appreciated that each super-node may be considered a separate entity and once defined, the objects within may be rearranged as described in more detail herein below.

It will be further appreciated that some located groups may also be converted into virtual super-nodes (as described in more detail herein below) which may then be handled as a single component similar to the page super-nodes as described herein above. It will be appreciated that each virtual super-node type may have an associated mobile adaptation method defined when it is created such as re-scale in a particular way, limited resize, reorganize etc.

Figure 5:
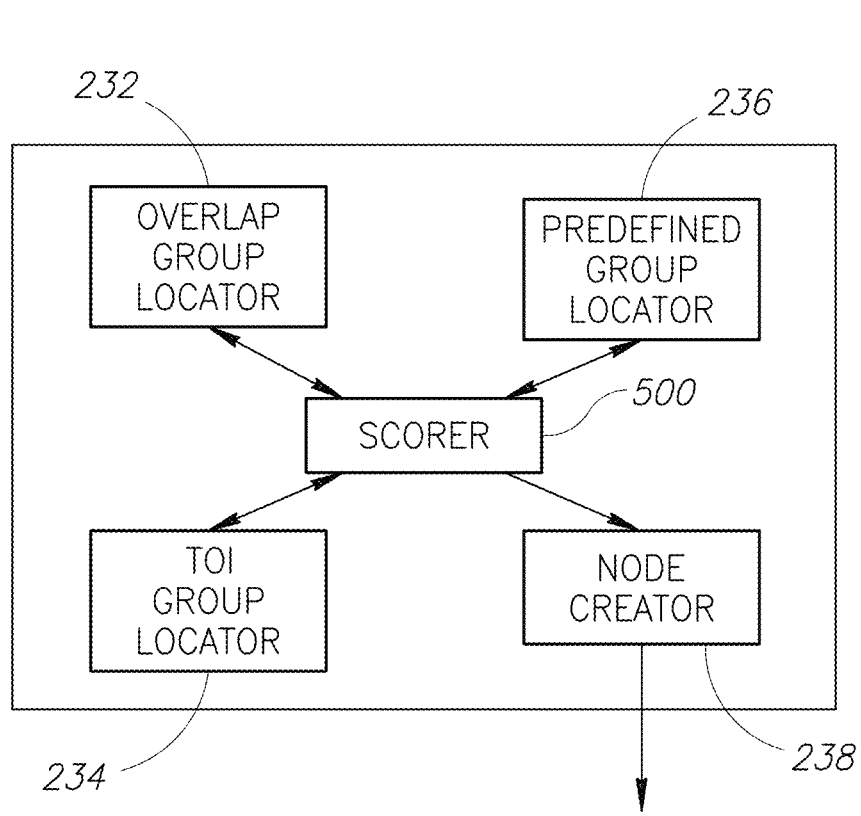
FIG. 5 is a schematic illustration of the elements of a super-node creator, constructed and operative in accordance with the present invention.

Reference is now made to FIG. 5 which illustrates the elements of super-node creator 230. Super-node creator 230 may comprise an overlap group locator 232, a text over image group locator 234, a predefined group locator 236, a node creator 238 and a scorer 500 the functionality of which is described herein below in relation to FIG. 11.

Overlap group locator 232 may determine a set of highly overlapping components which may typically create together a specific design and should retain the same proportion between the group components when placing the group in a new layout. For example, an image and a text forming a logo should retain the same proportion and the relative location regardless of their size and position in the new layout, to maintain the structure of the logo.

Overlap group locator 232 may loop on all possible component pairs within the super-node. For each pair of intersecting components, overlap group locator 232 may calculate the amount of relative overlap as the amount of overlap compared to the smaller value among the two enclosing rectangles of the two components. The calculation may be based on the intersection area or by combining the relative intersection for each axis (e.g. using an average). If this relative intersection exceeds a given threshold, overlap group locator 232 may consider the component pair as overlapping. Once it has finished looping, overlap group locator 232 may merge the overlapping pairs into overlapping groups according to common members. For example component pairs [a,b] and [b,c] may be merged into [a,b,c]. It will be appreciated that the area for each created virtual component may be that of the minimal enclosing rectangle for all grouped components. It will be further appreciated that overlap groups may typically represent detailed design elements and therefore should be only resized and not rearranged. In particular, the text component in such a group should be according to its original size instead of using the font size mapping as described herein above as performed by component adapter 225. Thus the text should be scaled in such a way as to avoid font size mapping completely or use a scaling factor which reverses the effect of font size mapping.

It will be further appreciated that some components may be omitted from an overlap group definition. These may include specific components, such as (for example) horizontal lines and screen-width containers and text size bigger than a given limit (e.g. 25 characters) which is interpreted as the text being a regular paragraph (which should not be marked as overlap group and resized as a composition) rather than as a logo text.

Text over image group locator 234 may group a text component that is overlaid over a specific background image. It may detect cases in which a text component is set on top of a background image and the two should be handled together. Text over image group locator 234 may look for a pair of text and image components in the current super-node in which either the text component is completely contained inside the image component or on each of the four sides the text component is sufficiently close enough (by a given threshold) to the enclosing image component.

If the component is a logo instead of text-over-image, text over image group locator 234 may instead instruct overlap group locator 232 to create an overlap group instead of a text over image group. This may be done based on scoring according to the following criteria: the amount of text characters is below a given threshold, the use of ornamental or other highly unique fonts or the use of a text baseline which is not regular horizontal line (e.g. the text is drawn along a curve).

Predefined group locator 236, may group components according to hints at the template, application, page or components level. This may be regarded as a permanent version of grouping often performed using the GUI of the specific design system so that multiple components may be manipulated together.

It will be appreciated that once groups of overlapping elements have been located and grouped, node creator 238 may merge and convert them into virtual super-nodes as described in more detail herein below and then may create the final super-nodes (including virtual and page super-nodes). The remaining elements may be considered disjointed and thus may be easier to order as discussed herein below.

Figure 8A:
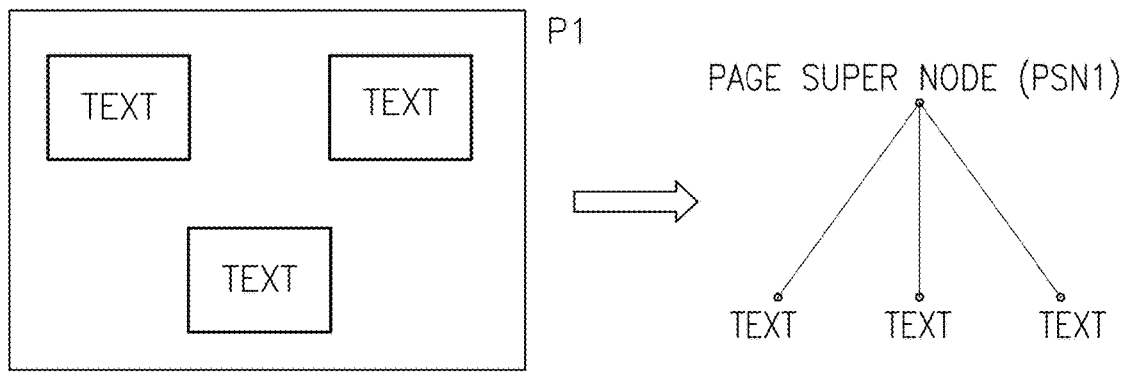
FIGS. 8A, 8B and 8C are schematic illustrations of the mapping between visual application and their corresponding super-node structure, as performed in accordance with the present invention.
Figure 8B:
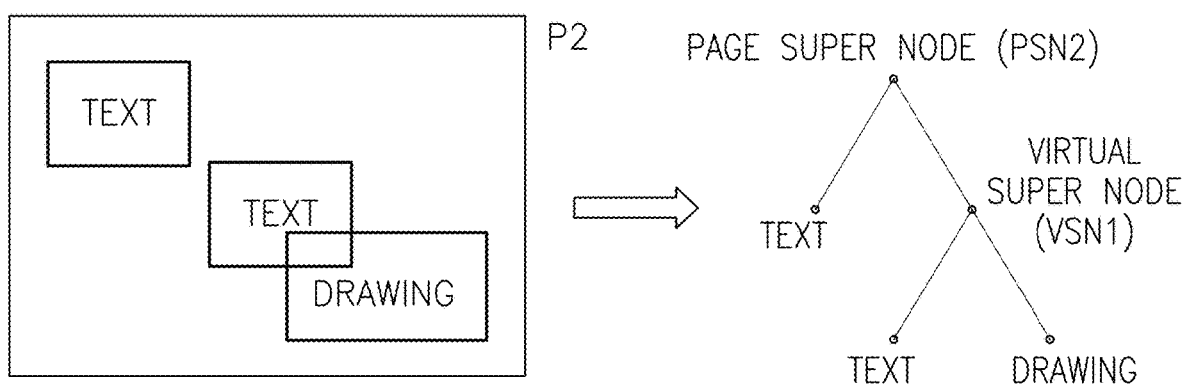
Figure 8C:
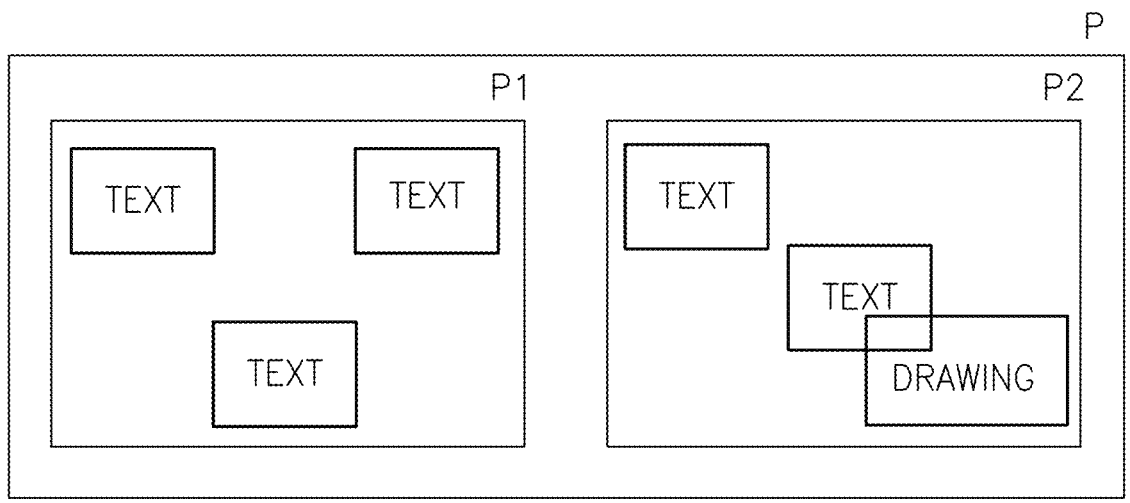
Figure 8C:
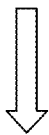
Figure 8C:
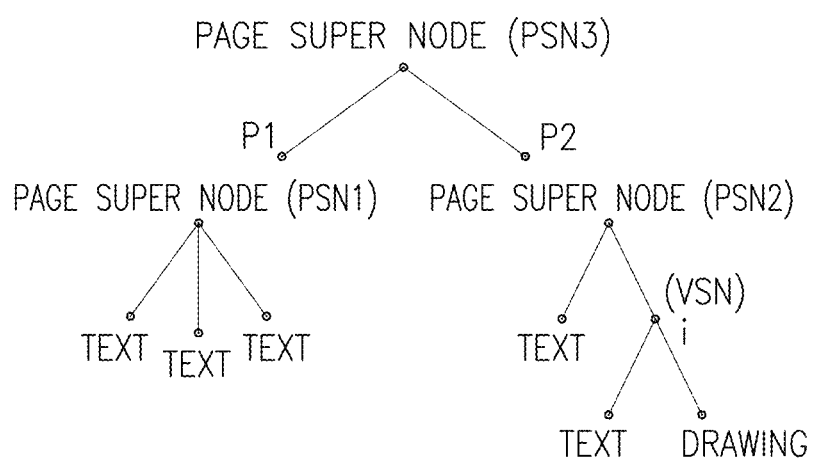

Reference is now made to FIGS. 8A, 8B and 8C which illustrate examples of how super-node creator 230 may create a hierarchy of super-nodes. As discussed herein above, super-nodes created from pages and mini-pages may be considered page super-nodes and super-nodes created from detected groups may be considered as virtual super-nodes. For page P1 in FIG. 8A, a page (or mini page) containing three text elements may be considered a page super-node (PSN1) with 3 elements. In FIG. 8B, page P2 may be considered a page super-node (PSN2) with a text element and a virtual super-node (VSN1) containing a text element and a drawing element. If pages P1 and P2 were mini-pages contained within a Page P3 the resulting node structure may be a page super-node (PSN3) having 2 page super-nodes (PSN1 and PSN2) each having elements as illustrated in FIG. 8C.

Figure 9:
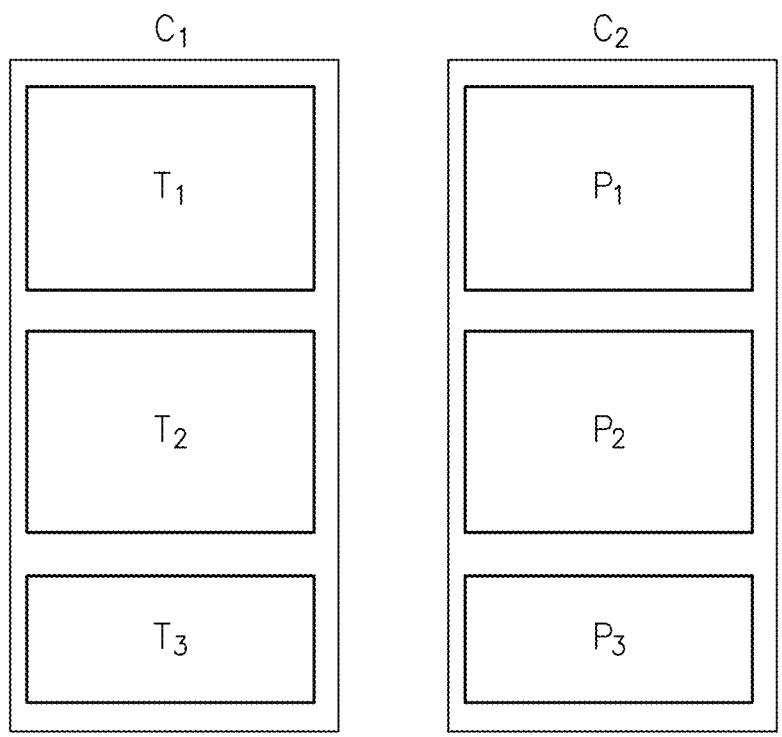
FIG. 9 is a schematic illustration of components within containers before re-arrangement.
Figure 10:
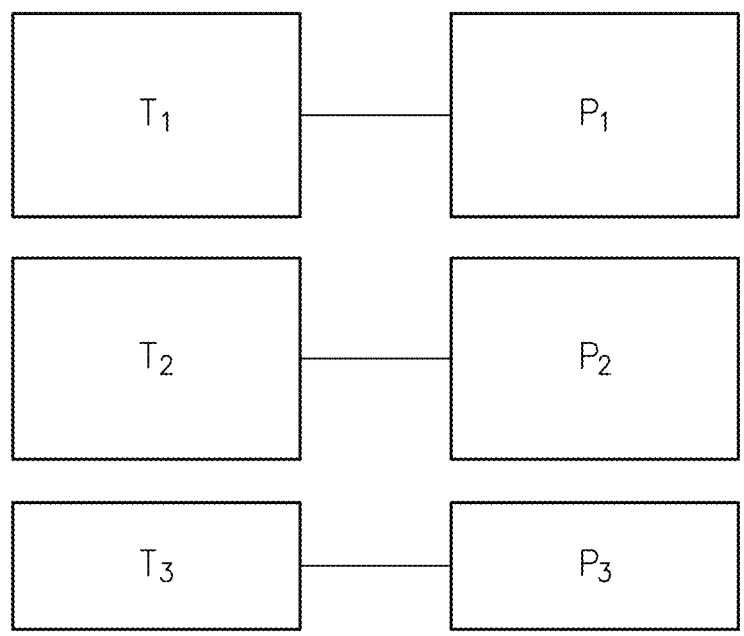
FIG. 10 is a schematic illustration of the components of FIG. 9 after re-arrangement.

It will be further appreciated that node creator 238 may define tightly wrapped containers as a container A residing inside a container B where A and B have very similar sizes (i.e. there are small margins on all sides between A and B and where A is the only component inside B). Node creator 238 may also perform container re-arrangement based on semantic analysis of the components in multiple containers. For example, as is illustrated in FIG. 9 to which reference is now made, text components T1, T2 and T3 are contained in the container C1 and picture components P1, P2 and P3 are contained in the container C2. Node creator 238 may perform semantic analysis to recognize related text and picture component pairs based on their type, proximity and relationship to other components as further described below. Based on this analysis, node creator 238 may recognize that T1 and P1 form a related pair, as well as T2-P2 and T3-P3, and thus may remove these six components (T1, T2, T3, P1, P2, P3) from the containers C1 and C2 and place them in the containing page, preserving the information about the relationships between them as shown in FIG. 10 to which reference is now made.

Furthermore, node creator 238 may classify components that substantially overlap a given container (e.g. over 75% area overlap) as members of the specific container for the purpose of super-node generation, so as to make the super-node hierarchy better reflect the visual arrangement. This is relevant to visual design systems in which components that are not logically contained in a given container may still overlap the container.

Figure 11:
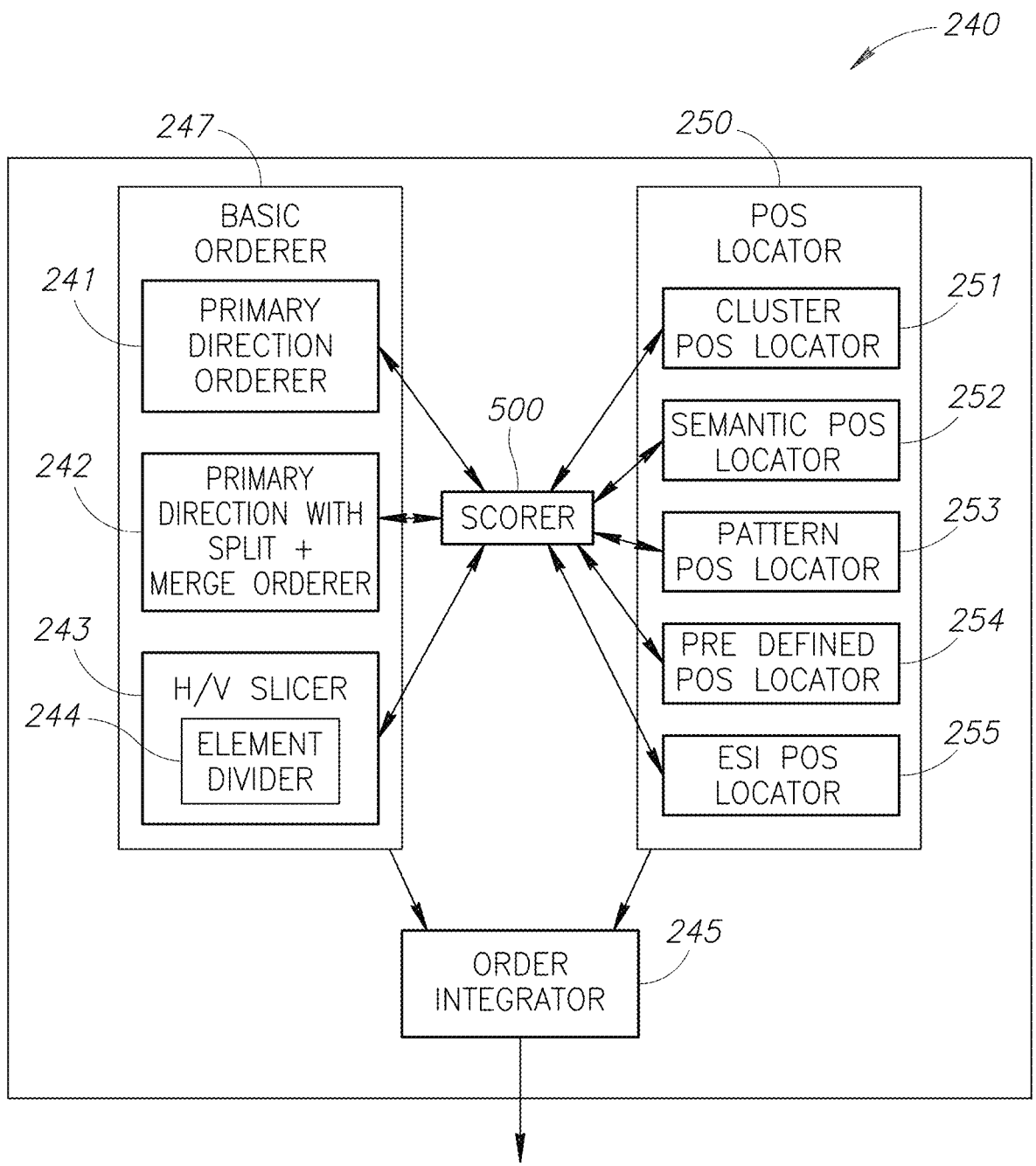
FIG. 11 is a schematic illustration of the elements of an orderer, constructed and operative in accordance with the present invention.

Once the super-node structure has been defined, orderer 240 may create an order for the set of components and contained page super-nodes and virtual super-nodes within each super-node (separately). It will be further appreciated that this basic order may be further modified as a result of the findings of a partial order set locator as described in more detail herein below. Reference is now made to FIG. 11 which illustrates the elements of orderer 240. Orderer 240 may comprise a basic orderer 247, a Partial Order Set (POS) locator 250 and an order integrator 245. Basic orderer 247 may further comprise a primary direction orderer 241, a primary direction with split and merge orderer 242, and an H/V slicer 243. H/V slicer 243 may further comprise an element divider 244 as described in more detail herein below.

POS locator 250 may comprise a cluster POS locator 251, a semantic relationship POS locator 252, a pattern POS locator 253, a predefined POS locator 254 and an ESI (Editing Session Information) based POS locator 255. It will be appreciated that POS locator 250 may analyze the semantics, content and geometry of the components.

It will be appreciated that orderer 240 may attempt to emulate the order in which a human reader may view the elements on a page (or within the specific super-node). It will be further appreciated that since a page is a 2-dimensional entity (or even 3-dimensional with z-order included), this order may not be so well defined even for a human reader.

Figure 12:
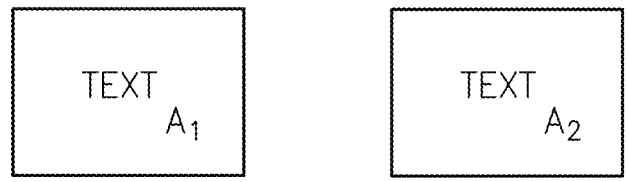
FIG. 12 is a schematic illustration of a four text paragraph arrangement with multiple possible reading orders.
Figure 12:
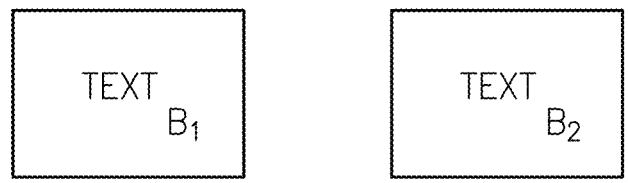
Figure 13:
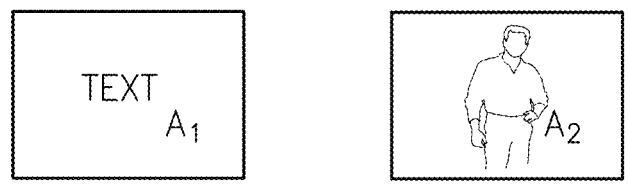
FIG. 13 is a schematic illustration of an arrangement which includes two text paragraphs and two pictures which has multiple possible reading orders.
Figure 13:
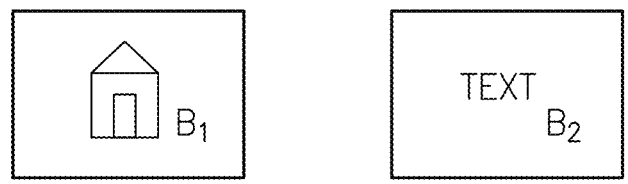

Reference is now made to FIG. 12 which shows an arrangement of four text paragraphs in a square arrangement. Assuming that the paragraphs are in English (which reads from top to bottom and left to right) it is not clear if the reading order should be A1, A2, B1, B2 or A1, B1, A2, B2. Both orders may be considered correct. Furthermore if the elements are text and pictures as is illustrated in FIG. 13 to which reference is now made, it is not clear what the related text and picture elements are.

Primary direction orderer 241 may pre-define a primary direction (i.e. sorting rows first or columns first) and may then try to sort the components in the 2 dimensional page based on the primary direction and then the secondary direction. For example, primary direction orderer 241 working in rows-first mode may sort the elements in a super-node so that the element A precedes the element B if either A and B have a suitable Y overlap (for example at least 25% of the smaller height of the two) and element A is to the left (i.e. order within the row) or if A and B do not have sufficient Y-overlap and A is higher (i.e. order among rows).

Figure 14A:
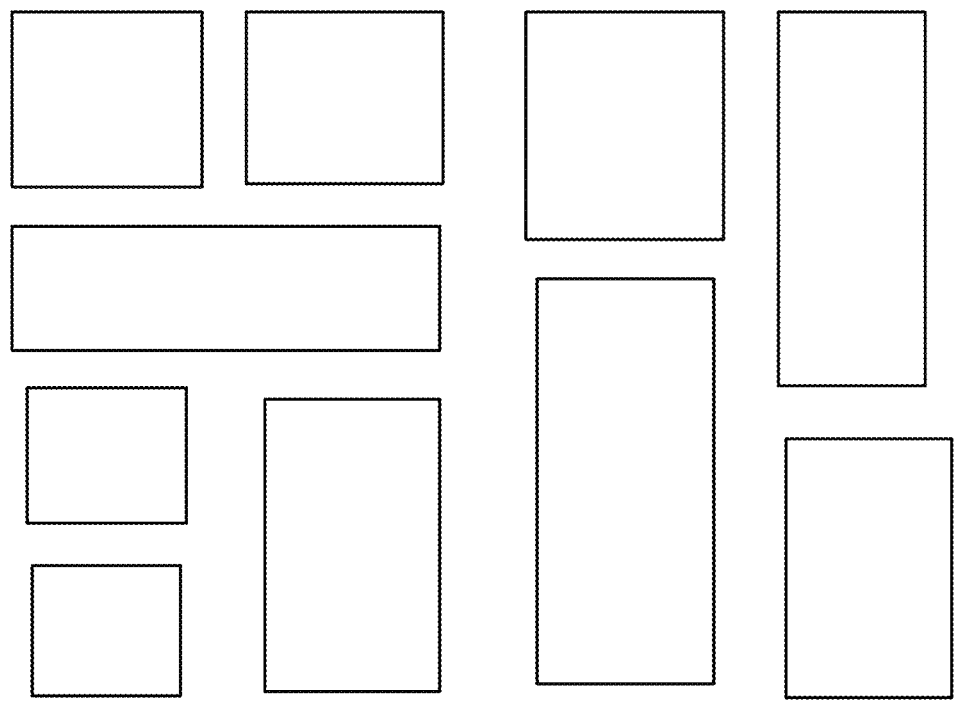
FIGS. 14A, 14B and 14C are schematic illustrations of the conversion of the set of elements within a super-node into an element graph and then an element order, performed in accordance with the present invention.
Figure 14B:
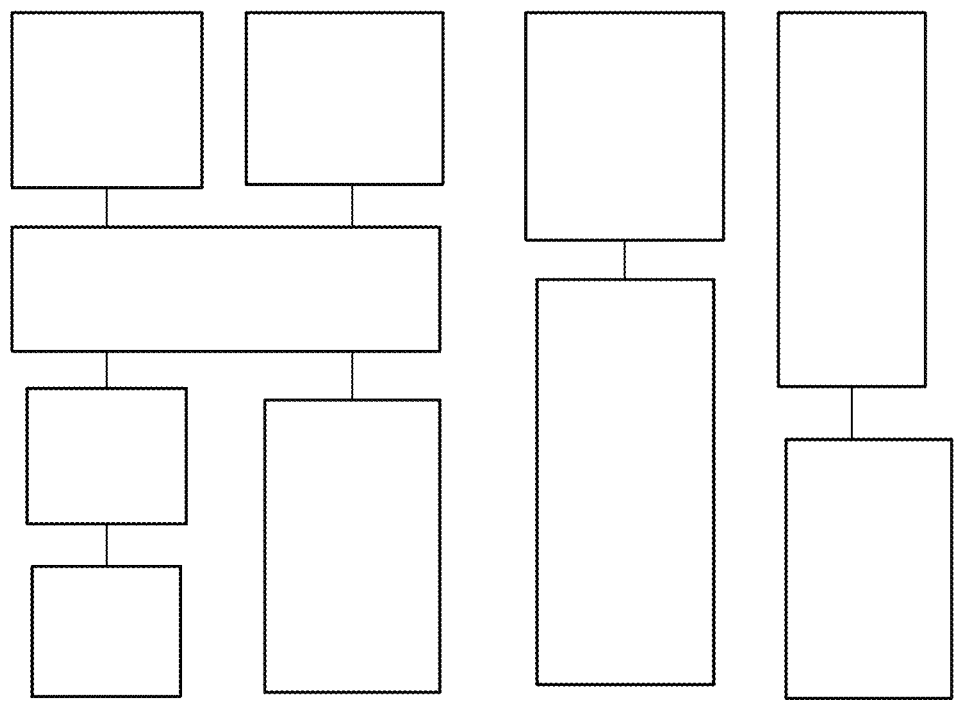
Figure 14C:
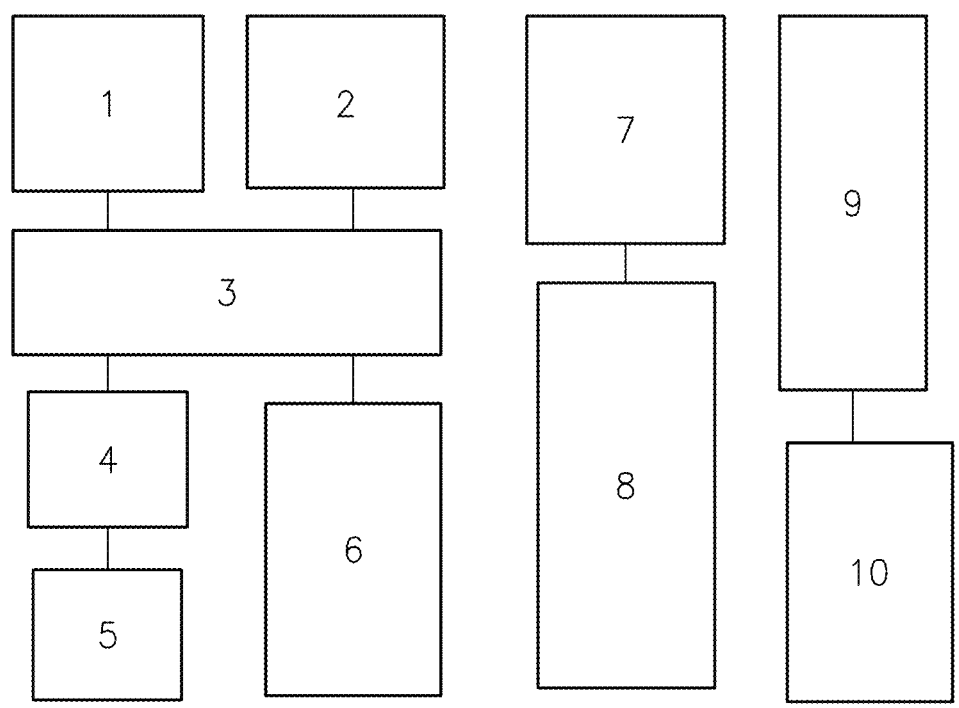
Figure 15A:
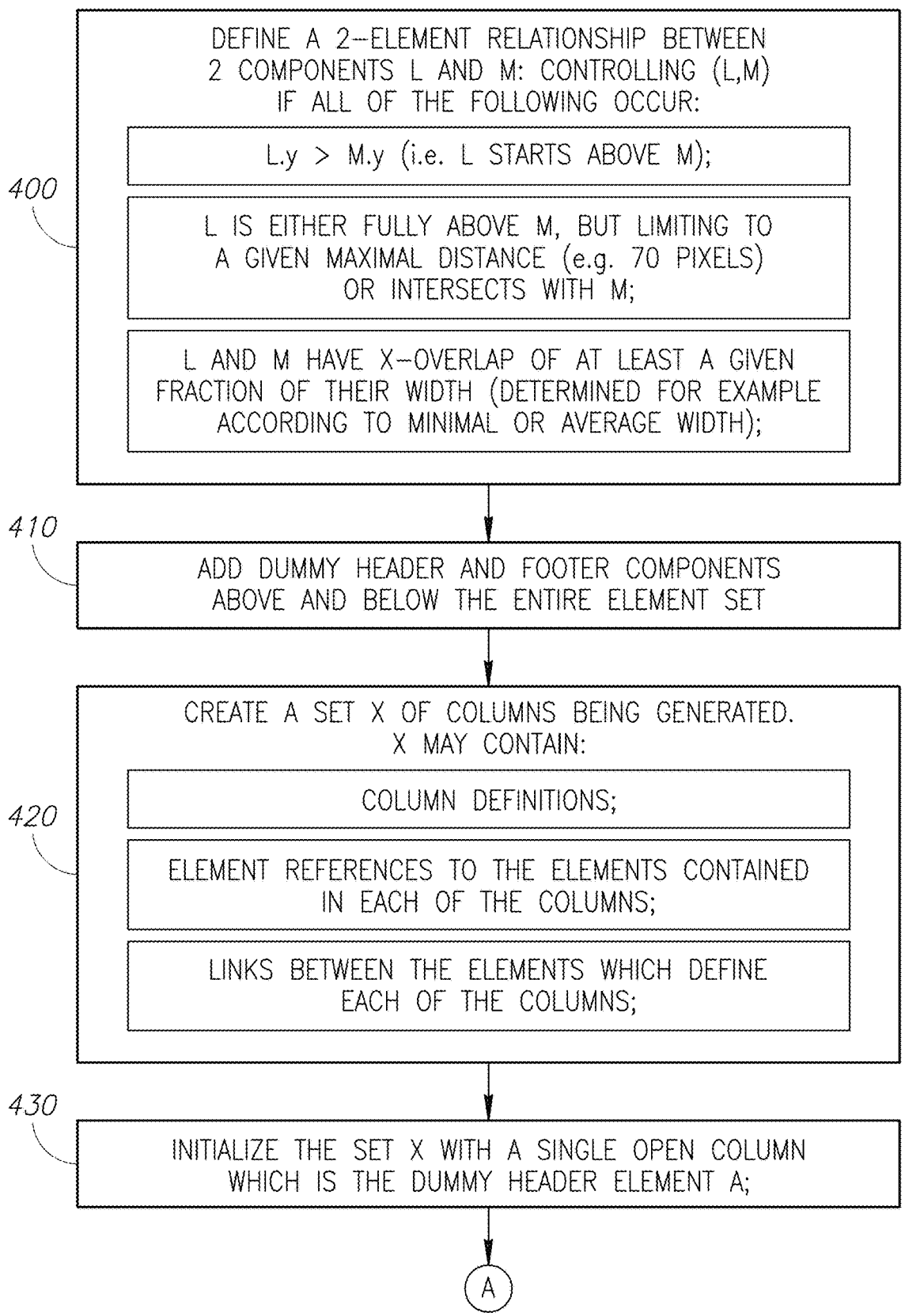
Figure 15B:
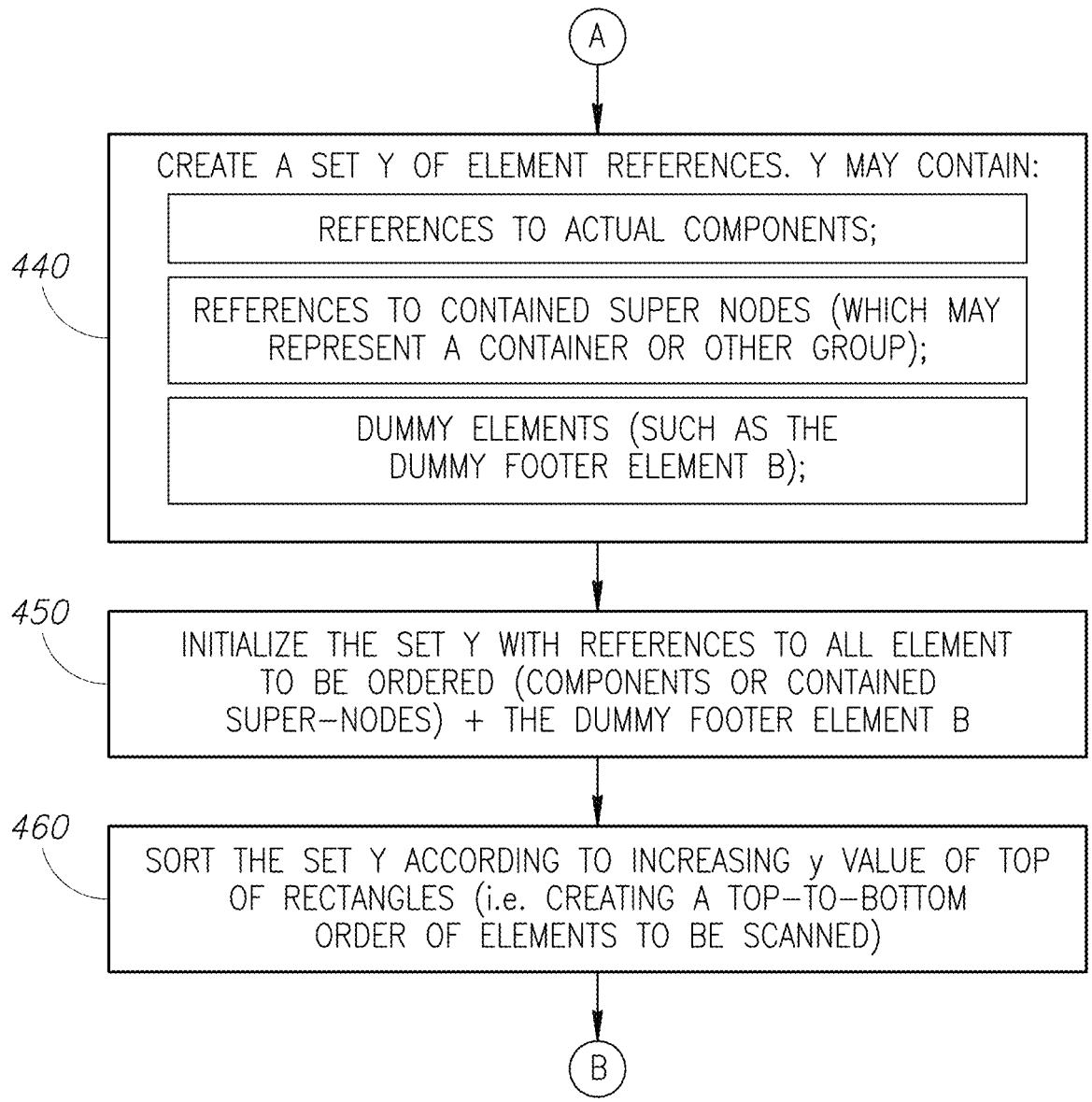

Primary direction with split and merge orderer 242 (herein PDSM orderer 242) may also pre-define a primary direction and may also try to track any row/column splitting and merging. This may be considered more common for columns as opposed to rows. Reference is now made to FIGS. 14A, 14B and 14C which illustrate components (1-10) within a super-node. It will be appreciated that the components may be ordered according to their order in the generated column graph within the node. PDSM orderer 242 may essentially convert a set of rectangles (as shown in FIG. 14A) to a graph of columns (which may merge, split or continue as shown in FIG. 14B) which is then used to generate a ordering of the components (as shown in FIG. 14C). The rectangles may possibly intersect.

Figure 16A:
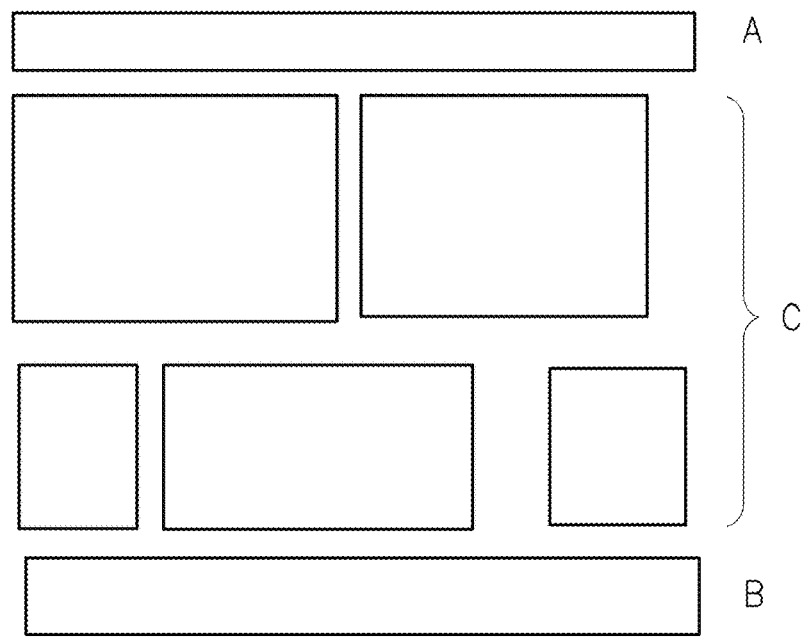
Figure 16B:
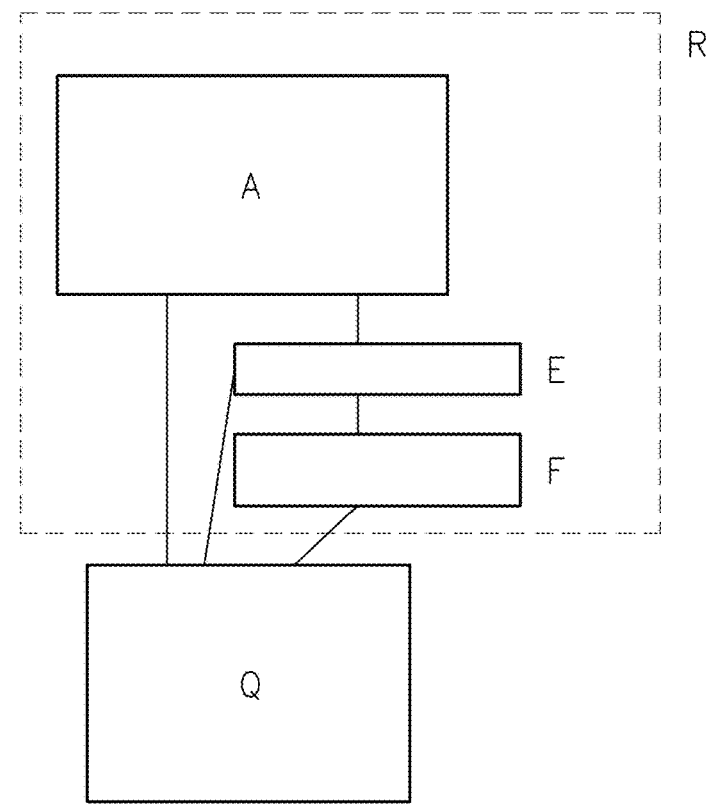

Reference is now made to FIGS. 15A, 15B and 15C and FIGS. 16A, 16B, 16C, 16D, 16E, 16F and 16G which illustrate the steps taken by PDSM orderer 242 to define a column graph and the resulting order. FIG. 16A illustrates a set of elements C which need to be processed. PDSM orderer 242 may define a 2-element relationship between the elements in the set (step 400) and then may "sandwich" the elements to be ordered (set C) between a dummy header element A and a dummy footer element B (step 410) as is shown. PDSM orderer 242 may then create two new sets—set X of the generated columns (in their current state) (steps 420 and 430) and their elements and a set Y of elements to be processed into columns (steps 440 and 450). PDSM orderer 242 may then scan the elements of set Y from top to bottom according to their y-order (step 470) and for each element Q in set Y select a subset R of the elements (in all columns in X) that control Q. Reference is now made to FIG. 16B which illustrates how elements A, E and F all control Q. PDSM orderer 242 may then remove any duplicates from set R. As can be seen in FIG. 16B, as well as A, E and F all controlling Q, A controls E and E controls F. In this scenario the only connection required by PDSM orderer 242 may be the connection between Q and F (the last controlling element). It will be appreciated that if R is empty, this may be considered the beginning of an orphan column with no connection and therefore a new column is opened in X with the element Q as is illustrated in FIG. 16C to which reference is now made. It will be further appreciated that if R has more than one element, PDSM orderer 242 may connect element Q to the columns containing each of the elements C1 . . . Cn, creating a column continuation (if connected at end of column) or column split (if connected in mid-column) for each. If there is more than one such column, PDSM orderer 242 may merge the columns as is illustrated in FIG. 16D to which reference is now made. As is shown in FIG. 16D, PDSM orderer 242 may merge columns G and H into a single column continued by element Q. Reference is now made to FIG. 16E which shows a column G which continues from an element which is not the last element in column G. In this scenario element Q creates a split in column G creating 2 columns continued by F and Q.

Figure 16F:
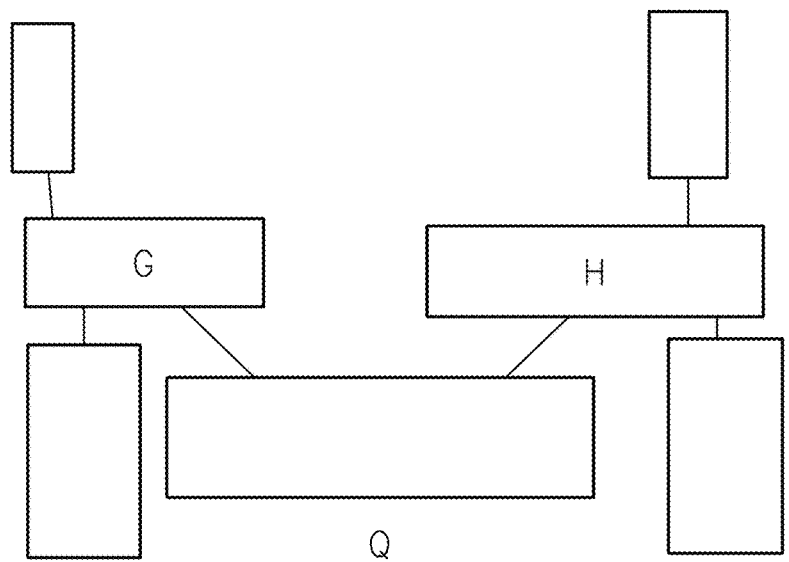

It will be appreciated that when a column splits at a given point, the split set is ordered from left to right i.e. the multiple columns continuing the column which was split have an order defined for them according to the x-coordinate of their left edge. The same applies to column merging. It will also be appreciated that PDSM orderer 242 may have a combined split and merge situation such as is illustrated in FIG. 16F to which reference is now made. As is illustrated, element Q may create a split for the 2 columns containing elements G and H. PDSM orderer 242 may immediately merge the splits into a single column continued by element Q.

Figure 16G:
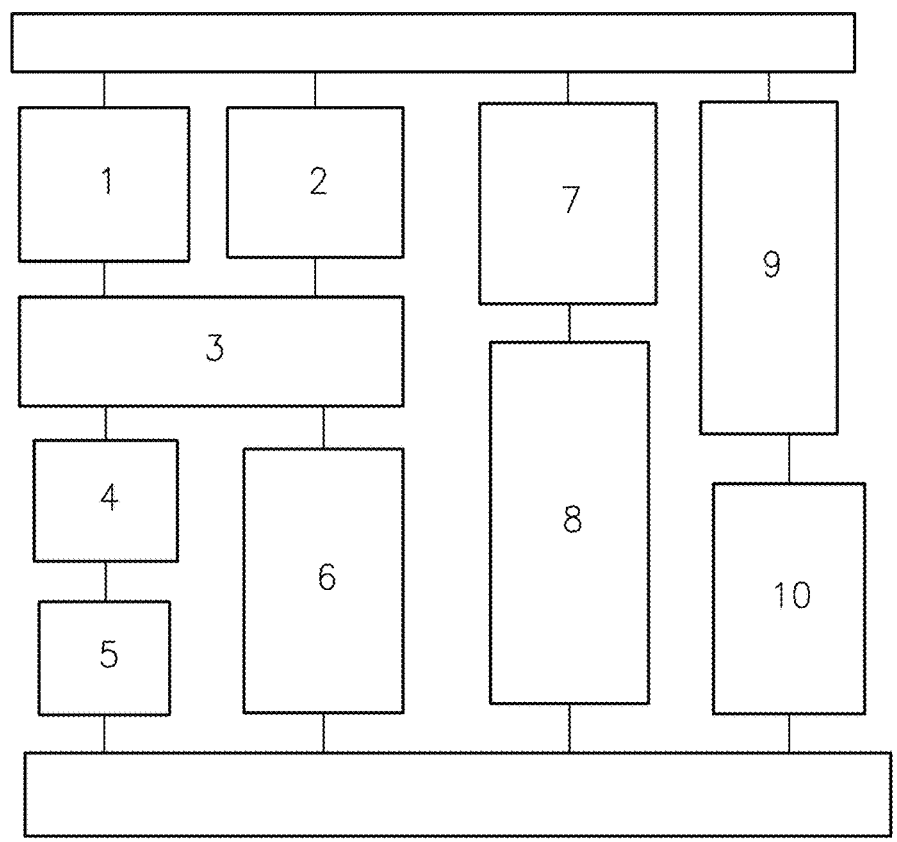

Therefore PDSM orderer 242 may transfer elements from Y to X and connect them to one or more existing columns in X (or possibly creating new columns) based on geometrical criteria. It will be appreciated that this scanning process may create a series of columns in X which may start, split, merge or terminate. The process ends when the dummy footer element B is reached. PDSM orderer 242 may then scan the graph (defined according to the columns in the set X) to calculate the resulting order. PDSM orderer 242 may then arrange the elements according to the order in the graph top to bottom and left to right such as is illustrated in FIG. 16G to which reference is made.

Figure 16H:
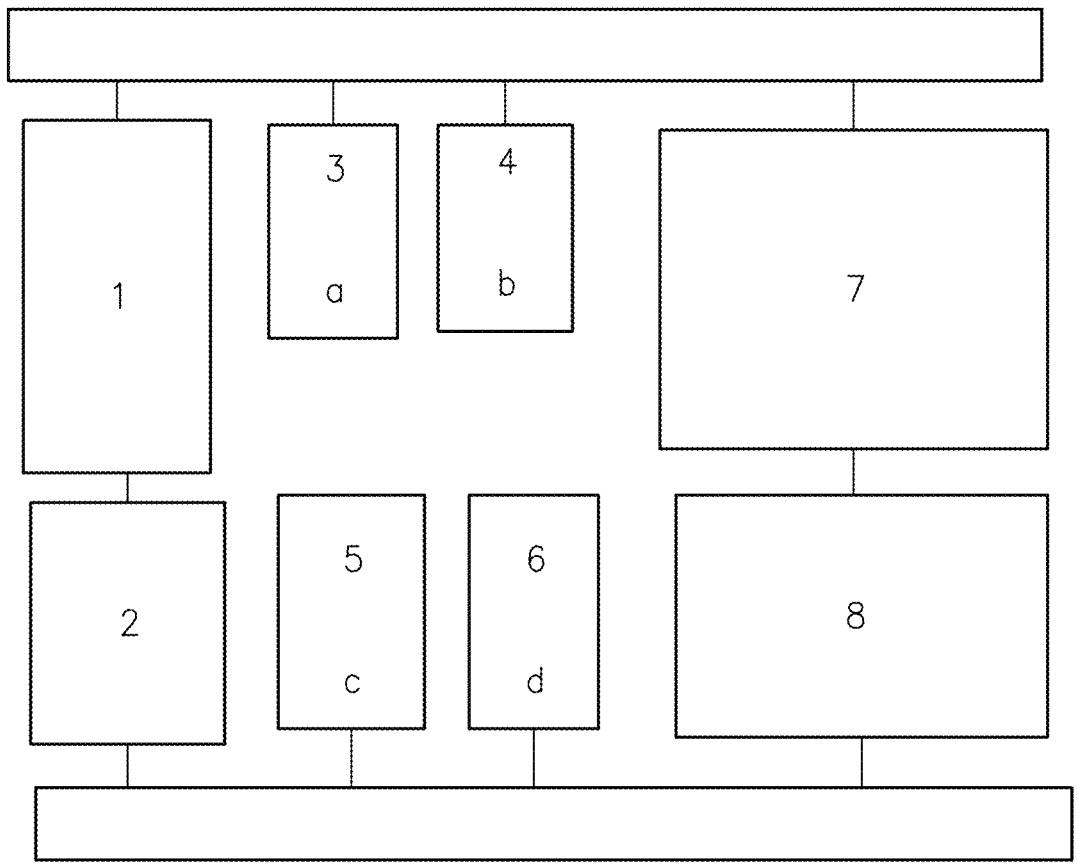

It will be further appreciated that in the case of orphan columns, PDSM orderer 242 may arrange them according to the X order as is illustrated in FIG. 16H to which reference is now made. If the element pairs a-c and b-d are close enough to be connected, they may form complete columns and the order between them may be a-c-b-d and not a-b-c-d. Since they are not close enough, they are not connected causing elements c and d to be orphan columns and the order to the specified number order is modified as described herein above.

It will be appreciated that the functionality of PDSM orderer 242 may be appropriately modified for super-nodes which have content arranged from right-to-left (rather than left-to-right).

Figure 17:
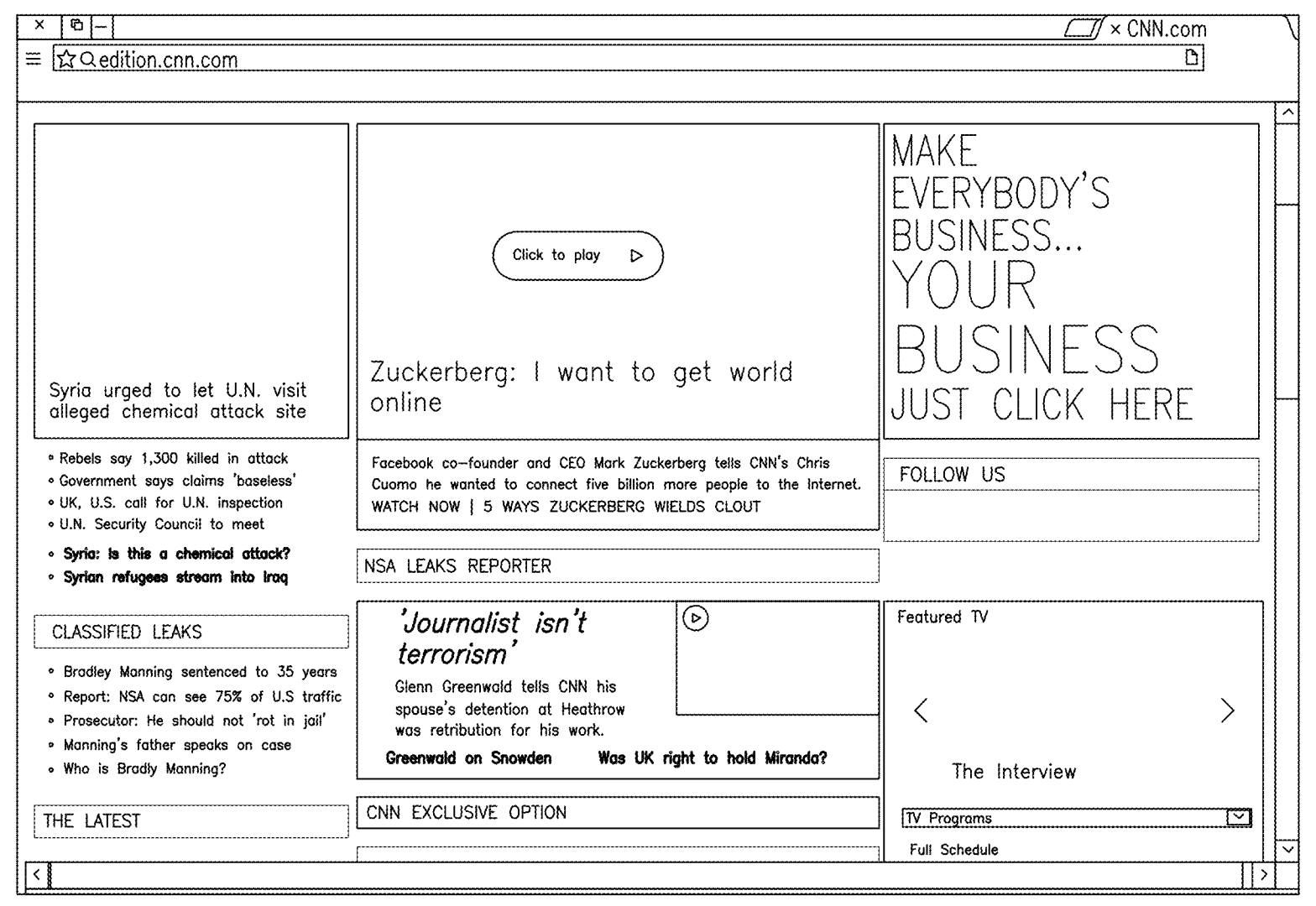

H/V slicer 243 may use alternate horizontal and vertical slicing of the elements in a super-node to create an internal tree of such divisions and thereby define an order of display among the elements. It will be appreciated that such an internal tree is specific to a given super-node and is not related to the general super-node level tree. It will be appreciated that H/V slicer 243 is best adapted to "chocolate table" style sites which are built from horizontal and vertical sections—classical in newspaper layouts such as the example page as is illustrated in FIG. 17 to which reference is now made. H/V slicer 243 may take the element set of a single super-node and create an internal tree of nodes (which are different from the higher-level super-nodes, as each super-node may contain a separate such internal tree). The nodes may be of the following types:

V-nodes (vertically-arranged nodes)—a set of sub-nodes/elements which are arranged from top to bottom.

H-nodes (Horizontally-arranged nodes)—a set of sub-nodes/elements which are arranged from left to right (the right to left arrangement is described herein below).

Leaf nodes—nodes which represent final elements of the internal tree—components or contained super-nodes. A leaf node may contain multiple components which still fit within the allocated width.

UR-nodes (UnResolved nodes)—nodes which include multiple elements which were not arranged yet. This is the initial state of any node before it converted into a V/H/Leaf node.

Each node may contain a set of element references as well as the coordinates and sizes of the underlying elements, and a complete enclosing rectangle for the nodes' elements. The entire collection of nodes (of the four types above) inside a single super-node may be known as an internal tree. It will be appreciated that H/V slicer 243 may adjust the procedure for super-nodes which are specified or detected as containing right to left (R2L) material or having a R2L layout.

H/V slicer 243 may on an initial call, create an internal tree with a single UR-node and place references to all elements in the super-node inside it. H/V slicer 243 may handle the UR node by taking all the elements in the node. If the enclosing rectangle of the elements fits in the allowed width, H/V slicer 243 may convert the node into a leaf node. H/V slicer 243 may also call on element divider 244 which may suggest a specific division (horizontal or vertical) of the elements of the UR-node into sub-groups.

H/V slicer 243 may then convert the UR-node to an H-node or V-node as appropriate. It will be appreciated that for each of the sub-groups returned by element divider 244, H/V slicer 243 may calculate an enclosing rectangle R for the elements in the sub-group. If the width of R fits in the allowed width, then it may create a leaf node descendent of the node N from the sub-group. Otherwise, if the sub-group has more than 1 component H/V slicer 243 may create a UR-node descendent of the node N from the sub-group and handle it accordingly as described herein above (i.e. through a recursive application of H/V slicer 243). If the width of R does not fit in the allowed width, H/V slicer 243 may create a leaf node descendent of the node N from the containing single element sub-group. H/V slicer 243 may then apply width reduction such as resizing, text re-flowing etc. as described herein above.

H/V slicer 243 may then scan the generated internal tree recursively (using depth first scanning) and emit the components (such as the leaf nodes) according to the scanning order. H/V slicer 243 may scan each H/V-node according to its natural order (e.g. top-to-bottom for V-node). It will be appreciated that at this stage, since the basic order of the elements has been generated, the created internal tree for this super-node is no longer needed.

As discussed herein above, element divider 244 may calculate a division for a group of elements. It may calculate an enclosing rectangle for each element, ignoring ornamental borders. Element divider 244 may then project these rectangles onto both the X and Y axis.

Element divider 244 may then divide each set of axis projections into segments with differing numbers of components projected into them. Segments with zero components projected onto them represent gaps in the given projection direction. It will be appreciated that element divider 244 may provide specific (possibly non-displayable) separator line components to help in determining the right splitting direction (e.g. to use as designer hint into the process). Such components may also have an assigned "weight" so they count (for the projected rectangle counting) as one or more components.

Figure 18:
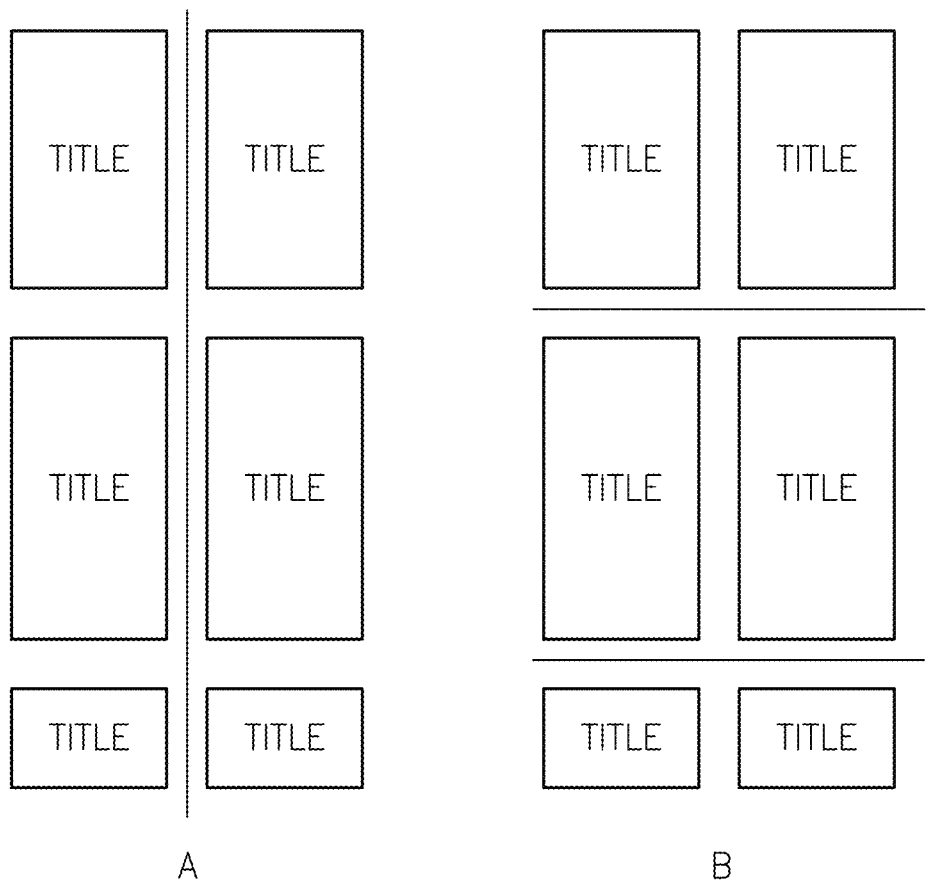
FIG. 18 is a schematic illustration of horizontal and vertical divisions of super-nodes, constructed and operative in accordance with the present invention.

If gaps are found in both directions, element divider 244 may generate the horizontal and vertical divisions of the elements based on dividers orthogonal to the gap segments. For example as is illustrated in see FIG. 18 to which reference is now made, case A is a horizontal division (into columns) using a single divider and case B is a vertical division (into rows) using two dividers.

Figure 19:
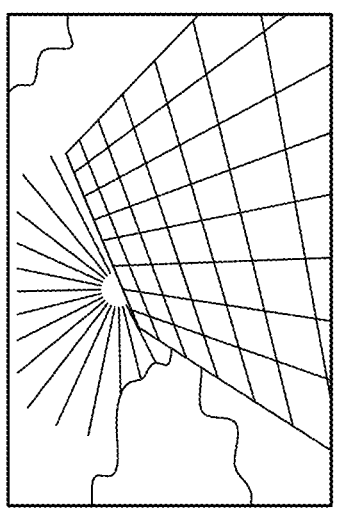
FIG. 19 is an example of evaluating vertical and horizontal divisions based on previous pattern similarity analysis, constructed and operative in accordance with the present invention.

Element divider 244 may calculate a Division Quality Rating (DQR) for each of the two division directions using a weighted average of the maximal number of dividers and the maximal total size of gaps found and the minimal number of cases in which similar elements are broken into separate sub-groups by the division. This information may be available from pattern POS locator 253 (as described in more detail herein below) at the super-node creation stage which defines similarity relationship between descendent super-nodes. As is illustrated in FIG. 19 to which reference is now made, a vertical division (into rows) may be preferable to keep the services/projects/clients boxes (A, B and C) together.

Figure 20:
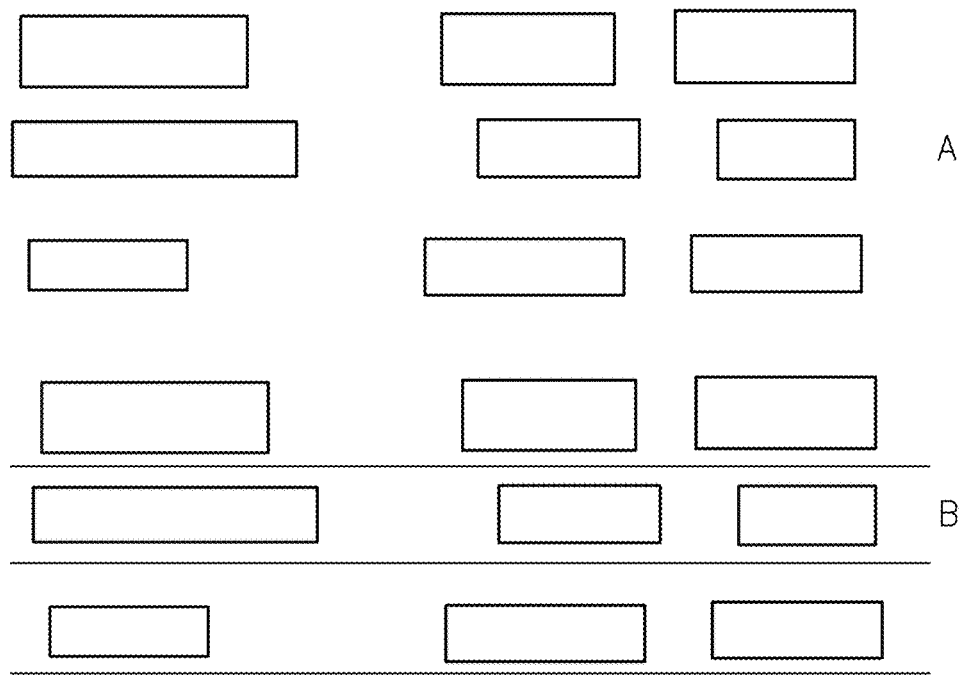
FIG. 20 is a schematic illustration of how a vertical division of super-nodes is preferred as the components are better aligned on horizontal lines, constructed and operative in accordance with the present invention.

Element divider 244 may also take into account in which of the directions the components are better aligned. For example as is illustrated in FIG. 20 to which reference is now made, in scenario A the division should be vertical (i.e. the components are arranged and aligned in rows) even though there are larger gaps when doing horizontal division (i.e., into columns). This can be better observed when alignment lines are added in scenario B.

Element divider 244 may also add a constant preference factor to the horizontal division (which reduces width) vs. vertical division (which does not). Element divider 244 may then return the division with the higher DQR.

Figure 21:
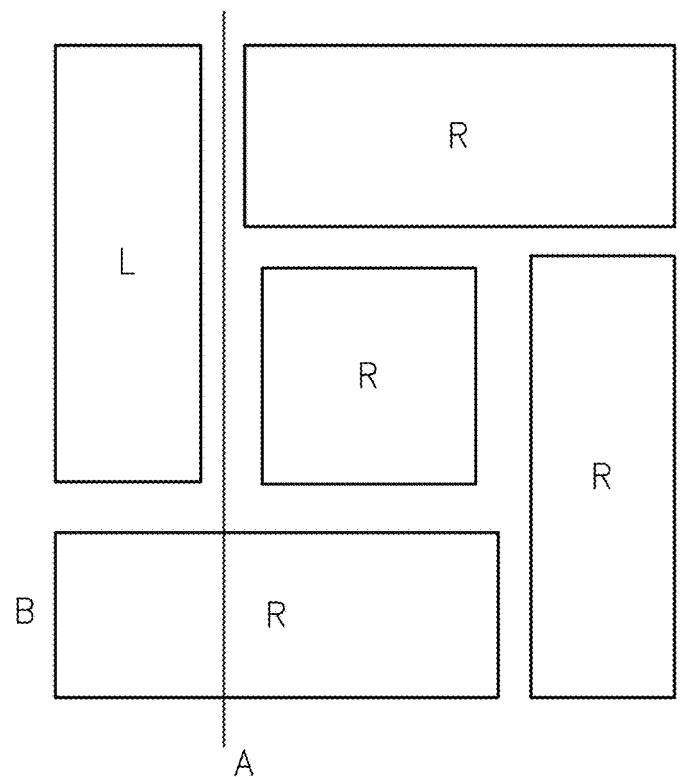
FIG. 21 is a schematic illustration of an interlocking element configuration.

If gaps are found in just one direction, element divider 244 may return the division in this direction. If no gap is found, there may be a case of interlocking elements. In such a case, element divider 244 may create a divider that crosses one of the elements. For example, as is illustrated in FIG. 21 to which reference is now made, the elements are divided using the vertical divider line A which may cross element B only. All elements marked R may be associated with the right side of the division (including element B), and element L may be associated with the left side of the division.

It will be appreciated that in this scenario, element divider 244 may find the projection segment (from the projection segments in both the X and Y axes) that has a minimal number of crossed elements. If there is just one such segment, element divider 244 may define a division based on it. If there are two or more such segments (in either directions) having identical minimal number of crossed elements, element divider 244 may create a set of single-divider divisions based on one of the segments having the minimal number of crossed elements.

For each of these divisions, element divider 244 may then calculate a DQR based on a weighted average of the criteria for the regular DQR calculation (as discussed herein above), the minimal area of the crossed element and the definitiveness of the cut, i.e. having the minimal percentage of the crossed element area on one side of the crossing divider, so that the crossed element belongs more distinctively to one of the two sides of the divider. Alternatively, element divider 244 may use the division with the highest DQR.

Element divider 244 may then return the selected division, with each crossed element attached to the side of the divider which contains the larger area of the crossed elements.

In an alternative embodiment, element divider 244 may try to create multiple dividers based on the multiple projection segments having the same number of crossed elements and evaluate the divisions containing multiple such crossed elements.

It will be appreciated that element divider 244 may call an alternative DQR calculation recursively for each of the possible divisions and may check the DQR value of divisions created after each of the potential divisions is attempted. It will be further appreciated that in this manner, element divider 244 may find the best single element to cross so that further divisions may be successful.

It will be appreciated that in parallel to basic orderer 247, POS locator 250 may detect sets of components which are related in some way and should possibly remain together when the elements are re-ordered for a mobile device display. For example, the components may be a text heading and the matching text paragraph.

Cluster POS locator 251 may detect a cluster partial order set when the components (of any type) are very close together compared to the regular spacing between components in a particular super-node. Cluster POS locator 251 may calculate the average distance between components in the super-node and then loop on all component pairs in the super-node, searching for component pairs whose distance is a given fraction of the calculated average distance. Cluster POS locator 251 may then unite these component pairs into sets, enforcing a maximal given distance between the two most distant components in each such set (specified as a fraction of the average distance). Cluster POS locator 251 may also use a mean or median calculation instead of the average calculation in order to take into account a given number of outliers which may distort the average distance value. In an alternative embodiment, cluster POS locator 251 may use any clustering algorithm known in the art. POS locator 251 may then check the extracted clusters and if dense enough (e.g. the maximal distance between cluster members is below a given certain threshold), create a cluster partial order set.

Semantic relationship POS locator 252 may detect a semantic relationship partial order set when there are specific combinations of components of given types which are close together for example a picture and its caption. Semantic relationship POS locator 252 may scan all possible pairs of components within the super-node and for each potential pair, check that each of the components has the right type (e.g. one is text and one is picture), that the components are close together (distance is below a given threshold) and that there is no intervening component between them. Semantic relationship POS locator 252 may check that for an evaluated pair of components [A, B], that there is no third component C which may replace B, is of the right type for B and is closer to A than B. The same applies for the relationship between A and C.

Another combination of pairs of components may be text and a button partial order set. It will be appreciated that in this scenario, semantic relationship POS locator 252 may link a button describing a text field to the actual text field. It will be appreciated that the relationship may be determined according to position only.

Another combination may be text joining partial order set. In this scenario, semantic relationship POS locator 252 may merge multiple text elements which continue each other. It will be appreciated that semantic relationship POS locator 252 may only recognize one text element being above another text element. It will be further appreciated that there may be any number of such elements in a given set—not just 2—which are all linked together.

Figure 22:
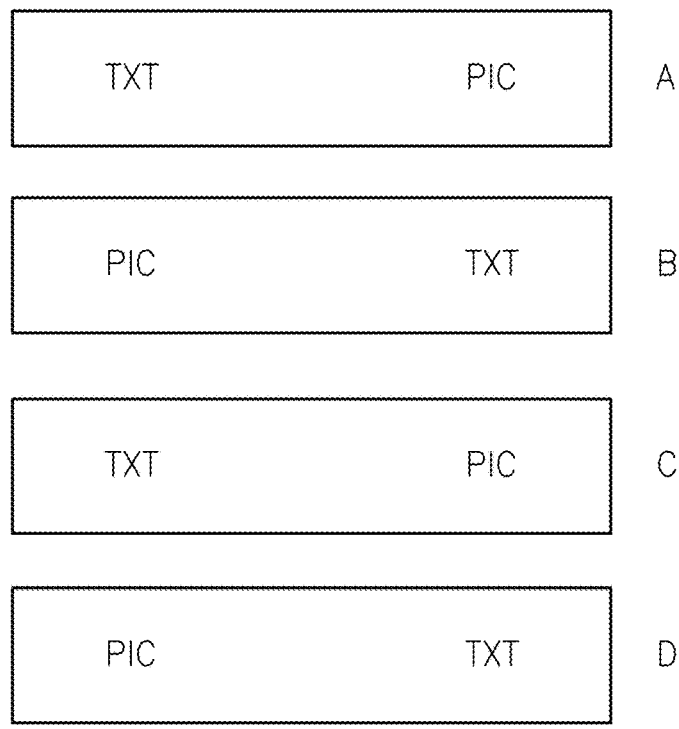
FIG. 22 is a schematic illustration of component pairs having switched locations.

Pattern POS locator 253 may detect a pattern partial order set when there is a repeating pattern of a given number of components (e.g. component pairs or triplets) having specific type, properties and layout at a given distance. Pattern POS locator 253 may also detect pattern partial order sets in the case of switched patterns such is illustrated in FIG. 22 to which reference is now made. Component pairs A and C have text on the left and picture on the right, whereas component pairs B and D have text on the right and picture on the left. Pattern POS locator 253 may detect such a pattern based on component pairs having specific types and properties, but with the horizontal distance being one of two options (negative or positive numbers having the same absolute value) in each of the component pairs. Pattern POS locator 253 (in the example of 2-member patterns which may be unified later), may scan all components in the super-node and for each component; locate its closest neighbors on all four sides of the component. Pattern POS locator 253 may include neighbors which overlap the component up to a given specified threshold limit. Pattern POS locator 253 may then save a list of relationships between components and their neighbors and then scan the generated list of relationships and select pairs of relationships which are similar according to the following attributes: the components have the same types (e.g. a component [pic,txt] is similar to another component [pic,txt]), the components have the same direction (including reversed directions if switched patterns are supported) and similar distance (subject to a given threshold for difference).

Figure 23:
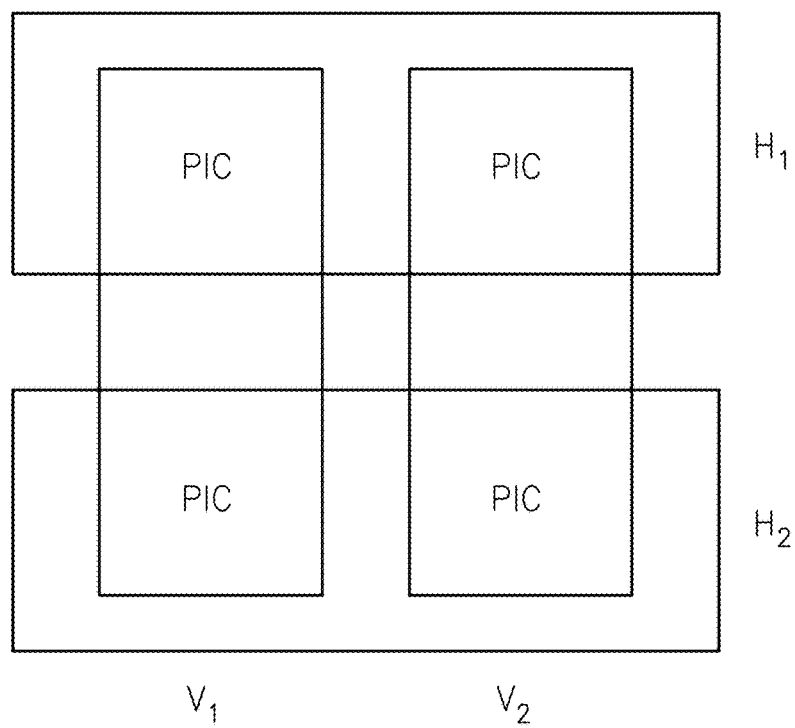
FIG. 23 is a schematic illustration of how four picture components can be divided into pairs in two ways.

It will be appreciated that two components in a selected relationship should have different types—otherwise a set of four components of the same type arranged in a square would generate two conflicting sets of similar relationship pairs. For example as is illustrated in FIG. 23 to which reference is now made, the four picture components may be divided into pairs horizontally (pair associations H1, H2) or vertically (pair associations V1 and V2).

Pattern POS locator 253 may scan the list of selected relationships and combine them into sets (e.g., if r1=r2 and r2=r3, it may create the set [r1,r2,r3]). Pattern POS locator 253 may also remove duplicates. It will be appreciated that a single set of patterns (e.g. a set of multiple [txt,txt,pic] component sets) should be handled together.

Predefined POS locator 254 may detect partial order sets which are created based on specific hints which may be provided by the application designer or within the original application template. Such hints may take a number of forms. Specific composite components which include predefined partial order system hints, such as a "picture+text caption" component may include the coupling of the two into a predefined partial order set. Another hint may be the explicitly specified association of arbitrary components in the page or a mobile-related association derived from other forms of association available in a visual design system such as grouping for editing, as many visual design systems have the ability to associate components in groups so they can be moved, resized or otherwise modified together. Another association may be dynamic layout anchors since visual design systems may support dynamic layout anchors (explicitly specified or automatically created from the layout definition). Such anchors may serve additionally as hints for partial order set creation. Yet another association may be templates—sets of components created from multiple instances of the same multi-component template.

It will be appreciated that Predefined POS locator 254 may provide both predefined groups and predefined partial order sets. These are different elements of the system, and predefined POS locator 254 may allow the designer to specify predefined group hints (used for grouping components into a virtual super-node) as well as predefined partial order sets/ordering hints (used to guide the ordering process).

ESI-based POS locator 255 may detect the automatic creation of partial order sets based on the ESI (if available). In particular, ESI-based POS locator 255 may associate together (into one partial order set) components based on information collected from previous editing sessions such as sets of components which have been created using duplication or copy and paste, sets of components which have been grouped together and edited together (e.g. when the visual design system only supports ad-hoc grouping for editing which is not preserved in the database) and sets of components which have been edited in sequence.

Once orderer 240 has created a basic order and POS locator 250 has determined any partial order sets, order integrator 245 may integrate the basic order and the detected partial order sets to create a merged modified order (which is a total order for all involved elements), resolving contradicting partial order sets along the way.

It will be appreciated that some of the elements of basic orderer 247 may not create a complete order between all components, but rather may divide the page/super-node into page sections which fit into the allowed width. This may be relevant when there is a need to maintain the basic structure, e.g. when converting an application to a device (e.g. table, large display) having a width similar to or larger than the desktop display. In this scenario, a complete decomposition into components arranged on a line might destroy the basic underlying component arrangement, and minimal "slicing" might be visually superior. In order to do this, the elements of basic orderer 247 may be modified so as to work on page sections (which still fit into the available width) rather than separate components.

Basic orderer 247 may then use this information as a guideline so that page sections which are connected via substantial POS connections are not sliced.

It will be appreciated that super-node creator 230, basic orderer 247 and POS locator 250 may further create results which contradict each other. For example, one of the sub elements of POS locator 250 may generate a specific partial order set definition involving some elements, and another element may generate a different and contradicting partial order set definition. Order integrator 245 may merge results from the different elements and may also resolve any conflicts in order to create a single output.

It will be further appreciated that in order to resolve such conflicts, super-node creator 230, basic orderer 247 and POS locator 250 may all use a quality score. For example, a design based on explicit designer requests may typically have the maximal quality score, as it can be assumed that the designer is fully aware of the composition of his design. It will be appreciated that super-node creator 230, basic orderer 247 and POS locator 250 may all check their scores against quality scores held by scorer 500 which may provide for each generated result a certainty score of how much the element is certain sure about the correctness of the specific result based on the analyzed parameters.

Order integrator 245 may collect the results from basic orderer 247 and POS locator 250 and attempt to integrate them. It will be appreciated that results which do not contradict each other may simply be combined. Results which do contradict each other may require order integrator 245 to select which one to use. This may be done according to a calculation of the combined quality and certainty scores for the particular result. Results may be discarded if they do not meet a given (optional) certainty threshold.

Order integrator 245 may also take into account additional information such as results which are defined over components residing in a template which may have a higher certainty than results which only include components defined in the current page (e.g. due to the templates being better designed than regular pages). It also may take into account results which may be similar to results found in previous pages or super-nodes that have been handled before and therefore may be assigned a higher certainty.

Order integrator 245 may be extended so as to learn the structure of pages created by a given designer, possibly using feedback from that designer to rate element results.

It will be appreciated that a particular element may return a set of results which should be implemented together or not at all. For example, pattern POS locator 253 may find a repeated pattern of components. Such a pattern should be used for all components involved, or not at all.

Once the components have been ordered accordingly, placer 270 may then place the components and any automatically-added components (as described in more detail herein below) in their appropriate position in the page. It may place the ordered elements as needed on component lines so as to fit into the available width according to the determined total order and allowed space. It will be appreciated that the available width may be defined by the width of the page super-node, minus any predefined margins and other constraints, such as reserved spaces. Por example, given the main page width is 320px, the m 10px for left and right, and no reserved spaces, then the available width of the main page super-node would be 320−(2*1.0)=300px. A page super-node that is contained in the main page super-node and that takes the maximal available width, would have the available width of 300−(2*10)=280px etc.

Placer 270 may apply layout hints attached to the component as part of the desktop layout configuration if larked as "retain in mobile layout configuration". Such components may function more similar to automatically-added components, in that they become part of the container basic structure, which may drive the component line building, rather than being part of the component lines themselves.

Placer 270 may then create line breaks according to explicit hints (e.g. "put this group/POS on a separate line") created by super-node creator 230 and orderer 240. When an added component exceeds the available width (taking reserved spaces into account), placer 270 may try to keep component groups together, i.e. if needed create a line break before a group so that entire group would fit on the same component line. Placer 270 may avoid adding a line break so as to break between components having a semantic relationship (as detected earlier, e.g. by the POS locator 250).

Figure 6:
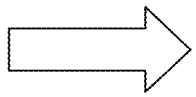
FIG. 6 is an illustration of a required text re-flow due to font size and field size change.

Placer 270 may also apply width-reduction means to each element according to its type. Width reduction means may include modifying components which may be adapted (e.g. text components) according to the component type—including re-scaling, font size change, text re-flow etc. Width reduction may also use the prescribed handling method for each virtual super-node according to its type. These width-reduction means may also include transformations similar to those performed by component adjuster 227 (as a pre-processing stage)—which may now be performed with the added information about the final position and size of the components in the mobile layout configuration. Placer 270 may also perform width enlargement, e.g. to enlarge a component that was placed alone in a component line Placer 270 provides specific resizing means for specific element types. For example, placer 270 may resize super-nodes representing text over image groups (as located by the text over image group locator 234) by using the background image as a virtual container. Next the text is resized in order to reach the desired height and width. This includes font size mapping and text re-flow which might change the text component aspect ratio (e.g. making a longer text component with larger characters inside) as is illustrated in FIG. 6 to which reference is now made. As is shown, when moving from scenario 1 to scenario 2, the font size is increased while the field width has been reduced—requiring a text re-flow. Text over image group locator 234 may also resize the group when the background image is resized to the next text size—typically changing the aspect ratio.

Figure 7:
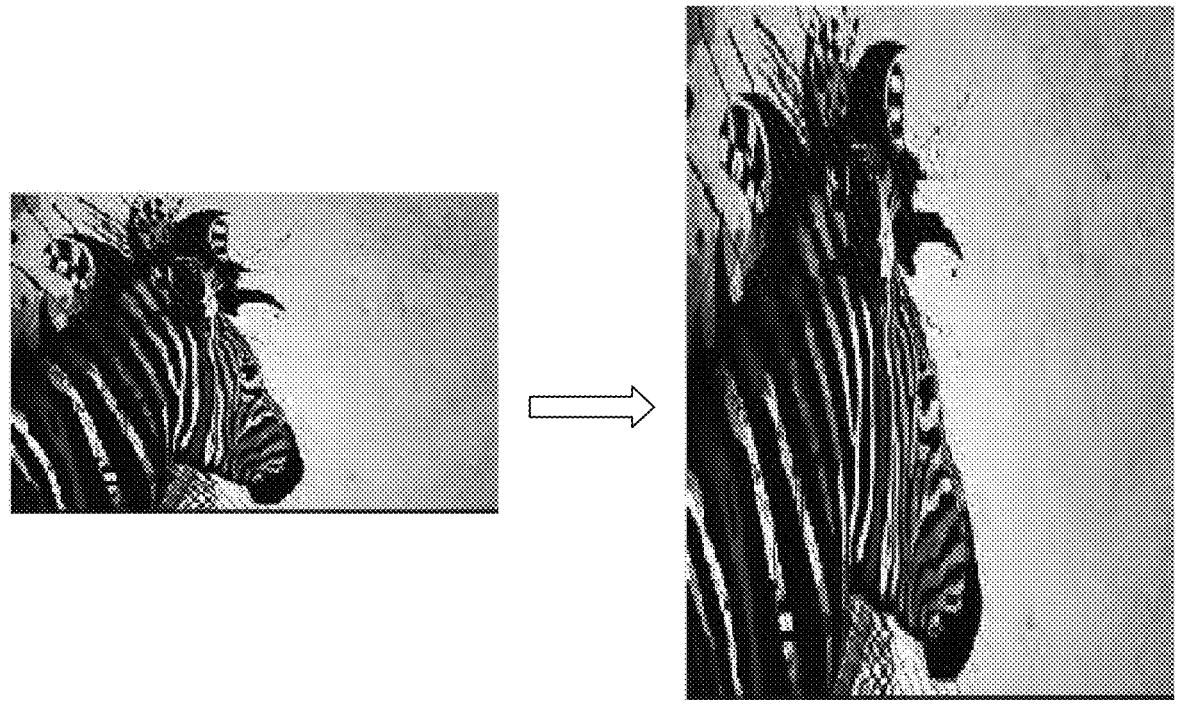
FIG. 7 is a picture which does not look correct when resized without preserving the aspect ratio.

It will be appreciated that this could cause a "visual accident" if the picture has an actual content which would not look good when the aspect ratio is modified (e.g. a picture of a person) such as is illustrated in FIG. 7 to which reference is now made. Text over image group locator 234 may attempt to solve this problem by checking the image content to see if it contains detailed information or by preserving the internal aspect ratio of the image by zooming and clipping the image instead of re-sizing.

Some components have a degree of autonomy in performing their own resizing. For example third party application components (which may support multiple variants having different display sizes) and list applications (which may have multiple view associations). Such components perform their own resizing, based on a target size provided by placer 270.

Placer 270 may also resize/repeat the decoration image as needed to fit the new page size. If the page exceeds a given length parameter, placer 270 may possibly create a page-internal navigation menu and add it as a separate menu to the page, or to any of the existing unified menus as appropriate.

Placer 270 may re-scale both height and width, keeping the aspect ratio of the component. Some components may retain their height and only change their width (e.g. galleries which are modified to use fewer columns). Components which have to use a specific height when rescaled (e.g. map component which have internal scrolling and must thus leave margin above and below them for page scrolling instead of map scrolling) may be handled appropriately. It will be appreciated that width decrease may be handled in the same manner.

Placer 70 may also apply width reduction/enlargement processes to components as well as recursively to super-nodes and their descendants. The processes may include resizing of the actual component, text font-size mapping, text re-flow and text reduction by splitting it into visible part and "show more" extension (which is only displayed when requested). Other processes may include switching components to "lighter" mobile versions, modifying component parameters to change their width. Processing may also include resizing components to reflect the actual size used.

Once placer 270 has placed the pertinent components in their correct positions within the mobile configuration layout, post processor 202 may handle any final layout adjustments.

Automatically added components inserter 281 may insert automatically added components into the new mobile layout configuration such as system menus or other mobile related widgets which may be added to all or some converted applications (in all or some of their pages). Such inserted automatically added components may also include (for example) advertisements and/or other promotional material. Such inserted automatically added components may be required (i.e. always insert them) or optional. In the latter case they may be inserted conditionally—based on parameters or combination of parameters such as (for example) user type or profile (e.g. insert a specific automatically added components for all users in Europe) or per mobile device type or profile (e.g. insert specific automatically added components for all android-based users having screen size of 480×320 or larger). They may also be based on specific page parameters or conditions (e.g. insert specific automatically added components for pages which do not contain a picture component of size 320×200 or larger), user behavior or application use history, availability of space to insert the automatically added components, any designer defined parameters and website building system defined parameters.

It will be appreciated that automatically added components inserter 281 may place such automatically added components in a number of ways. It may place them as absolute-position automatically added components which are inserted in a given position in the page or in specific containers (i.e. super-nodes)—typically using a reserved space as described herein below. Automatically added components inserter 281 may also insert them as relative-position automatically added components inserted in a given position relative to some page elements (e.g. pre-defined components, components located via query etc.) This is similar to the insertion of components at the mobile layout configuration level as described in more detail herein below.

Automatically added components inserter 281 may also add automatically added components as remaining-space automatically added components which are inserted based on space availability in the layout. Since components are sometimes moved to a separate component line, in some cases there are additional vacated spaces in the mobile layout configuration compared to the desktop layout configuration which may be used for such automatically added components.

Figure 24:
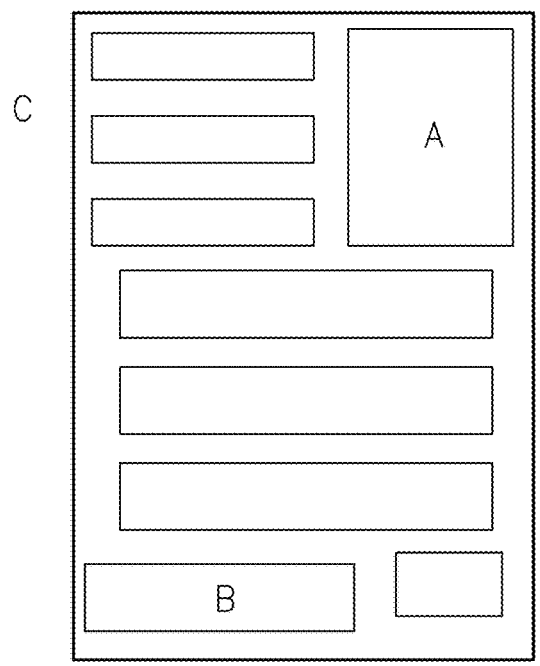
FIG. 24 is a schematic illustration of a non-rectangular display shape remaining after carving out automatically added components.

It will be appreciated that in the case of absolute position automatically added components, automatically added components inserter 281 may be required to reserve specific space on the mobile display area for these elements—carving out the area from the rectangular mobile display area allocated to the page/super-container and reserving it. Thus, the area used for component lines may be non-rectangular. Reference is now made to FIG. 24 which illustrates how the area remaining in the main container C after carving-out the reserved area for automatically added components A and B is a non-rectangular shape.

It will be appreciated that the pertinent visual design system may also support dynamic layout including the use of explicit (designer-specified) anchors as well as implicit (automatically created) ones as described in U.S. Patent Publication 2013-0219263 entitled "WEB SITE DESIGN SYSTEM INTEGRATING DYNAMIC LAYOUT AND DYNAMIC CONTENT", published 22 Aug. 2013 and assigned to the common assignee of the present invention. Thus, the visual design system may have anchors (both implicit and explicit) which may be broken due to the re-arrangement process inherent to the adaptation to mobile device width.

Figure 3:
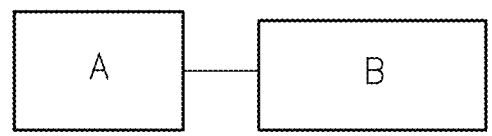
FIG. 3 is a schematic illustration of dynamic layout anchor breaking when components are moved.
Figure 3:
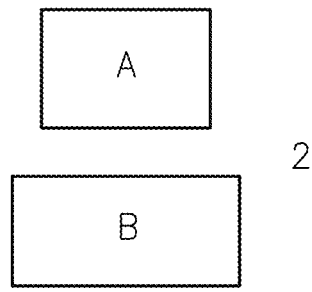

Once the components have been placed accordingly, dynamic layout—coordinator 284 may modify any existing dynamic layout anchors according to the new layout. For example, dynamic layout coordinator 284 may remove the anchors for components which have been moved in such a way as to make the anchor irrelevant as is illustrated in FIG. 3 to which reference is now made. As is illustrated, the horizontal anchor which exists between components A and B in scenario 1 should be broken when B is moved to be below A in scenario 2.

Dynamic layout coordinator 284 may also retain the anchors which may be retained (e.g. component sets which were not modified, inside containers which were not modified etc.) Dynamic layout coordinator 284 may also modify the anchors which may be retained but would need their parameters modified (e.g. anchor length change for components which were moved closer together). Dynamic layout coordinator 284 may also create new dynamic layout anchors between components placed in proximity (e.g. one above the other)—including both component-to-component and component-to-container anchors. This may be based on the automatic anchor creation criteria built into the system (e.g. based on amount of overlap and distance between components).

It will be appreciated that the newly created anchors are important since the mobile-adapted application may still be an absolute-coordinates visual design application. Thus, the mobile-adapted application may have to be dynamically modified due to changes such as modifications to the content of a component such as the amount of contained text. These may include changes originating from an external source (e.g., external data feed, concurrent user activity, switching between data records in a list application). Dynamic layout coordinator 284 may have to implement changes to further adapt to small modifications in the screen size of the target mobile device. Thus dynamic layout coordinator 284 may modify the anchor structure and may also implement a new anchor structure for final adaptation.

It will be appreciated that the resulting alternate layout (including the grouping, POS and ordering information) may be stored in database 50 together with the application or separately for further use, or as the basis for further modifications as described herein below.

Displayer 290 may display the newly modified layout on the target platform.

As discussed herein above, layout reconverter 300 may merge modifications performed on a given desktop layer configuration and modifications to its parallel shadow mobile layout configuration to create an updated mobile layout configuration.

It will be appreciated that once initial layout converter 200 has run, two (or more) versions of the application exist—the desktop (main) layout configuration and the one (or more) mobile (shadow) layout configuration. It would be appreciated that when referring to a mobile (or shadow) layout configuration, we may be referring to other additional configuration such as these related to tablets, wide-screen display etc. A designer may then apply (separate) modifications through the pertinent visual design system editing tool to both the desktop and mobile layout configurations, creating a modified version of each. The visual design system may provide a single editor for both versions (possibly constrained when editing a mobile layout), or separate desktop and mobile site editors.

Since the mobile layout configuration is derived from the desktop layout configuration, initial layout converter 200 may apply modifications (such as addition and deletion of pages and components as well as component content change) made to the desktop layout configuration to the mobile layout configuration. Reconverter 300 may merge any desktop layout configuration modifications and any separate mobile layout configuration modifications into the modified mobile layout configuration in order to create a final mobile layout configuration to be displayed to mobile users, keeping the content of the mobile layout configuration better coordinated with the desktop layout configuration. It will be appreciated that this procedure may be complicated since (for example) if a component is added to the desktop layout configuration which should also be added to a modified mobile layout configuration (whose components may have been moved, resized or deleted including being moved from, into or between containers) reconverter 300 has to determine the appropriate position to place the added component within the modified layout configuration as well as the layout to be used for the added components themselves.

It will be appreciated that in this scenario, any mobile layout configuration modifications are not merged back into the desktop layout configuration. While editing the desktop site might change the mobile site, editing the mobile site will not affect the desktop site. It will also be appreciated that pure layout changes (i.e. changes in position and size) made to either the desktop layout configuration or to the mobile layout configuration may not affect the other layout configuration—as opposed for example to component content changes or removal (which affect the mobile layout configuration if performed in the desktop layout configuration). It will be further appreciated that system 100 may limit mobile editing so that components may be removed (or hidden) from the mobile layout configuration but cannot be added or have their content edited—except possibly for some mobile oriented componentsas discussed in further detail herein below. Thus (for example), a mobile editor may not allow a component in the mobile layout configuration to be moved from one page to another, since this may entail adding components to a page.

Figure 25:
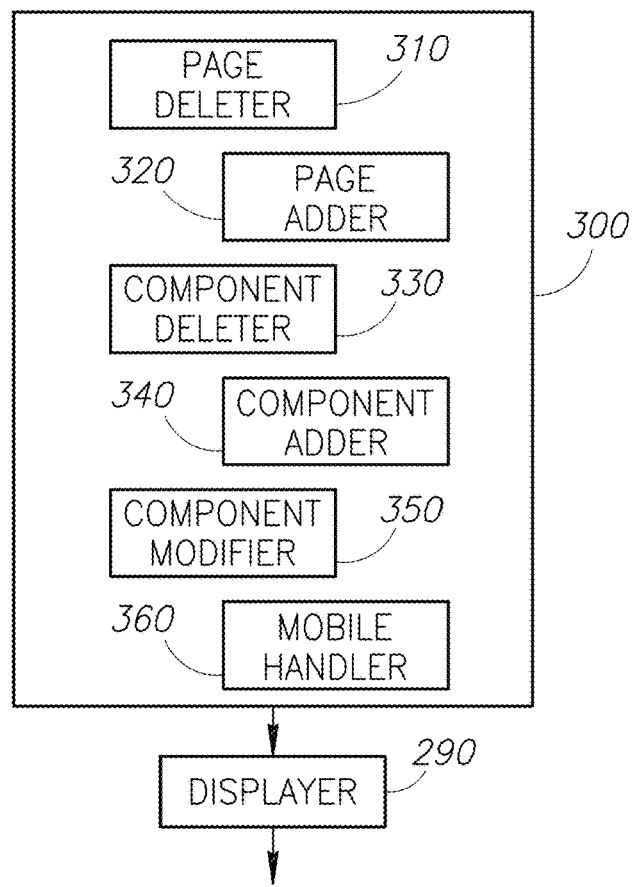
FIG. 25 is a schematic illustration of the elements of a reconverter, constructed and operative in accordance with the present invention.
Figure 26:
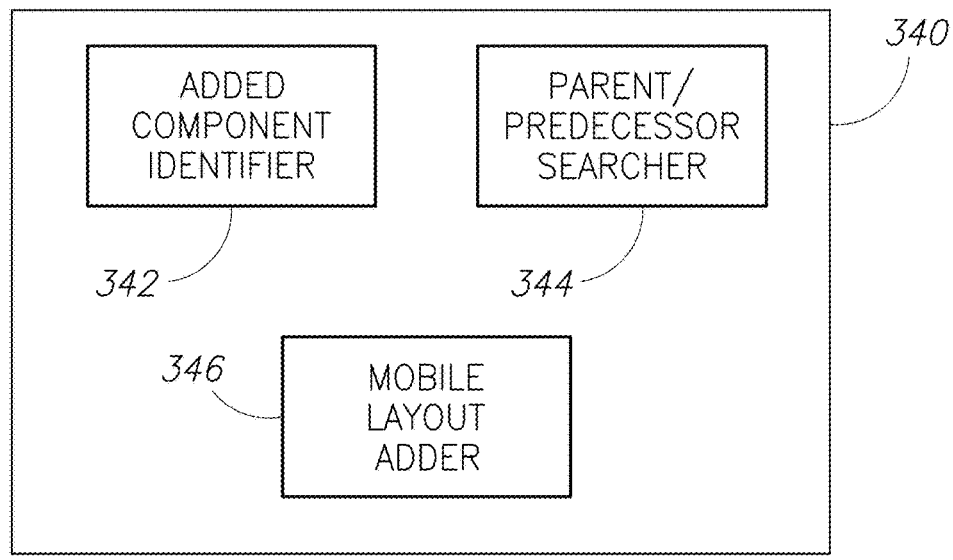
FIG. 26 is a schematic illustration of elements of a component adder, constructed and operative in accordance with the present invention.

Reference is now made to FIG. 25 which illustrates the elements of reconverter 300. Reconverter 300 may comprise a page deleter 310, a page adder 320, a component deleter 330, a component adder 340, a component modifier 350 and a mobile handler 360. Component adder 340 may further comprise an added component identifier 342, a parent/predecessor searcher 344 and a mobile layout adder 346 as is illustrated in FIG. 26 to which reference is now made. The functionality of these elements is described in more detail herein below.

Figure 27:
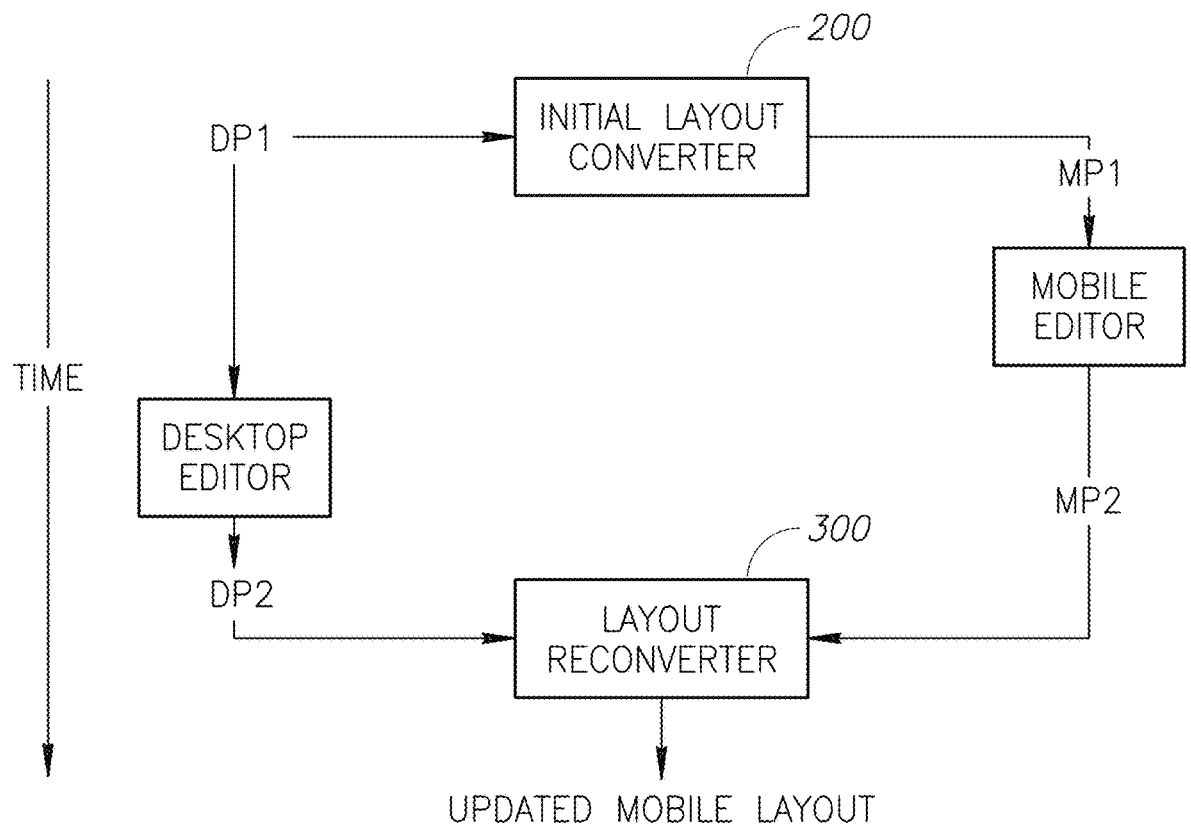
FIG. 27 is a schematic illustration of the functionality of the reconverter of FIG. 25, constructed and operative in accordance with the present invention.

Reference is now made to FIG. 27 which illustrates the functionality of reconverter 300. Initial layout converter 200 may convert DP1 (desktop page 1) creating the resulting mobile layout configuration MP1. A designer may then edit MP1 using the local mobile editor to create MP2. After this, the designer may edit DP1 using the local desktop editor to create DP2. Reconverter 300 may then create an updated mobile layout configuration integrating the changes made in DP2 as well as in MP2.

It will be appreciated that this automatic integration may only be relevant if the desktop editing phase (DP1=>DP2) is performed after the mobile editing phase (MP1=>MP2) (as showning FIG. 26). In the reverse case (the desktop editing is performed first), initial layout converter 200 may automatically reconvert the modified desktop layout configuration DP2 to mobile layout configuration MP2 when the editing DP2 is completed. Therefore the designer would be performing the MP1=>MP2 changes on the already modified MP1, requiring a manual integration of the changes during the (later) mobile editing.

It will be further appreciated that the aim of running the same site on multiple platforms is having the same content in both sites as much as possible. However, as discussed herein above, not all desktop components are mobile compatible due to (for example) the use of drop down menus and vertical lines.

It will also be appreciated that a major requirement for web-based interactive applications (such as web sites) is search-engine compatibility. Therefore both desktop and mobile layout configurations should present the same general page structure to the search engine, and the same pages should be available in both layout configurations. Otherwise, a page might be indexed by a search engine spider reading the desktop layout configuration pages, but would not be available when a user reached it directly via a search engine on a mobile device (generating a "missing web page" or similar error condition). In the reverse case, a page available in the mobile layout configuration but not in the (indexed) desktop layout configuration would not be found by the search engine. Some search engines might support different page structures for different versions of the site, but the use and availability of such an option is an internal property of the specific search engine and cannot be relied upon.

It will be appreciated that although desktop and mobile sites may have different appearances, they may share the same data whenever possible. Otherwise, a user might reach a mobile page by searching (for example) for a given text phrase—which exists in the desktop page content—only to find the mobile page is different and does not contain the searched for phrase. In particular, the mobile page should not contain a component, which does not exist on the desktop page. Some exceptions may apply, such as adding a new mobile-adapted nenu to replace e.g. menus, or deletion of text components in the mobile layout configuration only.

It will also be appreciated that occasionally, a designer may need to make specific modifications to the mobile layout configuration to make it intentionally different from the desktop layout configuration in contradiction with search engine policy. For example, a system displaying a feed of new item summaries might display longer summaries on the desktop layout configuration and shorter summaries on the mobile layout configuration. The designer may certainly modify component size, position and ordering, and such changes should not generally affect search engine handling of the mobile site.

In order to resolve this conflict, or at least ameliorate it, reconverter 300 may limit the scope of modifications the designer may perform on the mobile layout configuration. For example, the designer may be limited to modifications which may only affect mobile layout configuration layout but not the actual content. Such a limitation may be enforced by the systems mobile editor before the various modifications are handled by reconverter 300.

Desktop layout modifications may include adding pages, removing pages; adding components, removing components; changing attributes of components, moving and resizing components and changing the content of component (e.g. the text inside a text paragraph). As noted above, pure layout changes (e.g. moving and resizing) do not affect the mobile layout configuration.

As discussed herein above, a visual design system may have an internal unique ID for each component which does not change when a component is modified or moved. It will be appreciated that reconverter 300 may use these ID's to track components which have been modified from one version of a page to another. Since reconverter 300 assumes that all modifications are performed through the visual design system editor and are fully tracked, when evaluating a modified version, reconverter 300 may have (for each modified component) a detailed list of the modified attributes and the value changes (e.g. for component X the style was changed from S1 to S2 and the width from W1 to W2).

When an existing desktop page is removed, page deleter 310 may also remove the page from the mobile layout configuration. It will be appreciated that this implies that specific mobile layout configuration modifications made to this page are lost. The only way to restore them is through "undo" functionality (e.g. session level undo during the current session or version revert at the database level).

When a new page is added to the desktop, page adder 320 may instruct initial layout converter 200 to convert the entire page to a mobile layout configuration as described herein above. It will be appreciated that the converted page may appear in the appropriate position in the mobile layout configuration. Page adder 320 may update any mobile navigation menus to include the newly inserted page.

When a component is deleted from an existing desktop layout configuration, component deleter 330 may delete the corresponding component from the corresponding mobile layout configuration. Component deleter 330 may also instruct mobile handler 360 to update the mobile layout display, closing gaps in a given component line or deleting an entire component line as described in the description of mobile handler 360 below.

It will be appreciated that when one or more new components are added to a desktop page, the new components may create a new hierarchical component order for the modified desktop page, including the newly added components. For changes to the desktop layout configuration only when no change was made to the mobile layout configuration, reconverter 300 may instruct initial layout converter 200 to reconvert the desktop page as there is no need for the merging of the desktop layout configuration and the mobile layout configuration modifications.

It will be appreciated that component adder 320 must locate the appropriate place in the mobile layout configuration to add a component which was added to the layout configuration. This task may be especially complex as components could have been moved (including between containers), resized, re-arranged or removed in the mobile layout configuration. Furthermore, a desktop layout configuration component may have been moved or removed. Therefore component adder 320 must find the appropriate position to add components—according to either predecessor and/or parent, one of which will always exist.

For each component X added to the mobile layout configuration, added component identifier 342 may identify the added component (e.g. through component ID comparison, editing session history or the underlying database access). Component identifier 342 may instruct component filterer 221 to operate its component filtering function so as to determine if the component is suitable for mobile display at all (e.g. is not an empty component, non-mobile compliant type etc.).

Parent/predecessor searcher 344 may then perform a parent/predecessor search in order to locate the nearest predecessor component PD(X) and/or parent component PT(X), which are the closest to added component X, and which also exist in the mobile layout configuration (i.e. they were not deleted from the mobile layout configuration explicitly or due to their type). The predecessor is determined according to the order specified by orderer 240—taking the nearest predecessor which appears in the mobile layout configuration. The parent is determined according the page container hierarchy—taking the nearest level parent container component which appears in the mobile layout configuration. It will be appreciated that some components may have been deleted (or hidden) in the mobile layout configuration manually and would thus be excluded from parent/predecessor search. It will also be appreciated that the nearest predecessor component may be null, e.g. if X is the first component in its page/container (when excluding components not visible in mobile) it has no predecessor. It will be further appreciated that a parent component however, cannot be null, as the search will always reach the containing page which serves as a top level container. Once parent/predecessor searcher 344 has determined the predecessor and parent (if available), mobile layout adder 346 may place the added component X after the nearest predecessor component in a position bearing the same relationship to the predecessor/parent components in the mobile layout configuration as X was to the same predecessor/parent components in the desktop layout configuration, and push down all the components that are after the predecessor.

It will be appreciated that when handling multiple added desktop layout configuration components (X[1], X[2], . . . ) there are two main methods to implement the procedure above—the one-by-one method or clustered method.

In the one-by-one method, the added desktop layout configuration components X[i] are handled according to their order (as defined, for example, by orderer 240). For each component X[i], parent/predecessor searcher 344 performs a predecessor/parent search which takes into account the proceeding added components X[j] (1<=j<i). Thus, each component X[i] is handled taking into account the other added components.

In the clustered method, parent/predecessor searcher 344 may perform the parent/predecessor search separately for each of the added desktop layout configuration components X[i], ignoring the existence of other added desktop layout configuration components X[j] (for j≠i). Therefore parent/predecessor searcher 344 performs a parent/predecessor search for each X[i] as if it were the only component added to the desktop layout configuration. Once this is done, components X[i] are clustered according to a common combination of predecessor component PD(X[i]) and parent component PT(X[i]). The components in each cluster may be grouped together as a single virtual page (e.g. as a virtual super-node, possibly containing other super-nodes inside it). Component adder 340 may then instruct initial layout converter 200 to run on each such virtual page separately, running a full conversion process recursively (including the pre-processing, analysis, anchors etc. as described herein above). The process may convert each virtual page into a converted virtual page which mobile layout adder 346 then places as a unit into the mobile layout configuration based on the common predecessor and parent for the cluster.

Reference is now made to FIGS. 28A, 28B, 28C, 28D, 28E, 28F and 28G which illustrate different component addition and editing scenarios, and how they are handled by component adder 340.

Figures 28A, 28B:
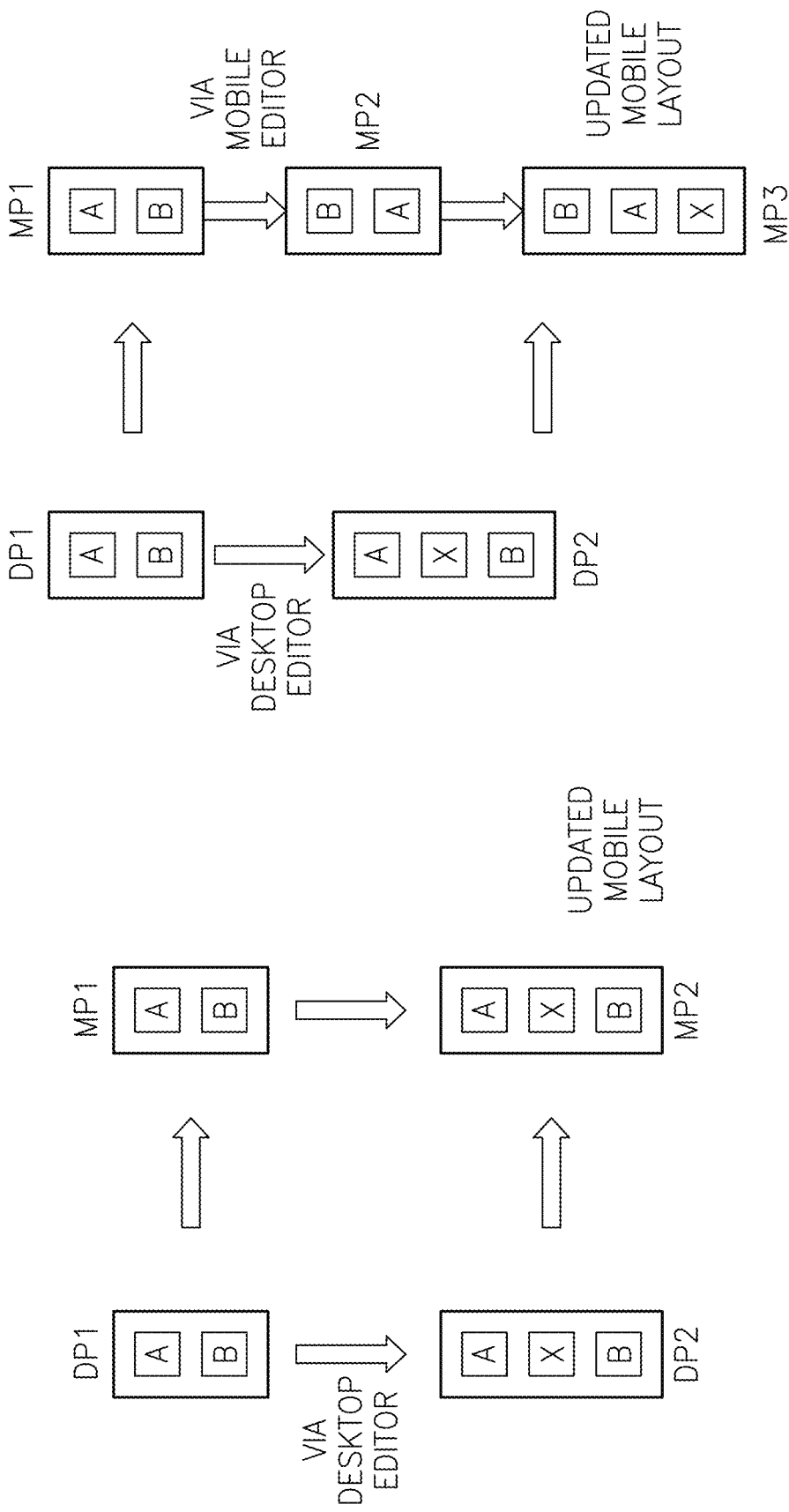
FIGS. 28A, 28B, 28C. 28D, 28E, 28F and 28G are schematic illustrations of the placement of components when converting or re-converting a webpage from a desktop layout configuration to a mobile layout configuration, constructed and operative in accordance with the present invention.

Reference is now made to FIG. 28A which shows a desktop page DP1 containing two components, A and B. Initial layout converter 200 may convert this page into a mobile page MP1. If a new component X is then added between A and B in DP1 so as to create page DP2, parent/predecessor searcher 344 performs a parent/predecessor search for X, finding that X follows A inside the containing page (in the desktop layout configuration). Thus, mobile layout adder inserts X after A in the containing page in MP1 so as to create MP2.

In another scenario, as is illustrated in FIG. 28B to which reference is now made, mobile page MP1 is edited via the mobile editor to exchange the vertical positions of A and B, creating MP2. After this edit, the designer then inserts the new component X between A and B in the DP1 to create page DP2. Component adder 340 may reconcile the changes made to DP2 and MP2. Parent/predecessor searcher 344 may perform a parent/predecessor search for component X, finding that X follows A (its nearest predecessor) inside the containing page (its nearest parent in the desktop layout configuration). Thus, mobile layout adder 346 may insert X into MP2 in the containing page following component A (which is now below B rather than above B), creating the updated mobile page MP3.

Figure 28D:
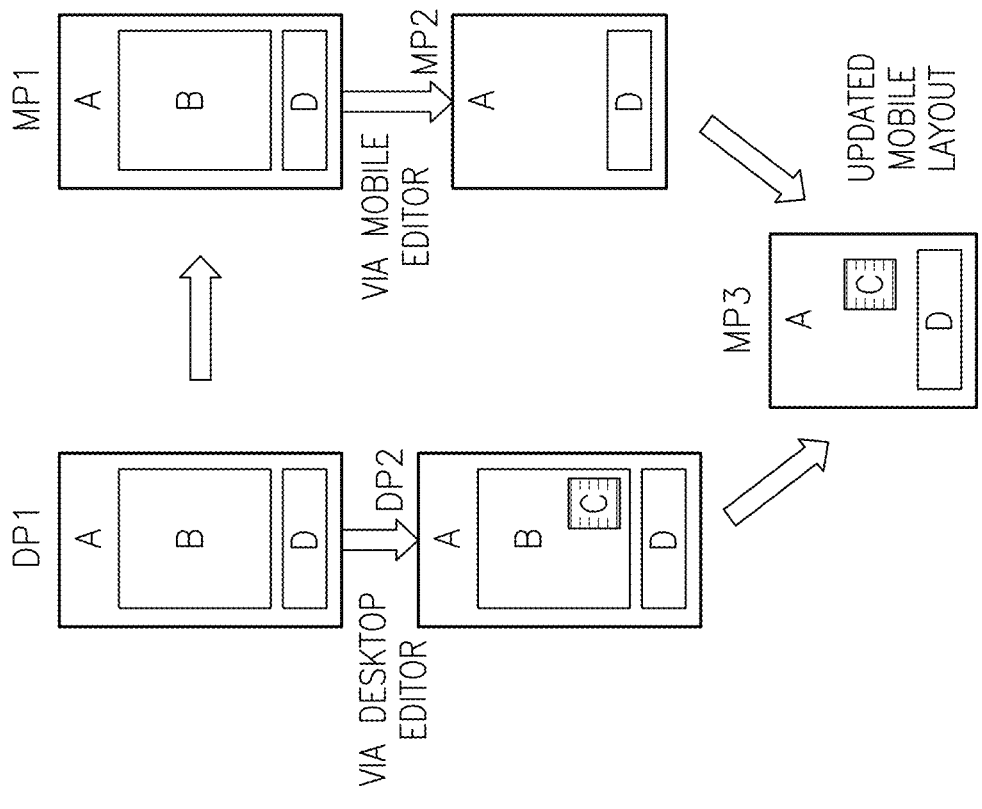
Figure 28C:
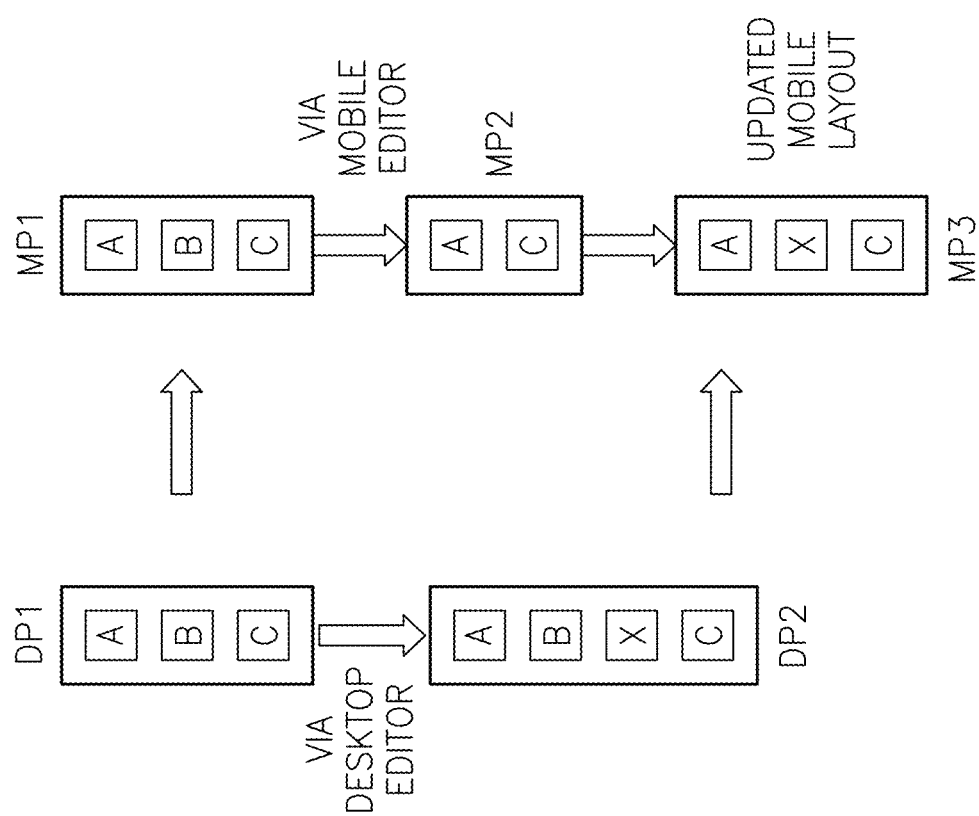

In yet another scenario, as is illustrated in FIG. 28C to which reference is now made, mobile page MP1 is edited via the mobile editor to remove (hide) component B which resides below A and above C (creating MP2). DP1 is then edited via the desktop editor to insert component X after B and before C (creating DP2). Component adder 340 may then reconcile the changes made to DP2 and MP2. Parent/predecessor searcher 344 may perform the parent/predecessor search for the added component X and may determine that the predecessor of X is A instead of B, since B is marked as "removed in mobile". Thus, mobile layout adder inserts X after A (and before C) in MP2 to create MP3.

In yet another scenario, as is illustrated in FIG. 28D to which reference is now made, page DP1 contains a container A which contains an internal container B and another component D—all of which are converted into MP1. Mobile page MP1 is then edited via the mobile editor to remove (hide) the internal container B (creating MP2). DP1 is then edited via the desktop to insert component C inside the internal container B (creating DP2). Component adder 340 may then reconcile the changes made to DP2 and MP2. In this scenario when performing the parent/predecessor search for the added component C, parent/predecessor searcher 344 may determine that the parent of is A instead of B, since B is marked as "removed in mobile". Parent/predecessor searcher 344 may further determine that C has no predecessor, since it is the first component in A (disregarding B). Thus mobile layout adder 346 may insert C inside A (at the top and before D) in MP2 to create MP3.

Figure 28E:
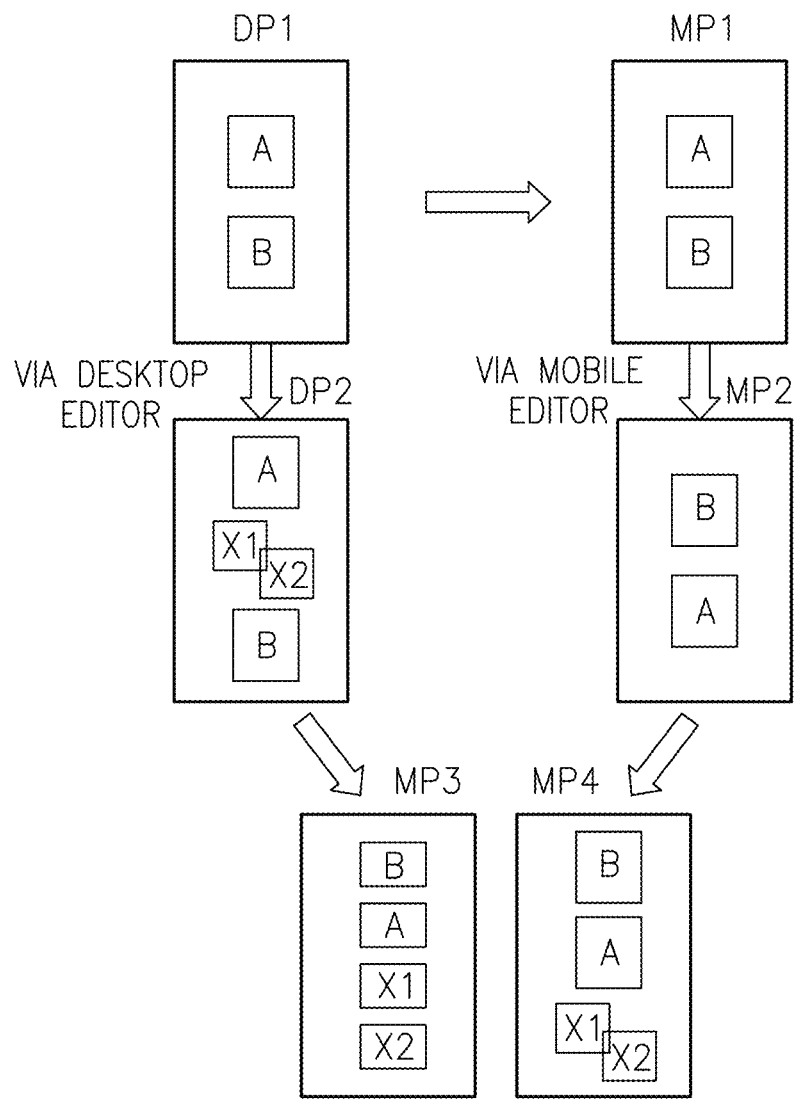

In yet another scenario, as is illustrated in FIG. 28E to which reference is now made, mobile page MP1 is edited via the mobile editor to exchange the vertical positions of A and B, creating MP2. Later, a designer inserts two new highly-overlapping components X1 and X2 between components A and B in DP1 to create page DP2. Component adder 340 may reconcile the changes made to DP2 and MP2 in one of two possible ways, generating either MP3 (for the one-by-one method) or MP4 (for the clustered method).

It will be appreciated that if the one-by-one method is used, and as X2 is geometrically positioned "later" than X1, parent/predecessor searcher 344 may perform the parent/predecessor search for X1 first, determining that A is the predecessor of X1. Parent/predecessor searcher 344 may then perform the parent/predecessor search for X2 (taking X1 into account), and may determine that X1 is the predecessor of X2. Thus, mobile layout adder 346 may then place component X1 after A and place component X2 after X1 thus creating MP3. It will be appreciated that in this method, components X1 and X2 are analyzed and moved as separate entities and therefore their compositions are separated.

If the clustered method is used, parent/predecessor searcher 344 may perform the parent/predecessor search for both X1 and X2 without regarding X1 or X2 (for the search), and may determine that both have the same parent (the main page) and the same predecessor (component A). Thus, component adder 340 may cluster X1 and X2 together, may create a virtual super-node containing X1 and X2, and may instruct initial layout converter 200 to create a mobile ready version of the composition of X1 and X2. It will be appreciated that this converted composition would be placed below A creating MP4. Since X1 and X2 were highly overlapping, it is likely they would be resized as to preserve their composition (as described above).

Figure 28F:
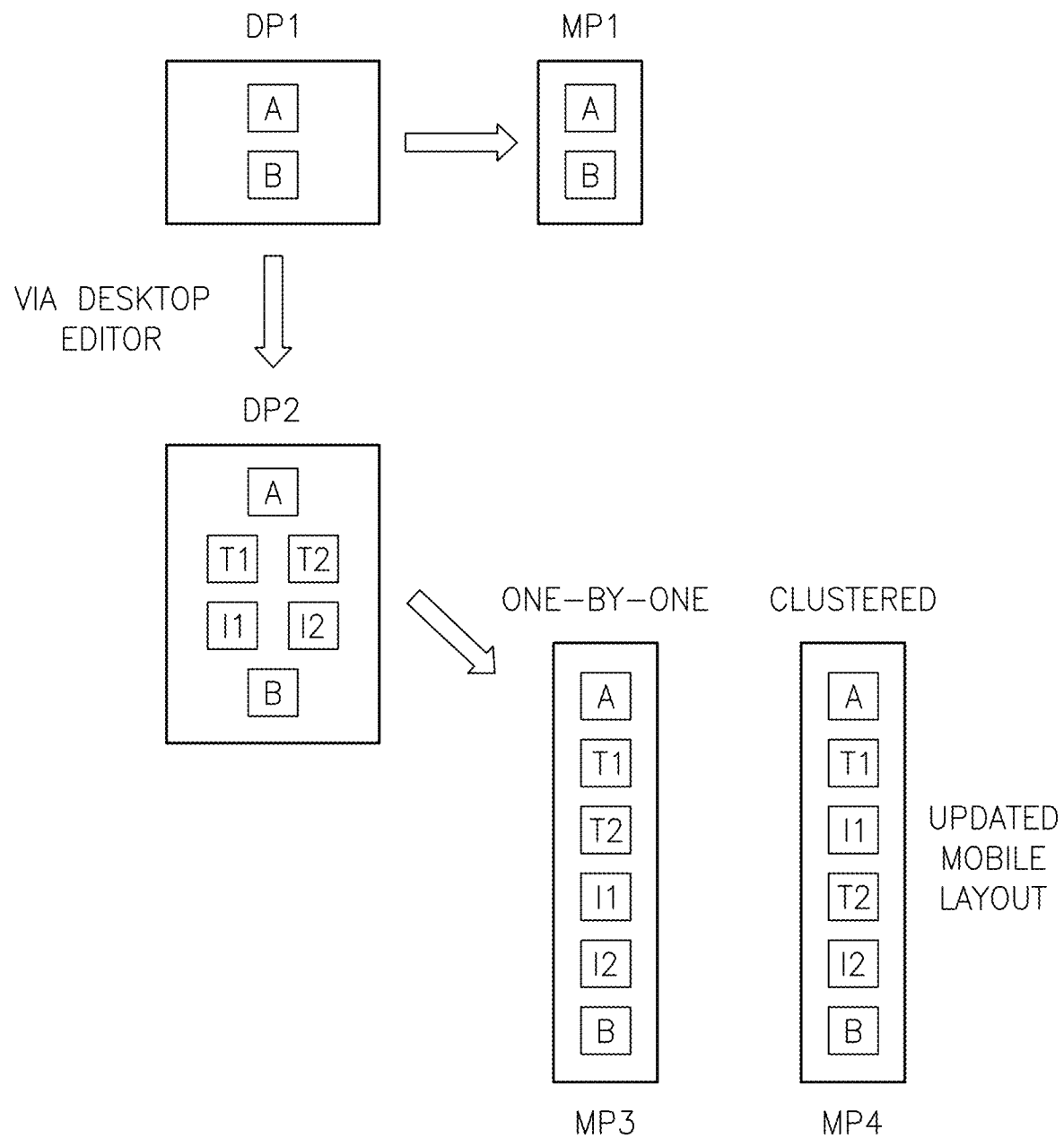

In yet another scenario, as is illustrated in FIG. 28F to which reference is now made, an original desktop page DP1 containing two components (A and B) is edited via the desktop editor by adding 4 new components—two pairs of semantically-related text and image components (T1/I1 and T2/I2)—creating a new page DP2. If DP2 is converted to mobile using the one-by-one method (as described herein above), parent/predecessor searcher 344 may determine that T1 is the predecessor of T2. Thus, the generated (vertical) sequence of components would be A-T1-T2-I1-I2-B (as shown in MP2)—breaking the text caption to image connections. If DP2 is converted to mobile using the clustered method (as described herein above, parent/predecessor searcher 344 may determine that T1/T2/I1/I2 all have the same predecessor (A) and parent (main page). Thus, mobile layout adder 346 may cluster these 4 components into a new virtual page and may run initial layout converter 200 on them. Since T1 is semantically related to I1, and T2 to I2, these pairs would be kept together. Thus, the created (vertical) sequence would be A-T1-I1-T2-I-B (as in MP3)—preserving the semantic information.

Figure 28G:
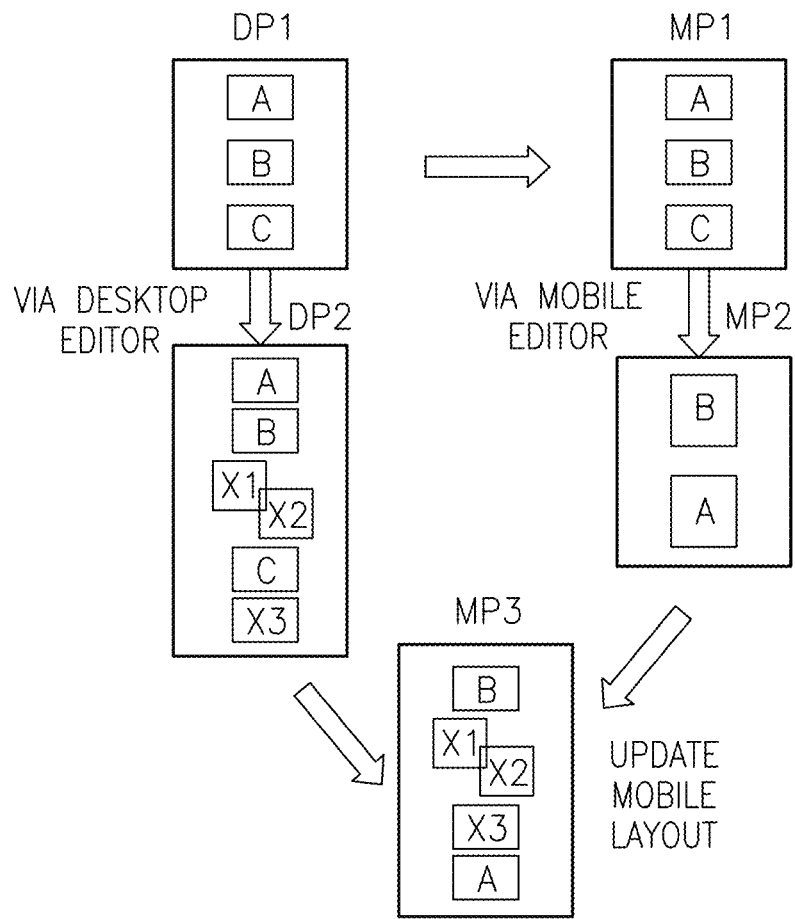

In yet another scenario, as is illustrated in FIG. 28G to which reference is now made, Desktop page DP1 contains three components (A, B and C) and is converted to mobile. The resulting mobile page MP1 is edited via the mobile editor, removing component C and exchanging the order of A and B to create MP2. DP1 is then edited via the desktop editor, adding two overlapping components X1 and X2 between B and C and an additional component X3 below C to create DP2. Component adder 340 is configured to use the clustered method and therefore all three added components (X1, X2 and X3) are clustered together, since the parent/predecessor searcher 344 has determined that B is the predecessor of all 3 new components (since C was removed in the mobile version). Thus mobile layout adder 346 may place all 3 new components below B and above A, retaining the composition of X1 and X2 (as shown in MP3).

It will be appreciated that the placement of added components by mobile layout adder 346, may be implemented in a limited version in which components are added to the desktop version or are only added to the mobile version vertically between two vertically-separate components.

In another embodiment, component adder 340 may add a "cluster" of added components anywhere inside a "line" of components laid out in the mobile version, so as not to limit the insertion of the new components to be below a given component in the mobile version.

In yet another embodiment, component adder 340 may attach an added component B to the desktop layout configuration container that contains it rather than having it as a predecessor. It will be appreciated that in this scenario, component B remains attached to the container C containing it, and is placed after the last element in C which exists in both desktop and mobile layout configurations and which precedes component B. This approach may be used unless the container C (and the matching super-node) is empty, or is hidden in the mobile layout configuration.

In yet another embodiment, component adder 340 may add components to the mobile layout configuration by dividing the mobile layout configuration horizontally into segments, and adding the added component or component cluster after the segment containing the predecessor instead of directly after the predecessor.

It will be appreciated that when there are changes to attributes such as style, font or text size of a desktop component including general property changes, such as changing the number of rows or columns in a gallery component, component modifier 350 may modify the components in the mobile layout configuration. Since the mobile layout configuration defines a visual application subject to dynamic layout, it can accommodate such changes and re-adjust component sizes and positions accordingly.

It will also be appreciated that while changes to the size and position of a desktop component affect the desktop layout configuration, they do not affect the mobile layout configuration unless the mobile layout configuration is explicitly re-generated as described herein below. This is allowed because system 100 may allow for differences in appearance (design) between the multiple layout configurations, as long the content does not change.

When there are changes to the data/content of a desktop component, component modifier 350 may update the mobile layout configuration accordingly. Similar to attribute modification, such data change may cause some re-formatting of components on the mobile layout configuration, handled using dynamic layout.

It will be appreciated that any modification to the mobile layout configuration may be performed by a user typically via a specialized GUI display (the mobile editor) or mobile modifications display with the mobile preview layout configuration. Such a mobile editor may only allow the designer to perform certain operations, such as adding mobile-specific components, removing components (hide them), moving components or modifying components only. Thus mobile editor may interact with mobile handler 360 which handles mobile-side only changes.

Figure 29:
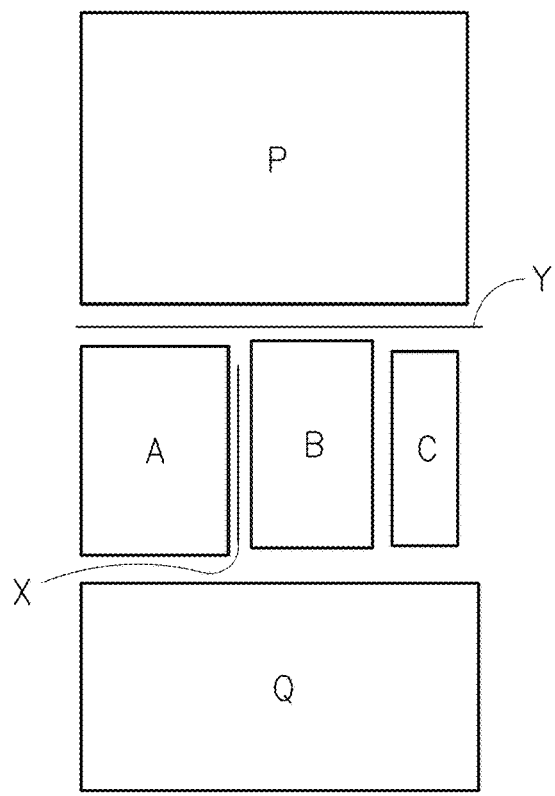
FIG. 29 is a schematic illustration of methods of inserting components into the mobile version of a webpage.

Mobile handler 360 may use a number of methods for placing added (mobile only) components. Mobile handler 360 may allow the insertion of a new component only between two components on a component line or on a new component line following or preceding an existing one as is illustrated in FIG. 29 to which reference is now made. A new component X may be inserted between A and B or a new component Y may be inserted below P and above A, B and C. It may also insert line breaks before/after added component.

The inserted component (either X or Y) in this case may be anchored to the preceding component (or container) and may be re-inserted in that position if the mobile layout configuration is re-generated and "preserving added mobile components" was requested. If the anchor is not available (e.g. the anchored-to component was removed in desktop layout configuration), mobile handler 360 may search for the closest previous component or container as noted above for adding components to the desktop layout configuration.

Mobile handler 360 may also allow placing the new (mobile only) component X in an arbitrary position in the page. Mobile handler 360 may then search for an anchoring component by searching for the component with the largest intersection with X. If no such component is available, mobile handler 360 may look for the closest neighbor (on all 4 sides) based on the weighted average of distance and overlap and by using distance and overlap thresholds. If no such component is found using the container containing X, then mobile handler 360 may use the page start as an anchor which may be defined as the anchor in term of distance and offset from the closest edge of the anchor.

In order to avoid non-compliance with search engine policies, reconverter 300 may avoid this offering this operation at all. Alternatively, reconverter 300 may be limited to adding components which do not affect the search engine view of the page, such as decoration type components (e.g. lines, decoration shapes), components without content (e.g. page-internal navigation menus which don't add extra menu entry information), components with content which is not provided to search engines (e.g. background images) and to components which are only relevant for the mobile environment (such as buttons providing functionality for placing a phone call, sending a text/MMS message, navigating to a given location or switch to desktop site version).

It will also be appreciated that the mobile editor may also place non-mobile-recommended components initially in the "removed component" display, and require a second step to actually incorporate them into the mobile layout configuration.

The added components may be listed in the mobile modifications display as discussed herein below, so as to make it easy to remove specific add-to-mobile-only components.

Figure 30:
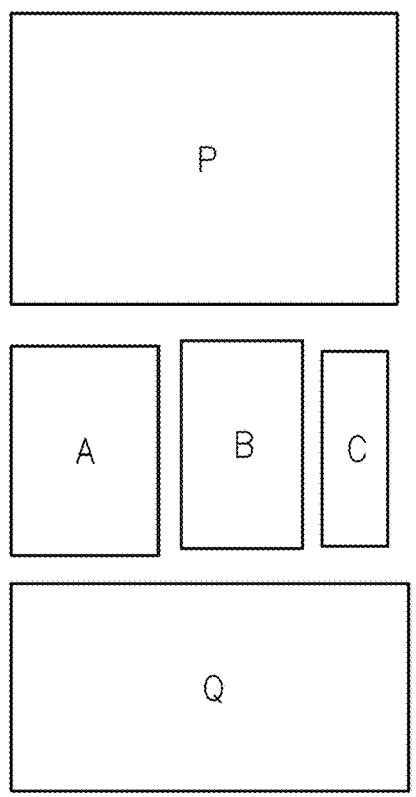
FIG. 30 is a schematic illustration of the removal of components from the mobile version of a webpage.

Mobile handler 360 may also remove a component from the mobile layout configuration (which may be implemented by actually removing the component or just hiding it). It will be appreciated that when a component is removed from the mobile layout configuration, mobile handler 360 may not rearrange the components in the same line. When an entire component line is removed, mobile handler 360 may move the components below up as close as possible as is illustrated in FIG. 30 to which reference is now made. If any of components A, B or C (but not all three) are removed, the remaining components in the line (A, B or C) are not affected or moved. If all three components (A, B and C) are removed, component Q and the components following it will move up to near component P. The removed component(s) may be listed in the mobile modifications display as discussed herein below, so as to make it easy to re-insert the hidden components into the application at a later stage if required.

It will also be appreciated that components in the mobile layout configuration may be moved by a user via the regular_diting visual data system GUI. Mobile handler 360 may retain the modifications until the page is re-created and may list them in the mobile modifications display as discussed herein below, so as to make it easy to undo specific changes.

The mobile editor may also allow components to be moved "out" (right or left) of the mobile narrow display strip. In this scenario, the component may retain a certain minimal horizontal overlap with the "strip", and may be displayed clipped to the strip size. Otherwise, this option may become equivalent to the "hide component" option. This option may be used for showing only part of a component/container or for temporarily placing components to the side in order to help in re-arranging components in the mobile configuration;

The mobile editor may also allow a user to selectively change component attributes, properties and styles in a mobile layout configuration. The mobile editor may mark such changed attributes as "changed in mobile" so that a change in a specific attribute in the desktop layout configuration may not affect (and override) the change made to this attribute in the mobile layout configuration.

One particular change which may desirable as a mobile layout configuration specific change is font size. This may be needed if component adjuster 227 generates a size different to that which the designer may require. Thus, a specific font size change (as a factor to be applied on top of the font size generated by the initial layout converter 200) may be added and applied to the displayed text on a per-field basis. The mobile editor may change font size using a local "scale factor" attribute, and (for example) buttons for 5% font size increase/decrease which may affect this attribute. It will be appreciated that the mobile editor may still limit the new font sizes to a given range of mobile-friendly font sizes. Any attribute modification (including font size change) may be listed in the mobile modifications display as discussed herein below.

As discussed herein above, reconverter 300 may provide a separate GUI displaying the list of modifications specific to a given mobile layout configuration (e.g. components added, components removed and components modified). This may useful in order to view the specific mobile layout configuration modifications and distinguish between them and other layout modifications made by initial layout converter 200. It may also be useful in order to review different changes made to different mobile layout configurations and to be able to undo specific mobile layout configuration modifications such as to re-insert a specific "removed" component.

It will be appreciated that such a display may be divided according to the page in which the modification was performed, i.e. current pages, another page(s) or any template or master page or according to the modification type, i.e. insertion, removal or modification of component.

The display may further be used to sort these modifications, e.g. according to timestamp, location in the page or affected component type. The mobile editor may support an undo operation for a selected set of modifications. Mobile handler 360 may then undo any modifications e.g. re-insert removed components are reverse component position modification.

Reconverter 300 may further support mobile layout configuration regeneration options. When activated, reconverter 300 may instruct initial layout converter 200 to run again on the underlying desktop layout configuration (which may have been modified since initial layout converter 200 was last run), and the mobile layout configuration specific changes may be possibly re-applied.

It will be appreciated that regeneration may be applied to pages which should be re-generated (current page, specific pages, entire application) and mobile layout configuration changes which should be re-applied after the mobile layout configuration is re-generated. These could be selected by categories (such as component hiding only), include specific selected modifications or include all modifications. It will also be appreciated that if regeneration run is performed without re-applying mobile layout configuration changes to a given page or pages, the relevant mobile layout configuration changes are discarded.

Displayer 290 may display the new updated mobile layout configuration as described herein above.

The system as described above may be integrated with the pertinent website building system in a number of ways. For example, the system 100 could be integrated into the actual website building system code—either entirely in the client side, entirely in the server side or both. System 100 may also be operated on the same server platform as the website building system or on a separate standalone server or server set. System 100 may be operated on-line (whenever a website building system page is viewed), off-line (so as to created stored converted versions of website building system) or in a combination (with some stages activated off-line and others on-line). It could operate directly on the website building system data structures or provide an interface (such as web service) called by the website building system so as to isolate system 100 from the website building system content.

It will be appreciated that in different embodiments of the present invention, different elements of system 100 may divide their functionality in different ways and may perform the above mentioned functionality in a different order than described herein above. It will be further appreciated that system 100 may also be partially implemented using partial functionality.

Thus a desktop layout configuration of a particular application may be suitably converted into a mobile layout configuration (or any other different sized target layouts) taking into account the relationship between components. Furthermore, after the initial conversions, modifications may be made to both the desktop and mobile layout configurations for the same page and may be reflected within a newly generated mobile page.

Component Based Comparison System

It will be appreciated that when developing website building systems, there is often a need to compare different versions of a website, to merge updates to the website (content and layout) coming from different sources and also to perform conflict resolution when necessary.

It will also be appreciated that existing version control systems and other systems which support change merging typically use comparison and merging algorithms which are text-based or byte-based only. Such systems are not suitable for object-based website building systems, which use a multi-dimensional component hierarchy as an underlying data model.

Applicants have realized that superior results can be achieved using a component-based comparison and merging system which may use any of the following: the underlying website building system component IDs; locating geometrical and semantic relationships between the components; analysis of the component attributes and content; analysis of the component editing history; and smart ordering of the components at each hierarchy level (so that linear comparison and merging algorithms known in the art can be used).

Applicants have further realized that such smart ordering of components may be achieved using the component ordering technology developed to support conversion of websites to mobile sites as discussed herein above in relation to orderer 240. Applicants have also realized that the semantic classification and comparison of components may also be used to support the comparison process.

US Patent Publication entitled "SYSTEM FOR SYNCHRONIZATION OF CHANGES IN EDITED WEBSITES AND INTERACTIVE APPLICATIONS", published on 13 Aug. 2015 and assigned to the common assignee of the present invention describes an application change synchronization system for updating and editing objects in a website that may be used with and without a version control system. The system described herein may be of use as an element of such an application change synchronization system for website editing.

As discussed herein above, a website may have hierarchical arrangements of components having attributes. These hierarchical arrangements may also be known as component trees. Each node in a component tree may represent a component and may have multiple sub-nodes (e.g. for components inside a container component). Specifically, each node may have geometrical attributes (position and size) relative to the containing entity.

Figure 31:
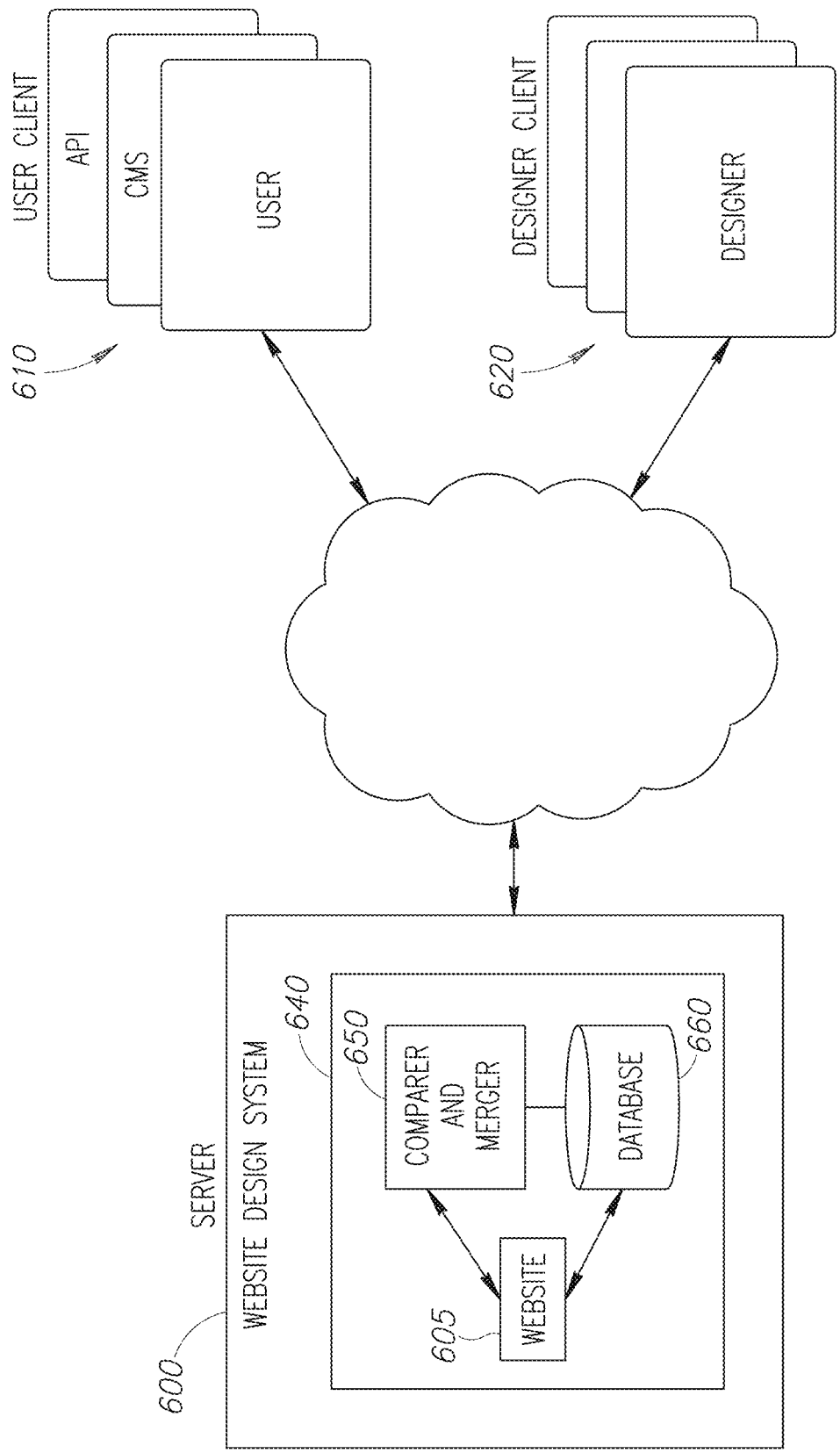
FIG. 31 is a schematic illustration of a system using a comparer and merger to compare and merge the components from different versions of a web site, constructed and operative in accordance with the present invention.

Reference is now made to FIG. 31 which illustrates a website design system 640 running on a server 600 typically accessed from multiple sources such as user clients 610 (including interactive users, content management systems, API's etc.) and designer clients 620. Website design system 640 may comprise a website 605 and a comparer and merger 650 to compare and merge the components from different versions of the website 605 which may be stored on database 660 according to an embodiment of the present invention. It will be appreciated that although website design system 640 is shown implemented on server 600, in an alternative embodiment, it may be implemented locally on either user client 610 and/or designer client 620—either fully or partially.

It will be appreciated that the hierarchical arrangements of components may be stored in database 660 or in a separate object store, in a markup language file or data interchange format files as discussed in more detail herein below. It will be further appreciated that edits to the components may be stored locally on clients 610 and 620 and updated to database 660 at a later time or may be stored directly in database 660.

Figure 32:
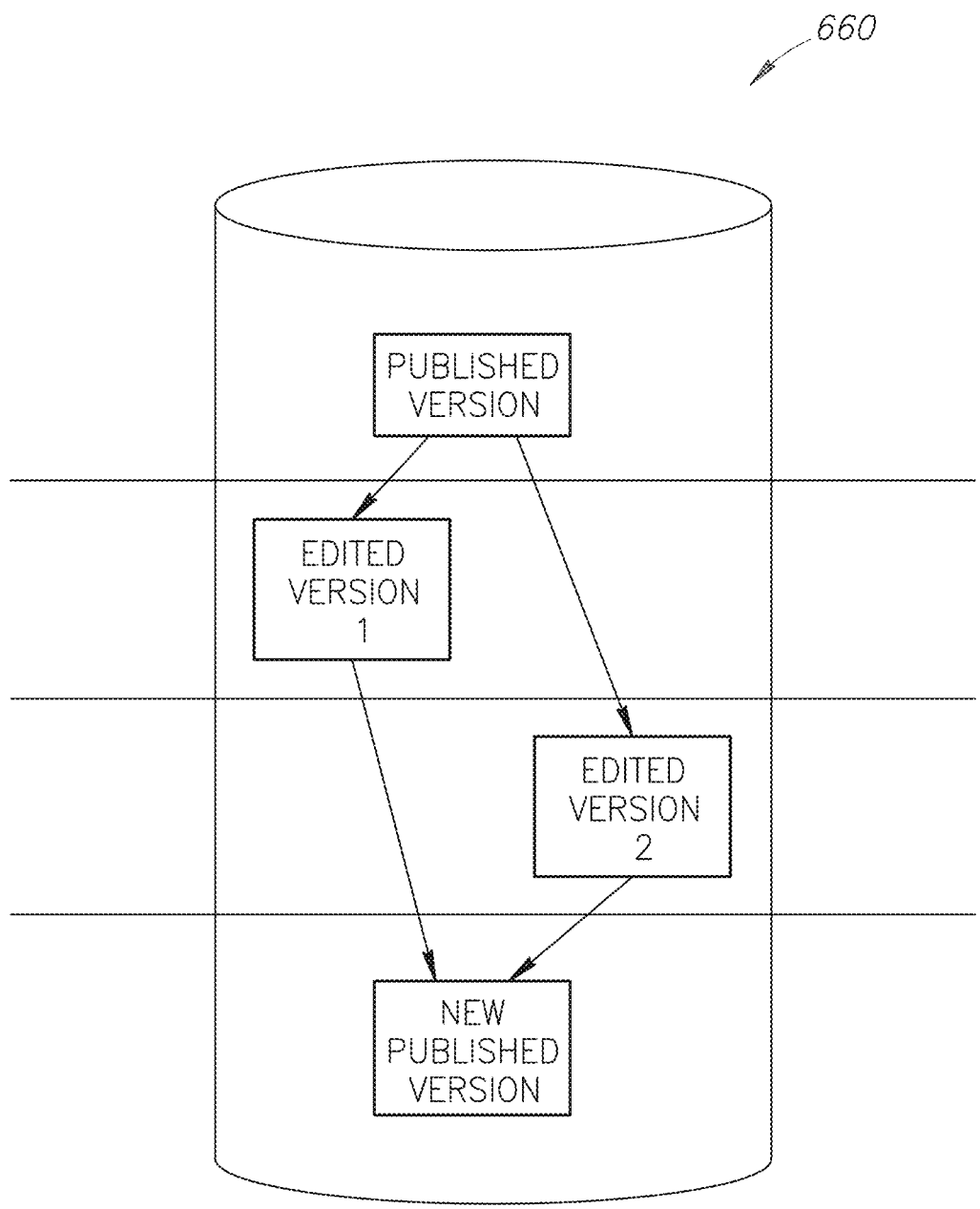
FIG. 32 is a schematic illustration of how different versions of a website may be created and merged over time.

Reference is now made to FIG. 32 which illustrates a scenario of versions of a website that may be stored in database 660. The published version may be the version of the website currently available to both users and designers, edited version 1 may be content added by a user, edited version 2 may be actual changes to an object schema made by a designer and the new published version may be the published version with edited version 1 and edited version 2 merged accordingly.

Figure 33:
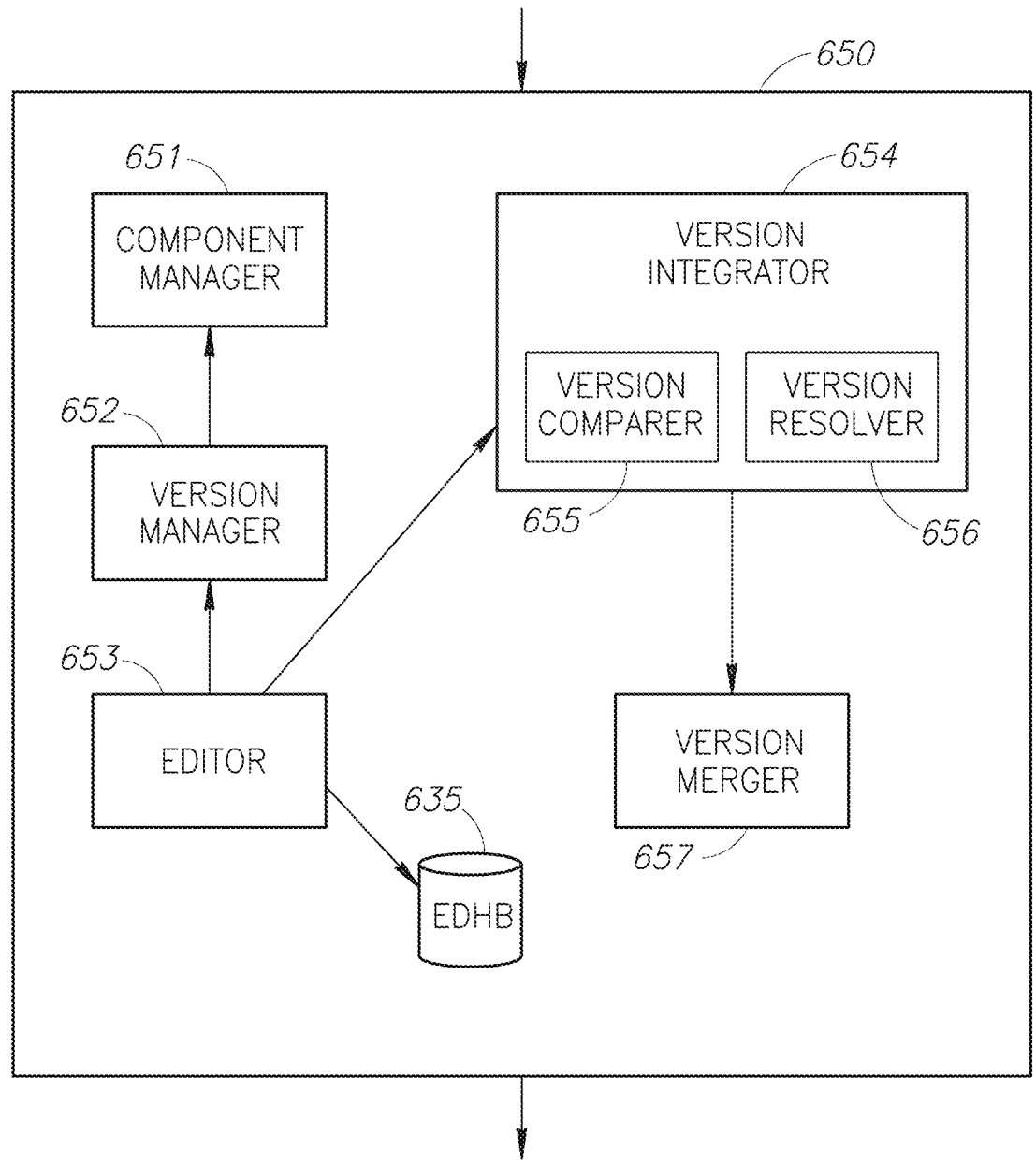
FIG. 33 is a schematic illustration of the elements of the comparer and merger of FIG. 31, constructed and operative in accordance with the present invention.

Reference is now made to FIG. 33 which illustrates the elements of comparer and merger 650. Comparer and merger 650 may comprise a component manager 651, a version manager 652, an editor 653, a version integrator 654 and a version merger 657. Version integrator 654 may further comprise a version comparer 655 and a version resolver 656. Editor 653 may further comprise an editing history database 635 to store edits made to website 605 handled by website design system 640.

Component manager 651 may manage the storage of created websites or other created visual applications and component storage and provide access services for editor 653 to database 660, version manager 652 may manage and store multiple versions of the created websites or other created visual applications, editor 653 may support the editing of the website by a designer, version integrator 654 may compare and resolve differences between different versions and version merger 657 may merge versions once they have been compared and resolved based on the analysis performed by version integrator 654.

It will be appreciated that comparer and merger 650 may be required to compare (and later merge) two component trees (e.g. the baseline version and a modified version) into a single component tree. Such merging may be automatic, user-guided or both.

Comparer and merger 650 may also perform a merge based on the hierarchical decomposition of the objects being merged or based on an analysis of the geometry, attributes and content of the compared objects and sub-objects.

Figure 34B:
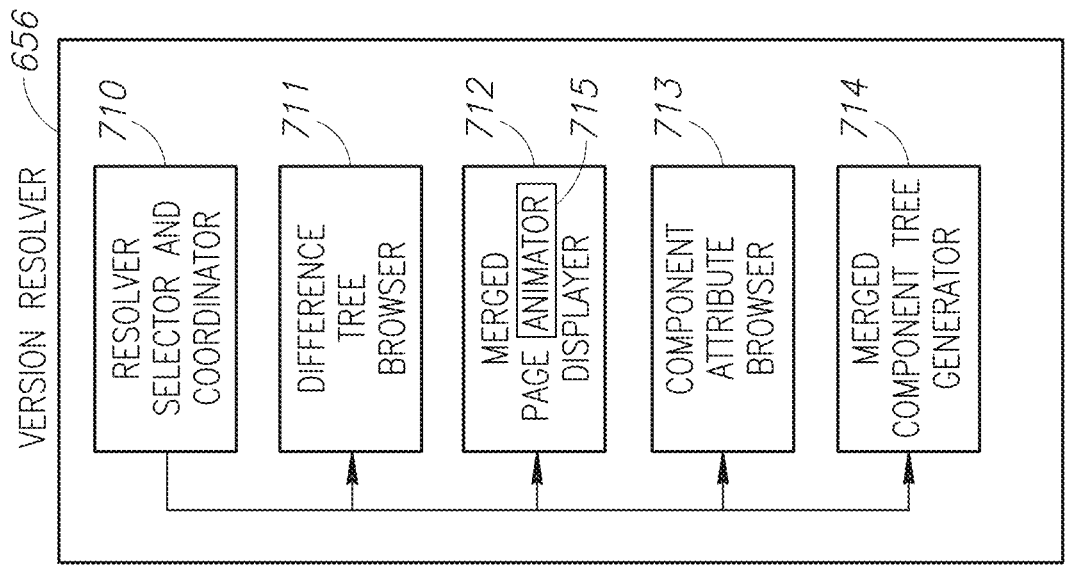
FIGS. 34A and 34B are schematic illustrations of the elements of the version comparer and version resolver of FIG. 33, constructed and operative in accordance with the present invention.
Figure 34A:
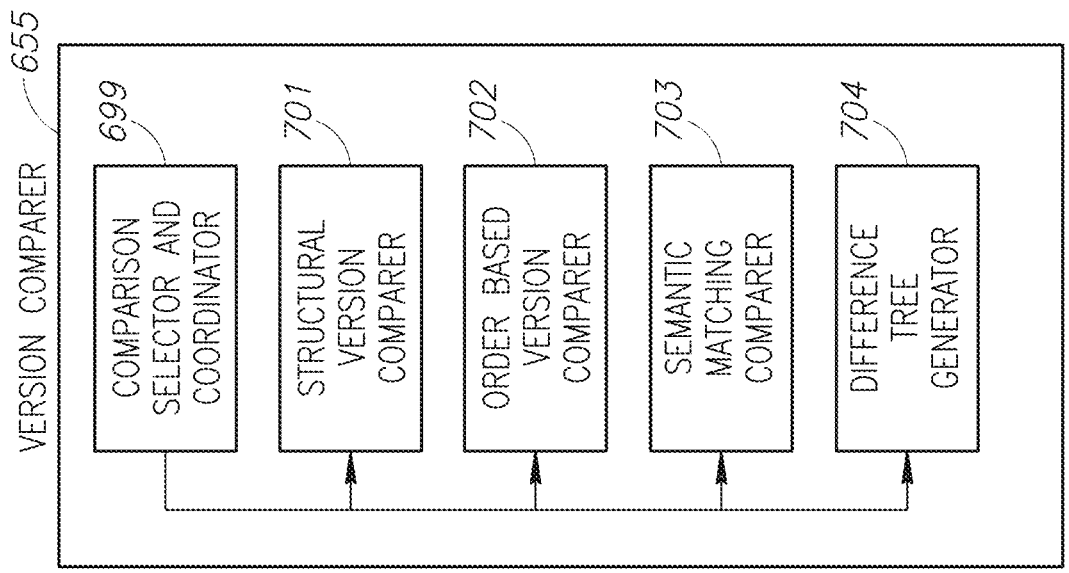

Reference is now made to FIGS. 34A and 34B which illustrate the sub elements of version comparer 655 and version resolver 656 respectively. Version comparer 655 may compare two or more versions of the created visual application generating an intermediate data structure describing their differences. Version comparer 655 may further comprise a comparison selector and coordinator 699, a structural version comparer 701, an order based version comparer 702, a semantic matching comparer 703. and a difference tree generator 704. Version resolver 656 may comprise a resolver selector and coordinator 710, a difference tree browser 711, a merged page displayer 712, a component attribute browser 713 and a merged component tree generator 714. Merged page displayer 712 may further comprise an animator 715 and difference tree browser may comprise a hierarchical menu generator 716.

Comparison selector and coordinator 699 may analyze the incoming trees and decide which of comparers 701, 702 and 703 to use based on the structure of trees. Comparison selector and coordinator 699 may also coordinate between the use of more than one of comparers 701, 702 and 703 when required. Comparers 701, 702 and 703 may all first preprocess the nodes of each individual component tree either structurally, by their order or semantically to determine an object order and relationships between objects before comparing the two component trees structurally, by their order or semantically as described in more detail herein below.

It will be appreciated that comparer and merger 650 may base its functionality on the creation and later resolution of a difference tree. Difference tree generator 704 may create a difference tree based on the results of comparers 701, 702 and 703. It will be further appreciated that a difference tree may be similar to a component tree but may include the result of comparing two component trees. Whereas a component tree consists of regular nodes (having sub-nodes) and leaf nodes, a difference tree may contain nodes of additional types.

One such node may be a comparison node which has two sub-nodes, both of which are the versions of the node found in the two compared component trees (e.g. T1 and T2). One (but not both) sub-nodes may be null in a case in which a component node exists in just one of the compared component tree (T1 or T2) but not in the second component tree.

Figure 35:
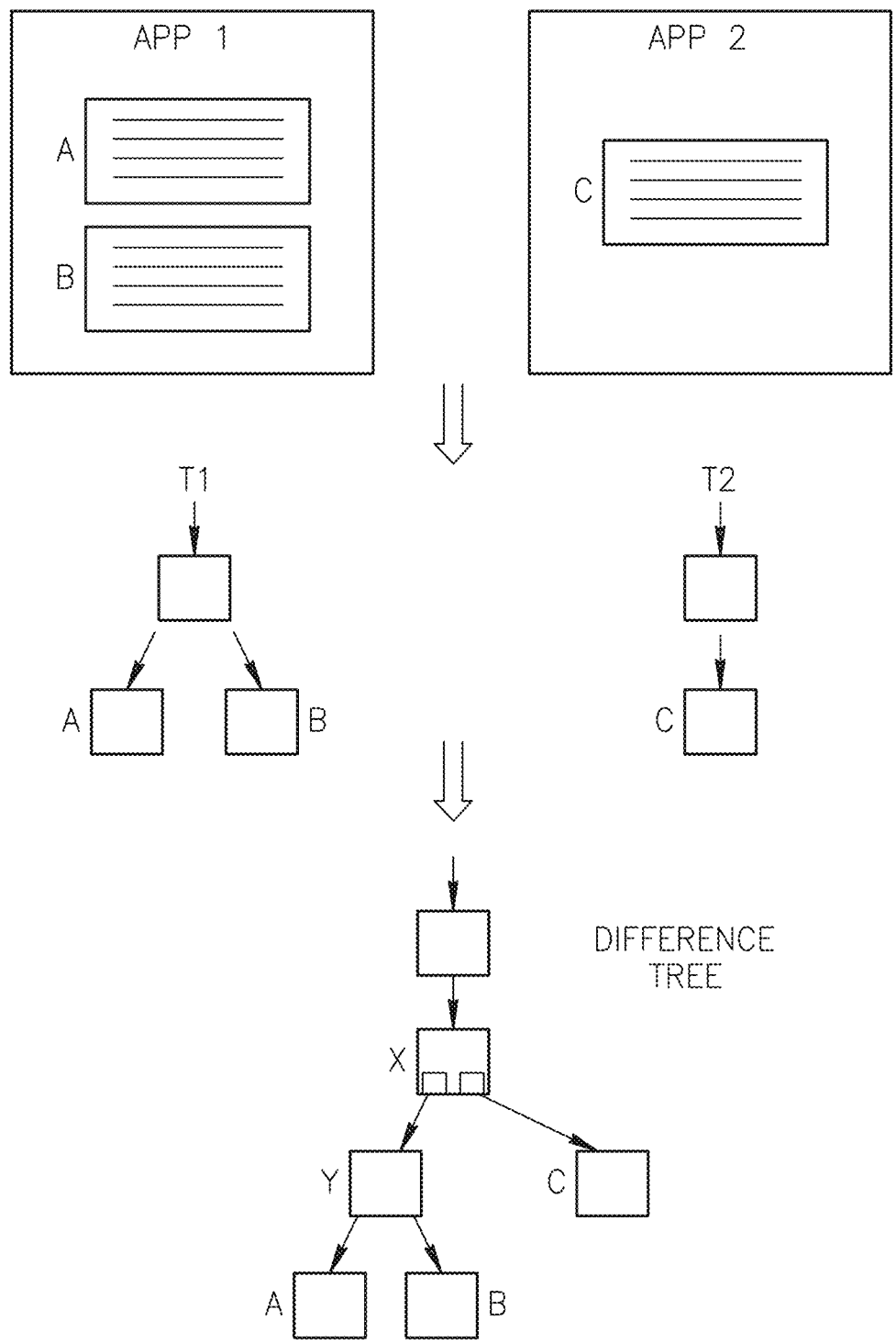
FIG. 35 is a schematic illustration of the use of comparison and group nodes.

Another such node may be a group node. Reference is now made to FIG. 35 which illustrates the use of comparison and group nodes. A group node may be used, if two components (A and B) in T1 have been replaced in the application with a single component C in T2. In such a case, the $1^{st}$ sub-node of comparison node X would be a newly created group node Y which includes A and B, and the $2^{nd}$ sub-node would be the component C (and its contained sub-components).

It will be appreciated that a difference tree may only contain nodes containing differences between T1 and T2. Sub-trees (sub-nodes) which are identical between T1 and T2 are omitted from the difference tree.

When a component V differs between T1 and T2, the difference tree may include the path from the difference tree root to component V.

A difference tree may also aim to "push the differences as low possible", e.g. to include a comparison node at the lowest (most detailed) level in which the difference exists. Each node may contain pointers or references to the version of the node in both T1 and T2.

An alternative embodiment may use, for example, a tree containing the unmodified nodes as well, with specific node type for these unmodified sub-branches added to the node types as described in more detail herein below. Yet another alternative embodiment may include details of differences in attribute values of a given component Z (i.e. between T1 and T2) inside the specific node describing Z, and would only use comparison nodes for differences in the set of contained sub-components as further described below.

One special case is when a difference tree represents a component (such as multi-page container) which has multiple sub-components (which may be displayed simultaneously or not). In such a case, sub-components may:

Exist in T1 and T2 and be identical.
Exist in T1 and T2 and be different.
Exist in T1 only.
Exist in T2 only.

Figure 36:
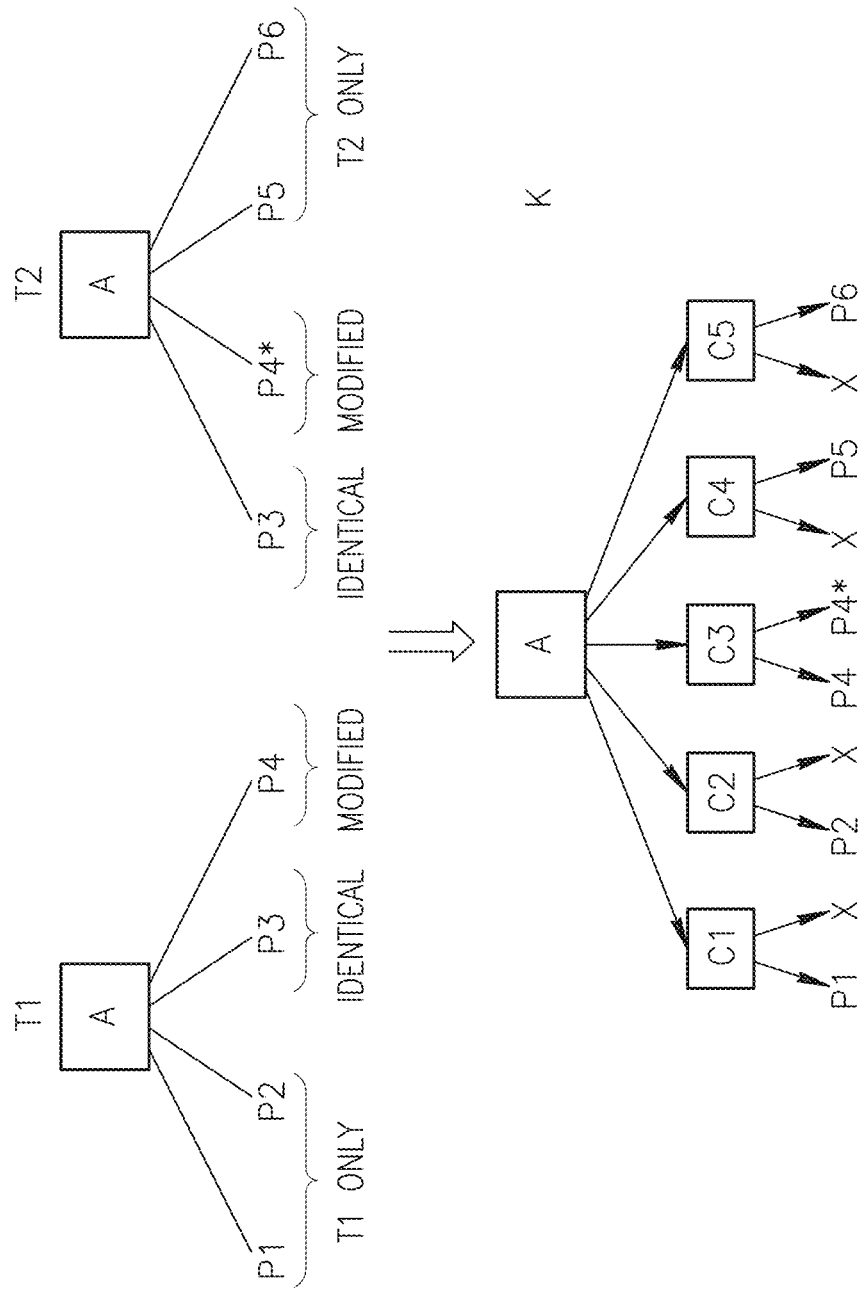
FIG. 36 is a schematic illustration of the use of comparison nodes in conjunction with multi-page containers.

Reference is now made to FIG. 36 which illustrates a multi-page container A with sub-components P1, P2, P3 and P4 (in T1) and with sub-components P3, P4* (modified), P5 and P6 (in T2). As is shown, the created difference tree K may have a parent node A. Parent node A may represent the two variants of the multipage container A (from T1 and T2) which are different by content only. It will be appreciated that if there are additional differences such as different attributes, a different structure may be used including two full sub trees. Parent node A may comprise a comparison node C1 containing [For T1] P1 and [For T2] Null pointer (X). Parent node A may also contain comparison node C2 containing: [For T1] P2 and [For T2] Null pointer (X); comparison node C3 containing [For T1] P4 [For T2] P4*, comparison node C4 containing [For T1] Null pointer and [For T2] P5 and comparison node C5 containing [For T1] Null pointer and [For T2] P6.

It will be appreciated that in this scenario, P3 was filtered out in the example above and is not included in the difference tree.

Comparer and merger 650 may compare T1 and T2 to create difference tree K.

Comparer and merger 650 may recursively scan T1 and T2 starting at the root of both trees and at each node level may match the sub-nodes of T1 and T2 as described in more detail herein below.

Figures 37A, 37B, 37C:
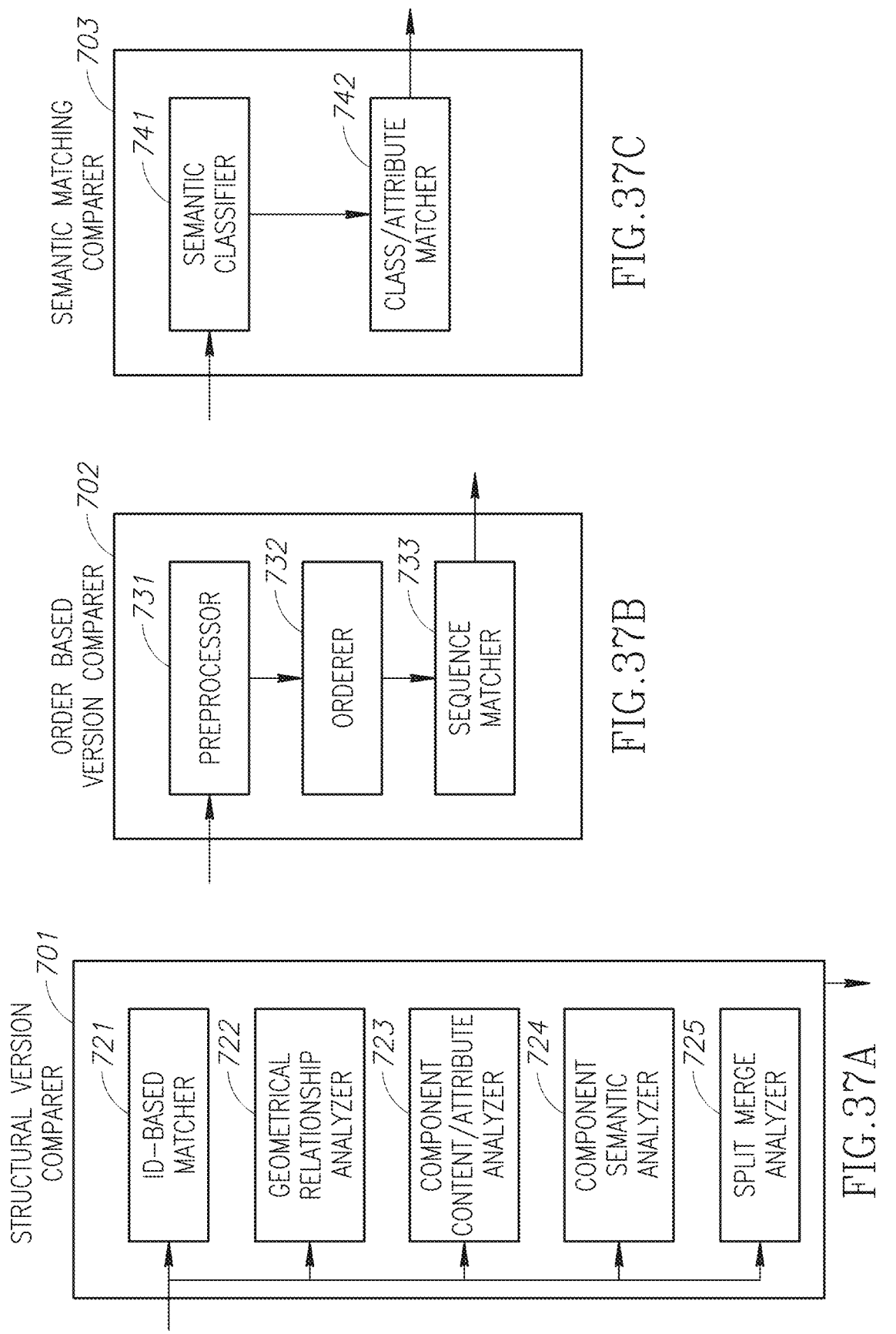
FIGS. 37A, 37B and 37C are schematic illustrations of the elements of the structural version comparer, order based comparer and semantic matching comparer of FIG. 34A, constructed and operative in accordance with the present invention.

Reference is now made to FIG. 37A which illustrates the sub elements of structural version comparer 701, FIG. 37B which illustrates the sub elements of order based version comparer 702 and FIG. 37C which illustrates the sub elements of semantic matching comparer 703. Structural version comparer 701 may comprise a ID-based matcher 721, a geometrical relationship analyzer 722, a component content/attribute analyzer 723, a component semantic analyzer 724 and a split merge analyzer 725. Order based version comparer 702 may comprise a preprocessor 731, an orderer 732 and a sequence matcher 733. Semantic matching comparer 703 may comprise a semantic classifier 741 and a class/attribute matcher 742. The functionality of these elements is discussed in more detail herein below.

Version manager 652 may receive from component manager 651 the two (or more) different versions of the pertinent website that require comparing and merging. As discussed herein above, the hierarchical arrangements of the component in each version may be likened to a component tree having multiple sub nodes.

Version comparer 655 may run recursively on each such node pair, and may determine if it should be included in a difference tree based on the existence of differences at the lower level (as indicated by the results of the recursion). If the comparison is a leaf node comparison, version comparer 655 may include a comparison node in the difference tree if there are differences in the attribute value between the compared leaf nodes (as described in more detail herein below). As discussed herein above, the elements of version comparer 655 may be coordinated by comparison selector coordinator 699 and may be run independently or may be used in parallel to complement each other.

Structural version comparer 701 may compare the structural hierarchy of each pair of nodes through comparison of their geometrical, content and semantic relationships.

It will be appreciated that comparer and merger 650 may use unique per-component ID's which may be preserved when a component is modified (possibly even on type modification). ID based matcher 721 may match all nodes which exist in both T1 and T2 and have the same ID. It will also be appreciated that such matching may be done at each container level (as represented by internal tree nodes) subject to geometrical split/merge detection as described in more detail herein below.

Geometrical relationship analyzer 722 and component semantic analyzer 724 may perform geometrical and semantic matching accordingly to try to find pairs among the remaining (non-ID-matched) components in T1 and T2. In spite of having different ID's, components in T1 and T2 might still be connected to each other in their semantic role (as identified by component semantic analyzer 724 or geometrical relationship analyzer 722), and should be referred as one "changed" pair rather than one deleted component and one added component.

Geometrical relationship analyzer 722 may match nodes which only exist in T1 with nodes which only exist in T2 based on the nodes in the pair occupying approximately the same area. This may be done based on the percentage of overlap (e.g. in terms of X/Y/area), with additional weight given to the component type and other attributes.

Figure 38:
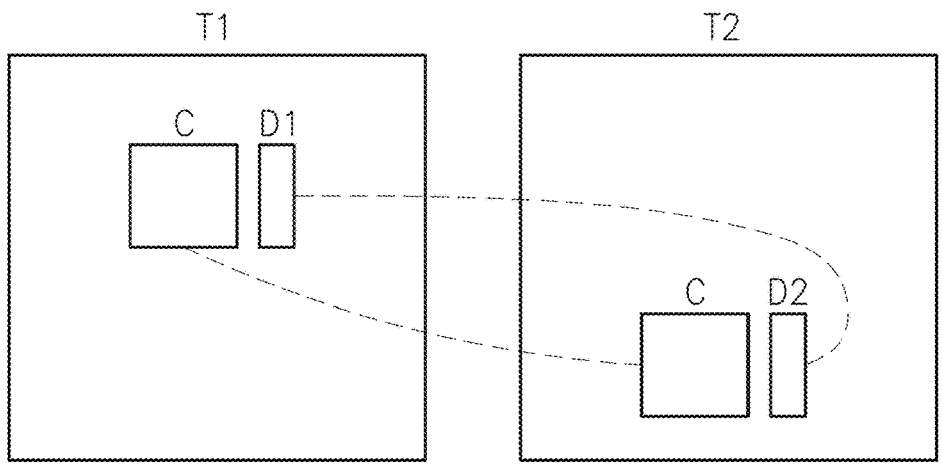
FIG. 38 is a schematic illustration of the geometric matching of components.

Geometrical relationship analyzer 722 may also match nodes which only exist in T1 with nodes which only exist in T2 based on position, size and intersection relative to other paired nodes. As is illustrated in FIG. 38 to which reference is now made, if component C exists in both T1 and T2, and has an adjacent component D1 in T2 and D2 in T2, then geometrical relationship analyzer 722 may match D1 and D2.

Component semantic analyzer 724 may check for combinations (a given subset of unmatched components in T1 against a given subset of unmatched components in T2). Component semantic analyzer 724 may also match the components in two component sets according to their IDs and attributes (such as position, size and type). It may perform semantic matching based on higher-level semantic type (e.g. a text paragraph component as compared to a text line component). It may also rely on created semantic links (e.g. matching two pairs of image+caption components).

If the component is a leaf-level component, component content/attribute analyzer 723 may check for values of the component attributes (including the content attribute, e.g. the actual text included in a text component). It may then create a comparison node only if an attribute was changed. Component content/attribute analyzer 723 may also filter out any attributes which are not relevant to the comparison.

Split merge analyzer 725 may also grade such possibly pairing based on area occupied, component types, component content and contained sub-components. It may insert such generated group-pairs into the difference tree, creating an additional node to contain them.

Figure 39:
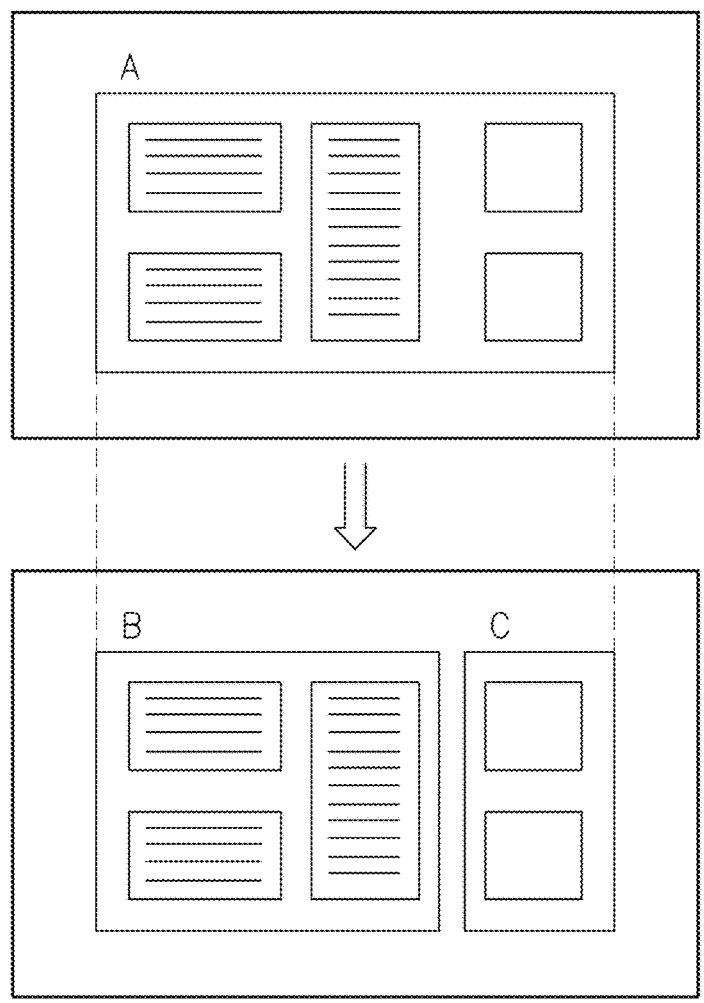
FIG. 39 is a schematic illustration of an ID retaining split transformation.

Split merge analyzer 725 may also perform geometrical split/merge detection in ID-retaining split/merge, i.e. a split/merge transformation in which a pre-transformation component (and ID) is also one of the post-transformation components. Reference is now made to FIG. 39 which illustrates an ID retaining split transformation. A single container component A may be split into two (or more) container components B and C occupying the same or similar area and with the content of component A divided between components B and C.

However, if the ID of component A has been preserved as one of the split components, split merge analyzer 725 cannot perform ID matching, but rather geometrical relationship analyzer 722 and/or component semantic analyzer 724 may perform analysis to detect ID-retaining transformations as described in more detail herein below.

The same may apply to merge transformation (e.g. one in which components B and C are merged into A), or to a combined split-merge transformation (e.g. one in which components B and C are converted into components A and D).

Split merge analyzer 725 may attempt to detect splitting and merging of components (e.g. a text box was replaced by two text boxes occupying roughly the same area). Split merge analyzer 725 may also add all unmatched components on both sides into the difference tree (marking a component that was added or removed)—creating 1-sub-node comparison nodes as required. If split merge analyzer 725 finds a difference (i.e. not all sub-nodes in T1 and T2 are identical), it may return a created sub-difference tree to the caller in order to add it to the constructed tree formed at the calling recursion level handling the containing container.

Order based version comparer 702 may compare elements by preprocessing the elements and creating an order to compare like components. Preprocessor 731 may perform any required pre-processing on the compared components sets so as to extract the relevant part of the components sets and may also analyze the suitability of the components and may make modifications to the existing components where necessary. It also may analyze any hierarchies and any specific container relationships at the start of the process in order to gather information that may be useful to the process. It will be appreciated that the functionality of preprocessor 731 may be similar to the functionality of preprocessor 201 as described herein above. After the components have been preprocessed by preprocessor 731, orderer 732 may order the components accordingly to aid the comparison process. It will be appreciated that the functionality of orderer 732 may be similar to the functionality of orderer 240 as described herein above.

Orderer 732 may define a linear order among the components at each containment level in each visual application version being compared. Orderer 732 may then convert each container in each visual application into a "string" of components and then match between the components in the multiple such strings according to the results structural version comparer 701. It will be further appreciated that orderer 732 may take into account various website building system-related considerations, such as component types and content and editing history.

Orderer 732 may then convert each of the strings from a "string of components" to a string of symbols (from a newly created alphabet which represents the components) using identical symbols for matched components in the multiple strings, and different unique symbols for the unmatched components. It may then apply a known linear text comparison/merging algorithm between the multiple strings (such as the recursive three-way merging algorithm described in http://en.wikipedia.org/wiki/Merge (revision control)). It will be appreciated that in this scenario, orderer 732 may convert the multi-dimensional component merge into a linear text merge, the process of which is well known in the industry.

It will also be appreciated that split-merge analyzer 725 may also be used as a pre-processing stage, since it changes the hierarchy of containers (e.g. by dissolving or re-arranging containers).

Sequence matcher 733 may then apply a sequence matching algorithm to the ordered component set.

Semantic matching comparer 703 may perform semantic classification on the nodes and match them according to the semantic classes and their geometrical parameters.

Semantic classifier 741 may map the components into semantic types (such as visual (image, video) and text (single line, multi-lines) which may be defined hierarchically. The semantic types may include multi-component semantic types such as ImageWithCaptionText—a semantic type created by uniting a pair which includes image and text components as one semantic entity.

Figure 40:
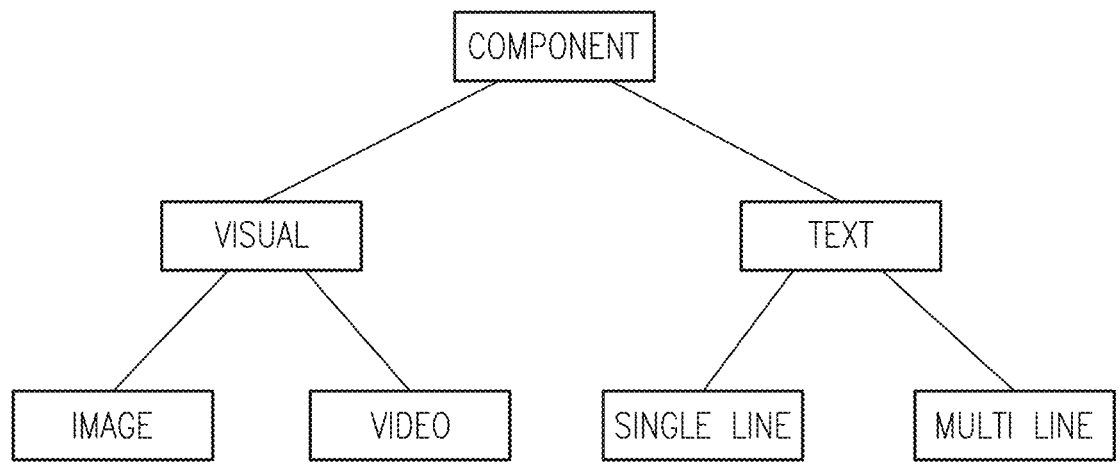
FIG. 40 is a schematic illustration of a simple semantic hierarchy.

Semantic classifier 741 may use a system table mapping types (single and multi-components) into semantic types arranged in a hierarchy of types, e.g. "image" and "video" are sub-types of "visual" which is a sub-type of the top-level "component" as shown in FIG. 40 to which reference is now made. It may also rely on content/attribute analysis of the component (e.g. analyzing content of picture/text components through concept identification and extraction to find related components).

Semantic classifier 741 may also use additional information from other elements of the version comparer 655 and may also use previous container merging and splitting results and previously identified semantic links (e.g. created by component semantic analyzer 724).

Semantic classifier 741 may handle united/spilt/re-arranged components as created by the split merge analyzer 725 and may rely on earlier analysis by component content/attribute analyzer 723.

Class/attribute matcher 742 may take elements from the two matched components sub-trees and attempt to create a match based on the semantic classification generated by semantic classifier 741. This could be applied to all elements, or to elements remaining after ID-based matcher 721 has run (subject to split/merger analyzer 725). It will be appreciated that this may be very useful when applied to all elements for the comparison of two disjoint sub-trees which are not variants of the same sub-tree (i.e. when comparing two web pages not having a common origin).

Class/attribute matcher 742 may divide the components in each of the compared component sets into classes according to their semantic types. It will be appreciated that semantic matching comparer 703 may typically use very abstract semantic types (i.e. high on the semantic type hierarchy) as classes, so as to provide wider matching. For example, semantic classifier 741 may use four classes based on major semantic types such as text, image, galleries and "other components".

Once semantic classifier 741 has finished classifying the components, class/attribute matcher 742 may sort the components in each class according to their size, or possibly—in particular for text—their amount of content. The latter is done so a large text area containing small amount of text may be matched with a smaller text area which might be more suitable. Class/attribute matcher 742 may further sort components having identical (or near-identical) area according to additional attributes such as aspect ratio, position on screen etc.

It will be appreciated that such matching may omit components with extreme size (too large or too small) which cannot be matched with similar size components in the matched web pages or containers.

Once class/attribute matcher 742 has finished sorting, it may apply a matching algorithm to create the pairing such as a greedy algorithm, the Hungarian algorithm or any similar algorithm. Class/attribute matcher 742 may match components in each category separately.

Class/attribute matcher 742 may take into account semantic links as noted above, e.g. "components A and B should be close together" or "component A must be above component B with no inferring components". It may also try to satisfy these requirements before matching the remaining components.

Class/attribute matcher 742 may also use information from cross-category semantic links when forming the matching. In such a case, the matching is performed sequentially (e.g. first matching all text components, then image components, etc.). The matching for a given category may rely on the matching done for previous categories.

Figure 41:
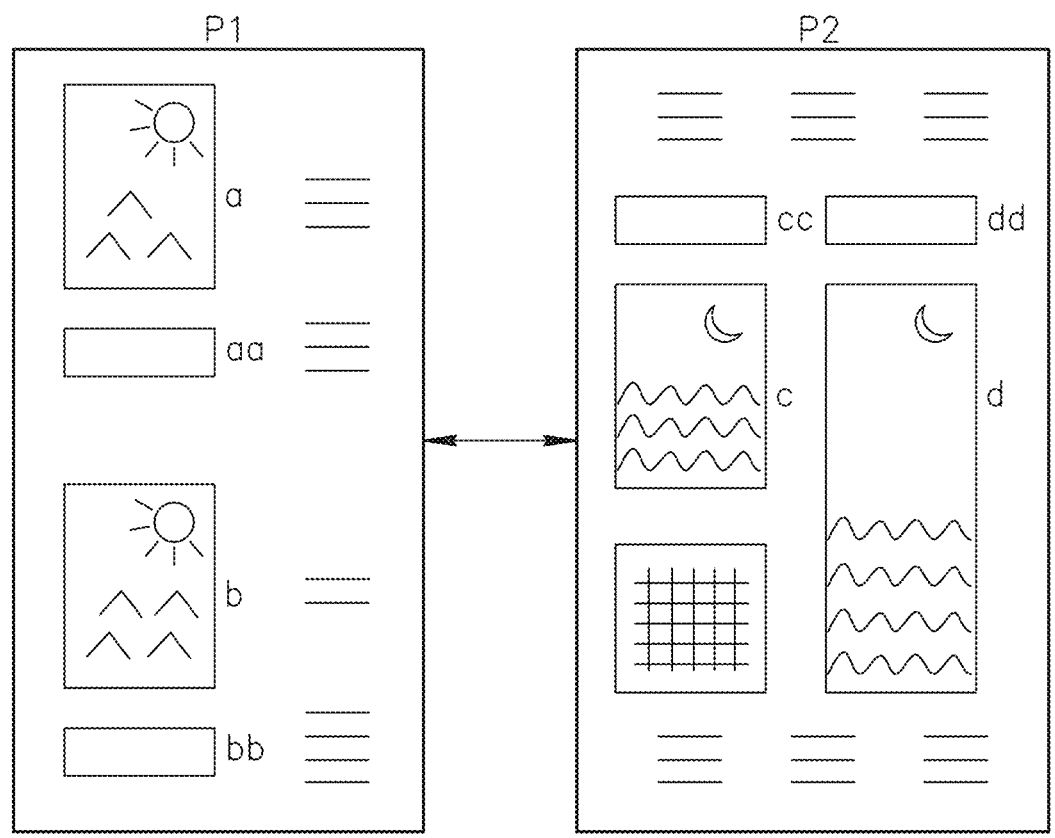
FIG. 41 is a schematic illustration of class/attribute-based component matching integrating semantic linking information.

Reference is now made to FIG. 41 which illustrates class/attribute-based component matching integrating semantic linking information. Class/attribute matcher 742 may require matching the two pages P1 and P2. Page P1 contains 2 sets of (picture+caption) components marked [a]+[aa], [b]+[bb] and component semantic analyzer 724 may have previously created the semantic pairings [a]⇔[aa], [b]⇔[bb].

Page P2 contains 2 sets of (picture+caption) components marked [c]+[cc], [d]+[dd] (and possible additional components) and component semantic analyzer 724 may have previously created the semantic pairings [c]⇔[cc], [d]⇔[dd].

Class/attribute matcher 742 may first match the text category (using a matching algorithm as discussed herein above), resulting in the matching [aa]=>[cc], [bb]=>[dd]. It may then match the picture category.

It will be appreciated that when class/attribute matcher 742 attempts to find a match for [a], it may see that [a] is semantically paired with [aa] which was matched with [cc]. As [cc] is semantically paired with a picture component [c], class/attribute matcher 742 may match [a] to [c] directly and remove them from the sets of components to be paired ([a] from P1's set, [c] from P2's set).

It will be appreciated that once all comparisons have been made, difference tree generator 704 may create a difference tree based on the results of comparers 701, 702 and 703.

Version resolver 656 may take the created difference tree (containing the differences between T1 and T2) and "resolve" it, by removing all special nodes and generating a merged component tree. Version resolver 656 may also display conflicting components emphasized through the modification of their display attributes or modification of the non-conflicting components display attributes. This may be done through interaction with the user, automatically or both.

As discussed herein above, version resolver 656 may comprise a resolver selector and coordinator 710, difference tree browser 711, a merged page displayer 712, a component attribute browser 713 and a merged component tree generator 714.

Difference tree browser 711 may browse the difference tree and resolve the comparison nodes included in it. Difference tree browser 711 may use a hierarchy browser to display the difference tree hierarchy, allowing the user to select for each comparison node which of the two options (T1 or T2) to use.

It will be appreciated that in some cases a difference tree node may have multiple sub-nodes for which there is no clear ordering. In such a case, hierarchical menu generator 716 may create an ordered hierarchical menu based on (for example) geometrical analysis of the components described by the sub-nodes. One such method of creating such a hierarchical menu is through the use of an express mode menu generator such as that described in U.S. patent publication 2013-0086496 A1 (Adaptive User Interface Creation in Multimedia Creative Design System) published on Apr. 4, 2013 and assigned to the common assignee of this patent application, which creates a hierarchical menu as a result of the geometrical sorting of components.

Merged page displayer 712 may display (in WYSIWYG) the current state of the merged page, including the current decisions made for all resolved comparison nodes. It will be appreciated that the display may display all page components, including these which are identical between the two configurations, and are thus omitted from the difference tree. This may be done based on the original T1 and T2.

Merged page displayer 712 may provide a way to emphasize the components covered by unresolved comparison nodes, such as by highlighting the components, graying-out other components and providing a toggle interface to switch on/off the other component display.

It will be appreciated that the main problem in implementing such a display is that as long as there are unresolved comparison nodes, the difference tree still may still represent multiple states of the created application.

Merged page displayer 712 may display a weighted average of the two configurations. Merged page displayer 712 may also possibly create a continuum of configurations between the T1 and T2 configurations. For example, for regular numerical attributes (e.g. position or size), merged page displayer 712 may use a weighted average attribute value. For some attributes (e.g. color), merged page displayer 712 may use a specific method (e.g. creating a color gradient in a given color space between the two colors). For a binary type attribute, merged page displayer 712 may switch them between the two states at a specific point.

Animator 715 may also solve the multiple states issue by further providing a continuous animation of the page changing between the two states or by adding a toggle or slider between the two states. Animator 715 may also provide a way to select either state, or possibly to select a given attribute value which is between the two states.

Merged page displayer 712 may also modify the other component in the displayed page based on the changes to attributes (in particular to size and position) of some components. Merged page displayer 712 may also create a combined display which shows multiple versions of relevant components simultaneously. These last options can be performed using dynamic layout techniques as described in U.S. Patent Publication 2013-0219263 (Web site design system integrating dynamic layout and dynamic content) published 22 Aug. 2013 and assigned to the current assignee of this patent application.

Merged page displayer 712 may also estimate the degree of changes between the two versions being compared (e.g. "cosmetic"/"minor"/"major"/"lots of changes"), based on a difference tree based classifier such as the number of modified components, the amount of change in each modified component etc.

Component attribute browser 713 may display the values of a component attribute, including displaying the two values for components for which there is a comparison node (i.e. the T1 value and the T2 value). It may allow direct attribute modification so as to resolve version differences, and selecting an interim value (e.g. using a color gradient display as discussed herein above).

Once the difference tree has been fully resolved, merged component tree generator 714 may generate a new resolved difference tree and version merger 657 may then apply the resolved difference tree to the original component trees so as to generate a target component tree which is the merged version.

Figure 42:
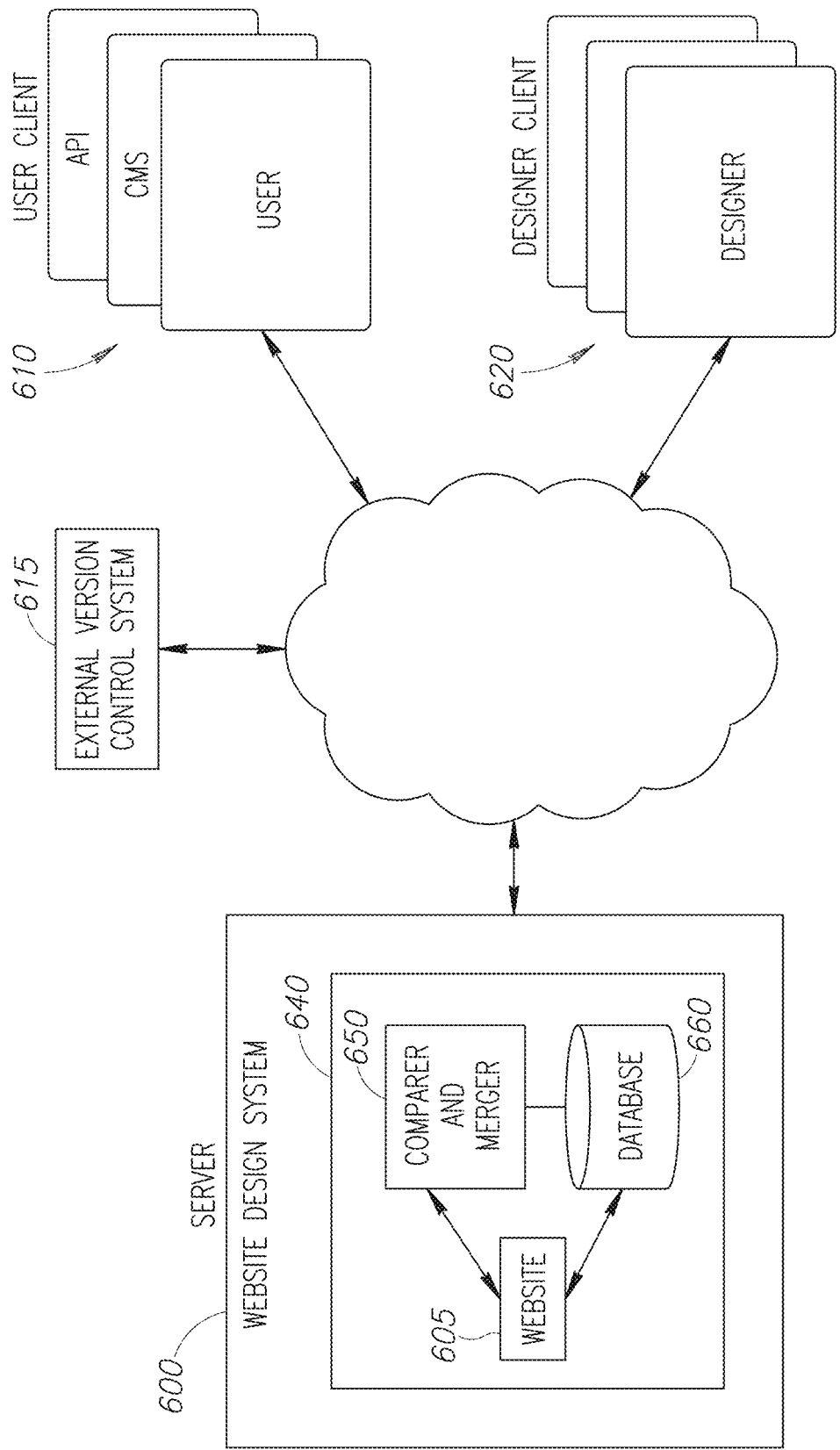
FIG. 42 is a schematic illustration of an alternative embodiment of the system of FIG. 31, constructed and operative in accordance with the present invention.
Figure 43:
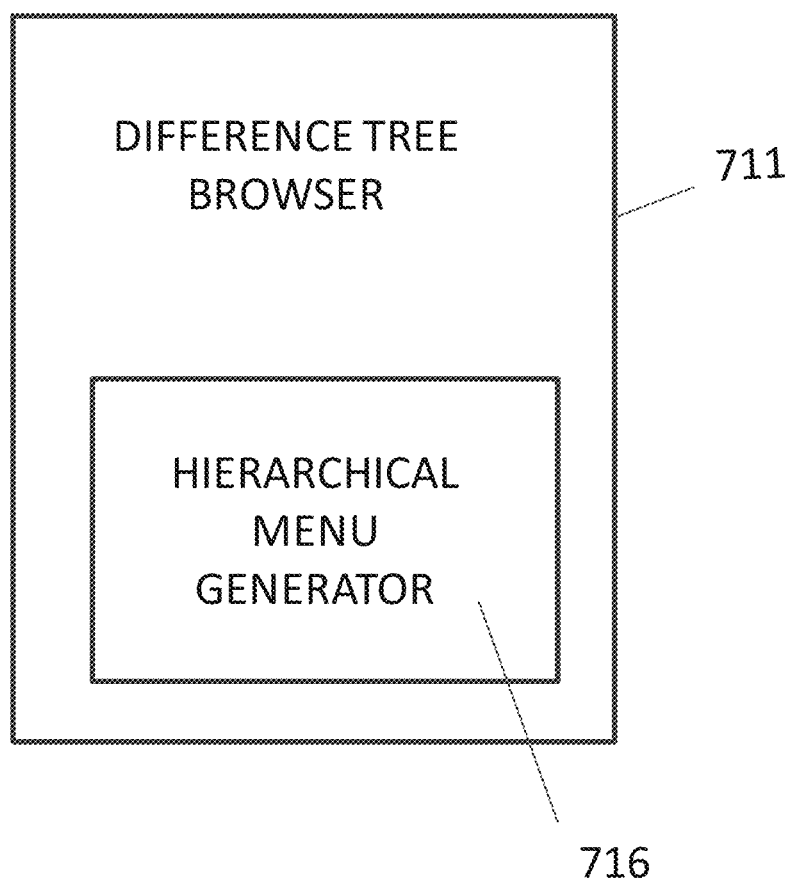
FIG. 43 is a schematic illustration of an element of the difference tree browser of FIG. 34B.

In an alternative embodiment to the present invention, website design system 640 may employ a version control system. It will be appreciated that in this scenario, version integrator 654 may be required to compare and merge three different versions of the website: the historical published (baseline) version from which the current edited version was derived (A), the current edited version (B) and the current version published version (C—including changes made by other users). It will be appreciated that both B and C may be based on A. However, a common scenario may be that the changes A=>B were done through designer client 620 whereas the changes A=>C were done either through designer client 620, through various user client interfaces 610 (including an external content management changes) or through an external version control system 615 which may manage a version of the stored website as is illustrated in FIG. 42 to which reference is now made.

It will be appreciated that website design system 640 may control all changes made to the databases—including those made through any of the system user interfaces, as well as those performed (for example) through web services associated with website design system 640. The only exception may be changes made to external databases which are reflected by the website but are not directly managed by website design system 640. These may also include changes resulting from schema changes, which may require various transformations to the data objects using the modified schema. It will be appreciated that these may be actual changes to data, or automatic application of transformation rules without changing the saved data.

Due to this integration, version manager 652 may have exact information about the series of steps taken to arrive from A to B and possibly to C and may store it in editing history database 635, through storing multiple versions or revisions in database 660 or both. Version merger 657 may use this information to assist in merging changes either by (visually) assisting the user in the merging process, or automatically. In particular, the website design system 640 may use the series of steps from A to B/C, classifying them into contradicting and non-contradicting steps. Thus website design system 640 may perform partial reconciliation of the merged versions.

Thus different versions of a website may be compared and merged based on differences between the objects in each version.

It will be appreciated that the discussion above is focused on component based comparison and merging of two versions of a website being edited—possibly in relation to a common ancestor version from which the two compared versions have been created. However, the description above can be extended by one skilled in the art to a component based comparison and merging of three or more versions of a given website. Furthermore, it can be extended by one skilled in the art to the comparison of unrelated websites aimed at finding similarities or common sections for a variety of applications.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, client/server system or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, client/server system or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A device implementable in a website building system, said device comprising:
    at least one database storing websites having pages with component trees representing relationships of components of said pages, said component trees having nodes to represent said components;
    an editing history database storing editing steps from a baseline version (version A) of a page of said pages to a designer edited version (version B) of said page and editing steps from version A to an end-user edited version of said page (version C);
    at least one hardware processor; and
    a component based version comparer running on said at least one hardware processor to compare said version B and said version C and to generate a difference tree having nodes and to only generate a node, for the difference tree, when said editing steps indicate when an attribute of a component of said version B or said version C has been revised from said version A;
    said component based version comparer further comprising: at least one comparer to preprocess nodes of the component trees of said version B and said version C structurally, by their order or semantically to recognize related components within a version in order to determine an order and relationships before comparing the nodes of said component trees; and
    a version manager to classify said editing steps into contradicting and non-contradicting steps;
    a difference tree generator to create said difference tree according to the results of said at least one comparer and said version manager;
and a version merger to create a reconciled version of said version A and said version B according to said difference tree.

2. The device of claim 1 and also comprising a version resolver to resolve conflicts in said generation of said difference tree.

3. The device of claim 2 and wherein said version resolver comprises at least one of:
    a difference tree browser to display a hierarchy of said difference tree for manual version resolving;
    a merged page displayer to present a display of at least one current state of a merged page;
    a component attribute browser to display values of a component attribute, including displaying two values for components for which there is a comparison node;
    a resolver selector and coordinator to select and coordinate between said difference tree browser, said merged page displayer, and said component attribute browser; and
    a merged component tree generator to provide combined results from at least one of said difference tree browser, said merged page displayer, and said component attribute browser and to generate a new resolved difference tree.

4. The device of claim 3 and wherein said merged page displayer comprises an animator to animate the display of conflicting said components by switching between at least one state.

5. The device of claim 4 and wherein said animator is at least one of automatic and controlled by user.

6. The device of claim 4 and wherein said animator is integrated with dynamic layout processing.

7. The device of claim 3 and wherein said difference tree browser comprises a hierarchical system menu generator to generate a display of conflicting said components.

8. The device of claim 1 and wherein said device is implementable on at least one of a server and a client.

9. The device of claim 1 and wherein said version A and said version B comprise at least one version from an external version control system.

10. The device of claim 1 and wherein said database also stores at least one of: an object store, markup language files, and data interchange format files.

11. The device of claim 1 and wherein said at least one comparer comprises at least one of:
    an order based version comparer to compare said nodes of the component trees based on the order of said nodes said nodes of the component trees and to pre-match said nodes said nodes of the component trees according to an internal said website design system identifier;
    a semantic matching comparer to perform semantic classification on said nodes said nodes of the component trees and match them according to their semantic classes and geometrical parameters; and
    a comparison selector and coordinator to provide selection and coordination between said structural version comparer, said order based version comparer and said semantic matching comparer according to at least one of structure and attributes of said components.

12. The device of claim 11 and wherein said structural version comparer comprises at least one of:
    an ID-based matcher to match all said components in said trees that have the same ID;
    a geometrical relationship analyzer to perform geometrical matching to find pairs among non-ID-matched said components in said trees;
    a component/attribute analyzer to check for changes in said component attributes;
    a component semantic analyzer to find said pairs among non-ID-matched said components; and
    a split merge analyzer to detect splitting and merging of said components and containers and to further detect ID retaining split transformations.

13. The device of claim 11 and wherein said order based version comparer comprises:
    a preprocessor to analyze said components in a tree to extract relevant component sets and to analyze and modify said components for comparison where necessary; and an orderer to determine an order for sub nodes within a comparison node; and a sequence matcher to perform sequence matching on said components.

14. The device of claim 11 and wherein said semantic matching comparer comprises:

a semantic classifier to classify said components into a semantic classification; and a class/attribute matcher to create a match between elements from two matched components based on said semantic classification.

15. The device of claim 11 and wherein said coordination is based on a combined metric of results returned from said structural version comparer, said order based version comparer, and, said semantic matching comparer.

16. The device of claim 15 and wherein said metric is a weighted average.

17. The device of claim 1 wherein said relationships between components is at least one of overlap, intersection, proximity, relative position, and relative size.

18. The device of claim 1 wherein said relationships also comprise at least one of: content and attribute.

19. The device of claim 1 wherein said preprocess is according to at least one of: content and attribute.

20. A method for a website building system, said method comprising:

storing in at least one database websites having pages with component trees representing relationships of components of said pages, said component trees having nodes to represent said components;

storing in an editing history database storing editing steps from a baseline version (version A) of a page said pages to a designer edited version (version B) of said page and editing steps from version A to an end-user edited version of said page (version C);

comparing said version B and said version C; generating a difference tree having nodes and only generating a node, for the difference tree, when said editing steps indicate when an attribute of a component of said version B or said version C has been revised from said version A;

wherein said comparing said version B and said version C and said generating a difference tree comprises: preprocessing nodes of the component trees of said version B and said version C structurally, by their order or semantically to recognize related components within a version in order to determine an order and relationships before comparing the nodes of said component trees;

classifying said editing steps into contradicting and non-contradicting steps;

creating said difference tree according to the results of said preprocessing and said classifying; and creating a reconciled version of said version A and said version B according to said difference tree.

21. The method of claim 20 and also comprising resolving conflicts in said generating a difference tree.

22. The method of claim 21 and wherein said resolving comprises at least one of: displaying a hierarchy for said difference tree for manual version resolving;

presenting a display of at least one current state of a merged page;

displaying values of a component attribute, including displaying two values for components for which there is a comparison node;

selecting and coordinating between said displaying a hierarchy, said presenting and said displaying the values of a component attribute;

providing combined results from said displaying said hierarchy, said presenting and said displaying the values of said component attribute; and generating a new resolved difference tree from said combined results.

23. The method of claim 22 and wherein said displaying said difference tree hierarchy for manual version resolving comprises generating a display of conflicting said components.

24. The method of claim 20 and wherein said storing in at least one database also includes at least one of: an object store, markup language file; and, data interchange format files.

25. The method of claim 20 and wherein said comparing said version B and said version C comprises at least one of:

comparing said nodes of the component trees based on the order of said nodes of the component trees and pre-matching said nodes of the component trees according to an internal said website design system identifier;

performing semantic classification on said nodes of the component trees and matching them according to their semantic classes and geometrical parameters; and providing selection and coordinating between said comparing said nodes of the component trees through comparison of their geometrical, content and semantic relationships, said comparing said nodes of the component trees based on the order of said nodes of the component trees and pre-matching and said performing semantic classification according to at least one of structure and attributes of said components.

26. The method of claim 25 and wherein said comparing said nodes based on the order of said nodes and pre-matching comprises at least one of:

matching all said components in said trees that have the same ID;

performing geometrical matching to find pairs among non-ID-matched said components in said trees;

checking for changes in said component attributes;

finding said pairs among non-ID-matched said components; and detecting splitting and merging of said components and containers and further detecting ID retaining split transformations.

27. The method of claim 25 and wherein said performing semantic classification comprises:

classifying said components into a semantic classification; and creating a match between elements from two matched components based on said semantic classification.

28. The method of claim 20 wherein said relationships between components is at least one of overlap, intersection, proximity, relative position, and relative size.

29. The method of claim 20 wherein said relationships also comprise at least one of: content and attribute.

30. The method of claim 20 wherein said preprocessing is according to at least one of: content and attribute.

* * * * *